United States Patent
Nakagawa et al.

(10) Patent No.: US 12,444,431 B1
(45) Date of Patent: Oct. 14, 2025

(54) MICROPHONE REFERENCE ECHO CANCELLATION

(71) Applicant: Amazon Technologies, Inc., Seattle, WA (US)

(72) Inventors: Carlos Renato Nakagawa, San Jose, CA (US); Ludger Solbach, San Jose, CA (US); Robert Ayrapetian, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 17/488,471

(22) Filed: Sep. 29, 2021

(51) Int. Cl.
| | |
|---|---|
| *G10L 21/0364* | (2013.01) |
| *G10K 11/178* | (2006.01) |
| *G10L 21/0208* | (2013.01) |
| *H04L 27/26* | (2006.01) |
| *H04R 1/34* | (2006.01) |
| *G10L 21/0216* | (2013.01) |

(52) U.S. Cl.
CPC .... *G10L 21/0364* (2013.01); *G10K 11/17823* (2018.01); *H04L 27/2651* (2021.01); *H04L 27/26524* (2021.01); *H04R 1/342* (2013.01); *G10L 2021/02165* (2013.01); *G10L 2021/02166* (2013.01)

(58) Field of Classification Search
CPC ....... G10L 21/0208; G10L 2021/02166; G10L 21/0364; G10L 2021/02165
USPC ......... 704/233, 226, E21.002, E21.004, 231, 704/200, E15.039
See application file for complete search history.

(56) References Cited

U.S. PATENT DOCUMENTS

| | | | |
|---|---|---|---|
| 9,928,847 B1* | 3/2018 | Cleve | H04M 3/002 |
| 2006/0013383 A1* | 1/2006 | Barron | H04M 9/082 379/406.01 |
| 2011/0007907 A1* | 1/2011 | Park | G10K 11/17855 381/71.8 |
| 2012/0106749 A1* | 5/2012 | Buck | H04R 3/005 381/92 |
| 2014/0016794 A1* | 1/2014 | Lu | H04R 3/002 381/66 |

(Continued)

FOREIGN PATENT DOCUMENTS

| | | | | |
|---|---|---|---|---|
| WO | WO-2004103013 A2 * | 11/2004 | | H04R 3/005 |
| WO | WO-2018158558 A1 * | 9/2018 | | H04M 9/082 |

*Primary Examiner* — Richemond Dorvil
*Assistant Examiner* — Rodrigo A Chavez
(74) *Attorney, Agent, or Firm* — Pierce Atwood LLP

(57) ABSTRACT

Techniques for improving microphone noise suppression are provided. When a playback signal is available, a device may use the playback signal as a reference while performing Acoustic Echo Cancellation (AEC) processing. When the playback signal is not available, the device may instead use microphone audio signal(s) as the reference while performing Adaptive Interference Cancellation (AIC) processing. For example, the device may use first audio data generated by first microphones as the reference while performing AIC processing on the first audio data and second audio data generated by second microphones. As the adaptive filter used to perform AIC processing is updated at a slower rate, the reference signal only cancels stationary portions of the first audio data (e.g., noise), leaving a representation of transient sounds such as speech. In some examples, the device may perform AIC processing and AEC processing in series.

23 Claims, 27 Drawing Sheets

(56) References Cited

U.S. PATENT DOCUMENTS

| | | | |
|---|---|---|---|
| 2015/0063581 A1* | 3/2015 | Tani | G10K 11/17855 |
| | | | 381/71.2 |
| 2016/0205263 A1* | 7/2016 | Liu | H04R 3/02 |
| | | | 455/570 |
| 2018/0270565 A1* | 9/2018 | Ganeshkumar | G10L 25/84 |
| 2019/0035382 A1* | 1/2019 | Christoph | H04R 1/406 |
| 2019/0035414 A1* | 1/2019 | Christoph | G10L 19/26 |
| 2019/0035416 A1* | 1/2019 | Christoph | G10L 21/0208 |
| 2019/0115040 A1* | 4/2019 | Kamdar | G10L 21/0232 |
| 2019/0348056 A1* | 11/2019 | Christoph | H04R 3/005 |
| 2020/0118580 A1* | 4/2020 | Wang | H04M 1/72403 |
| 2020/0145752 A1* | 5/2020 | Janse | H04R 3/005 |
| 2020/0152167 A1* | 5/2020 | Deshpande | H04M 9/082 |
| 2021/0304779 A1* | 9/2021 | Liu | H04R 3/005 |
| 2021/0312936 A1* | 10/2021 | Hu | G10L 21/0216 |
| 2022/0406286 A1* | 12/2022 | Yamanashi | H04S 7/305 |

* cited by examiner

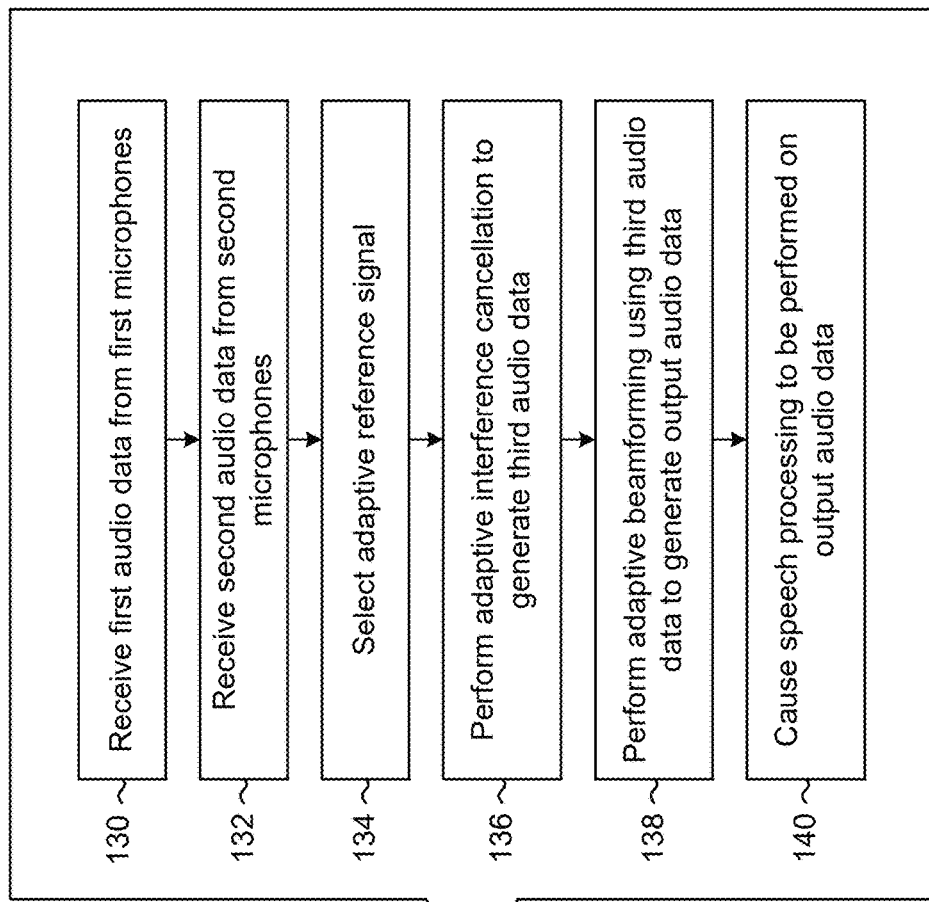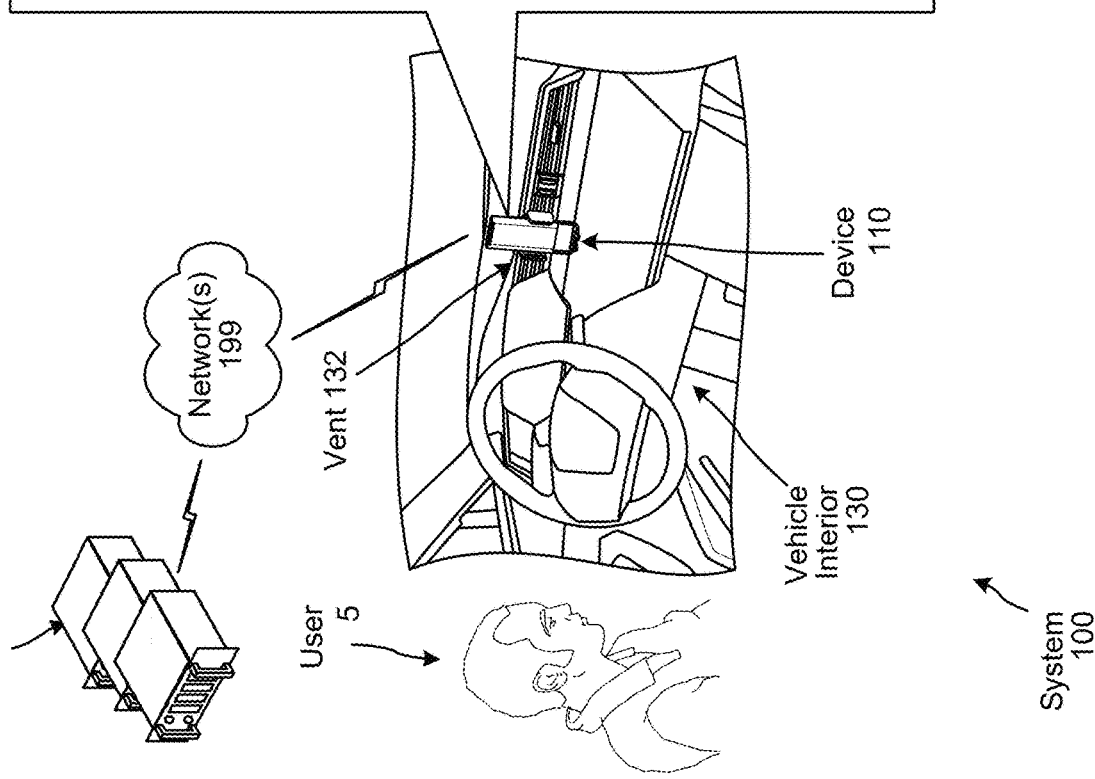
FIG. 1

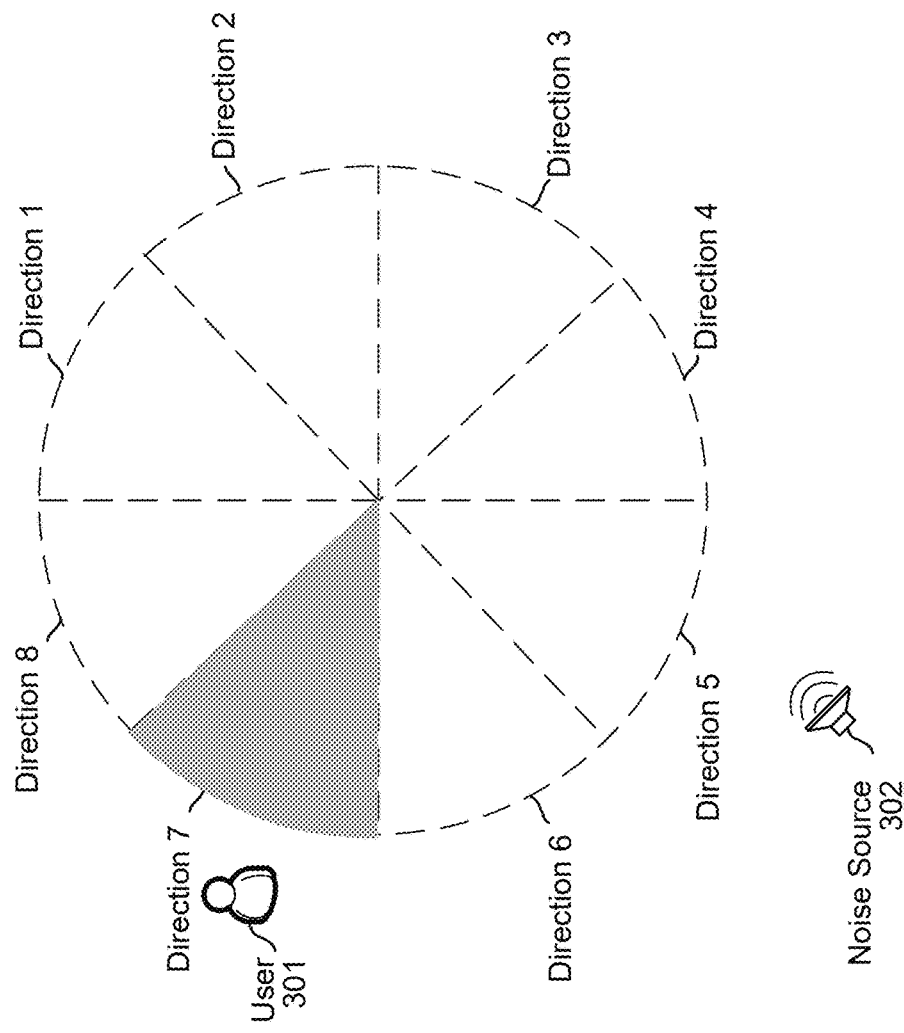

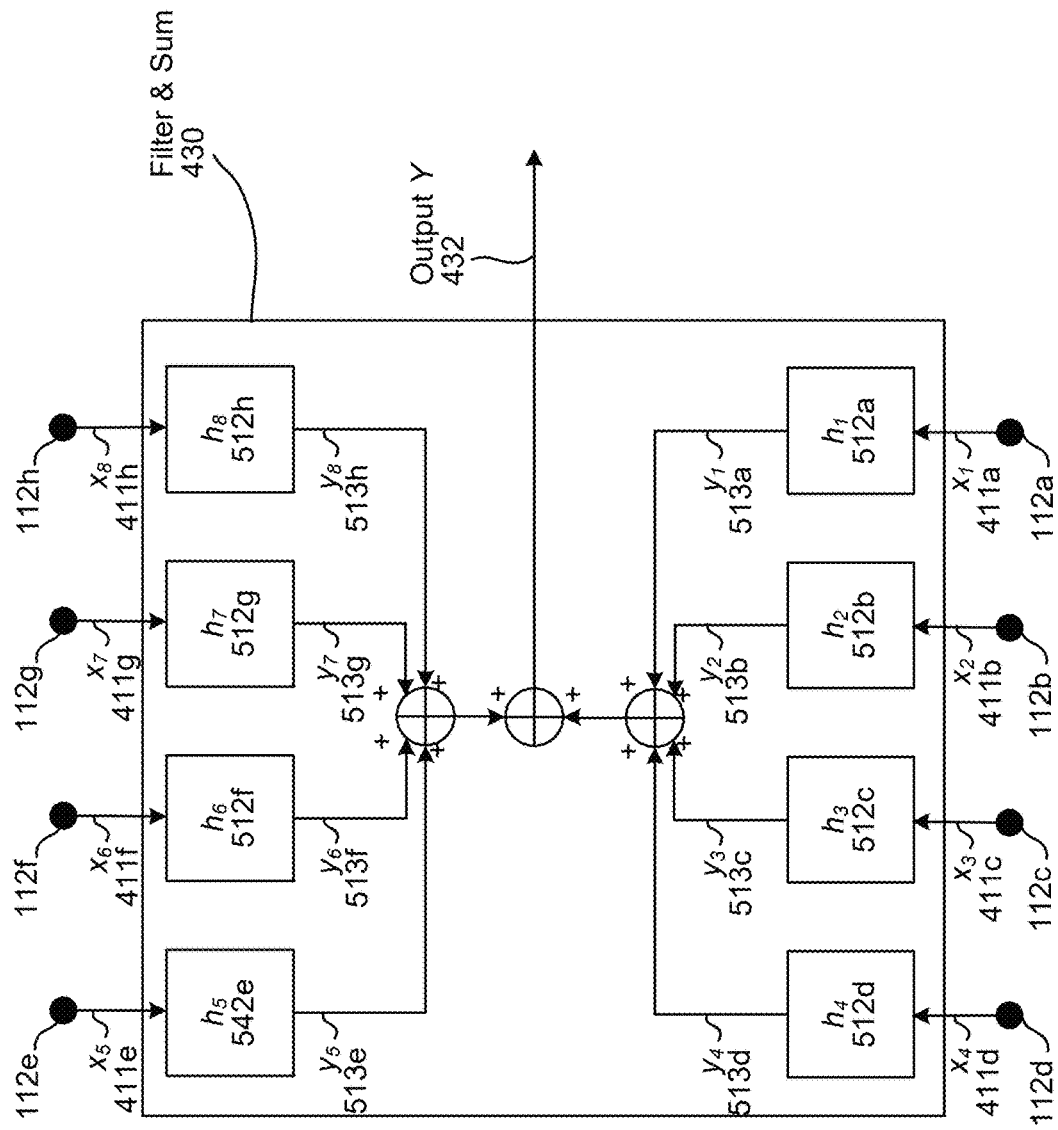

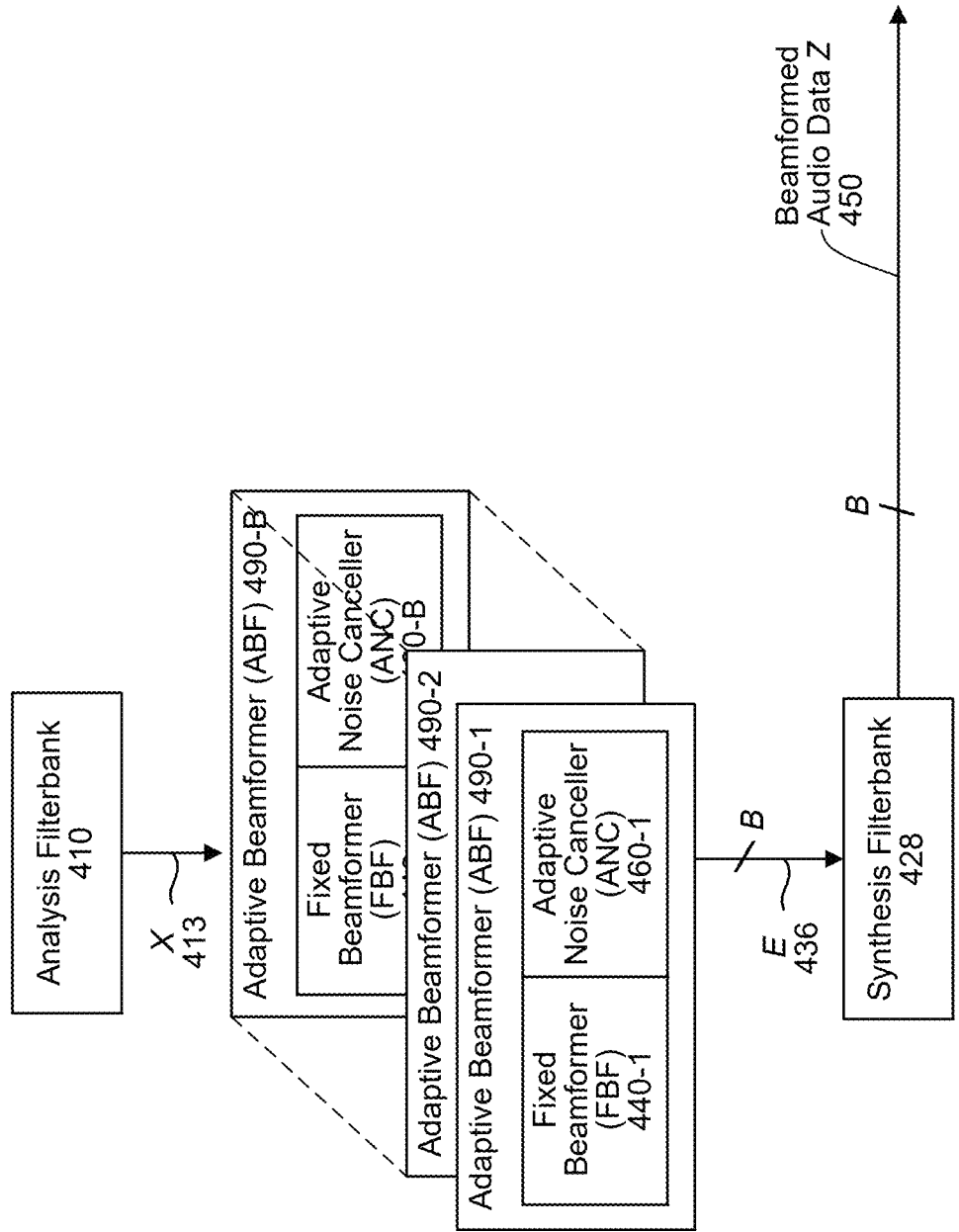

FIG. 7A
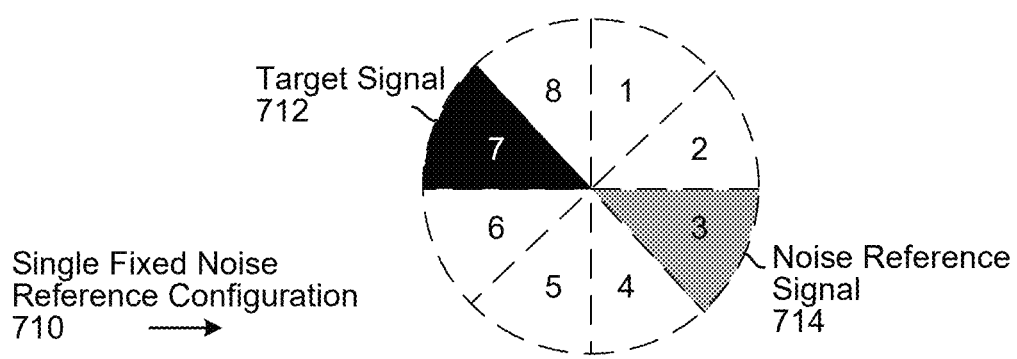
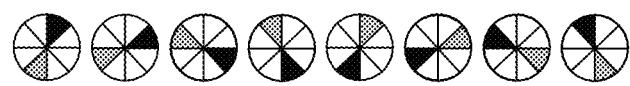
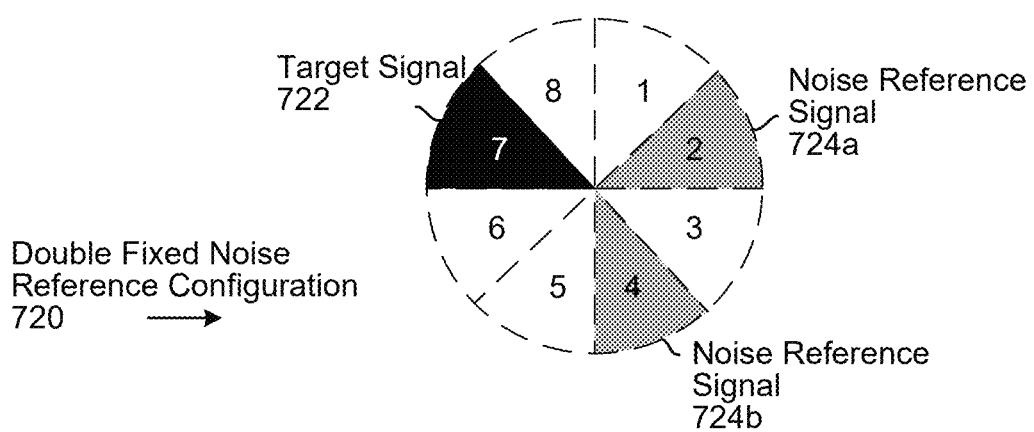
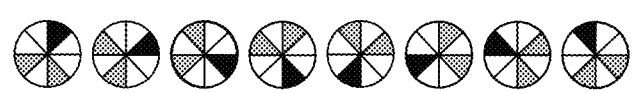

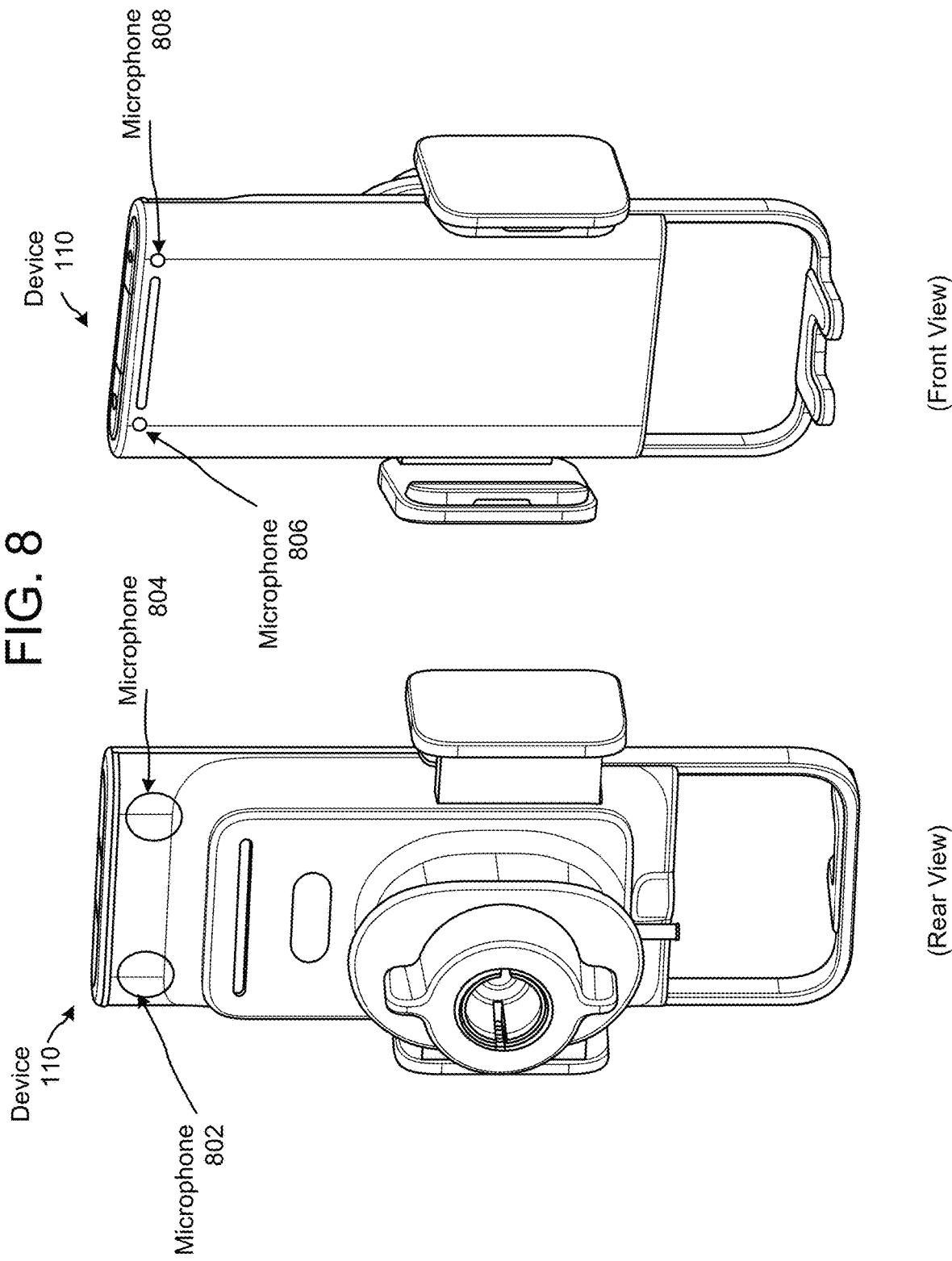

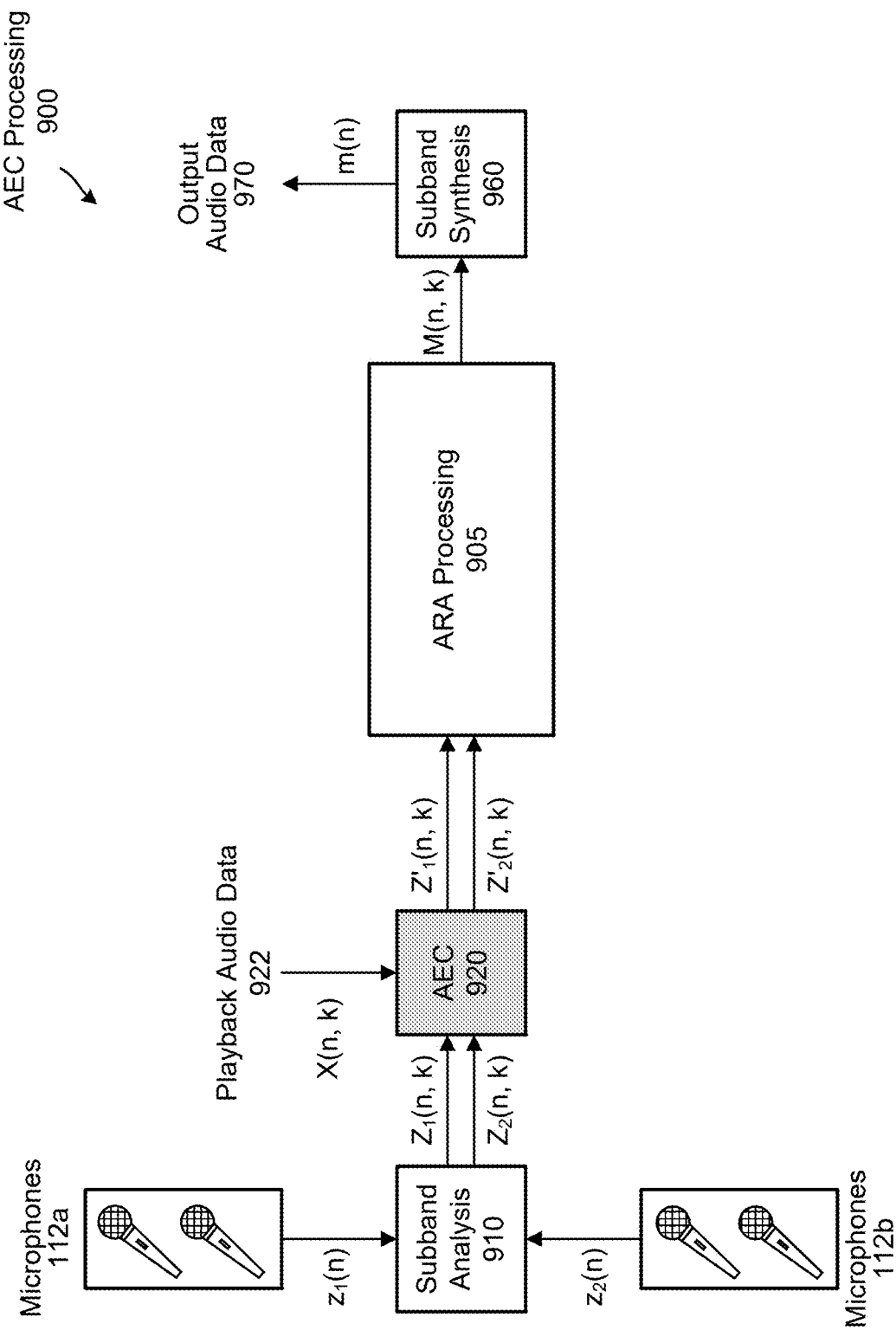

FIG. 10
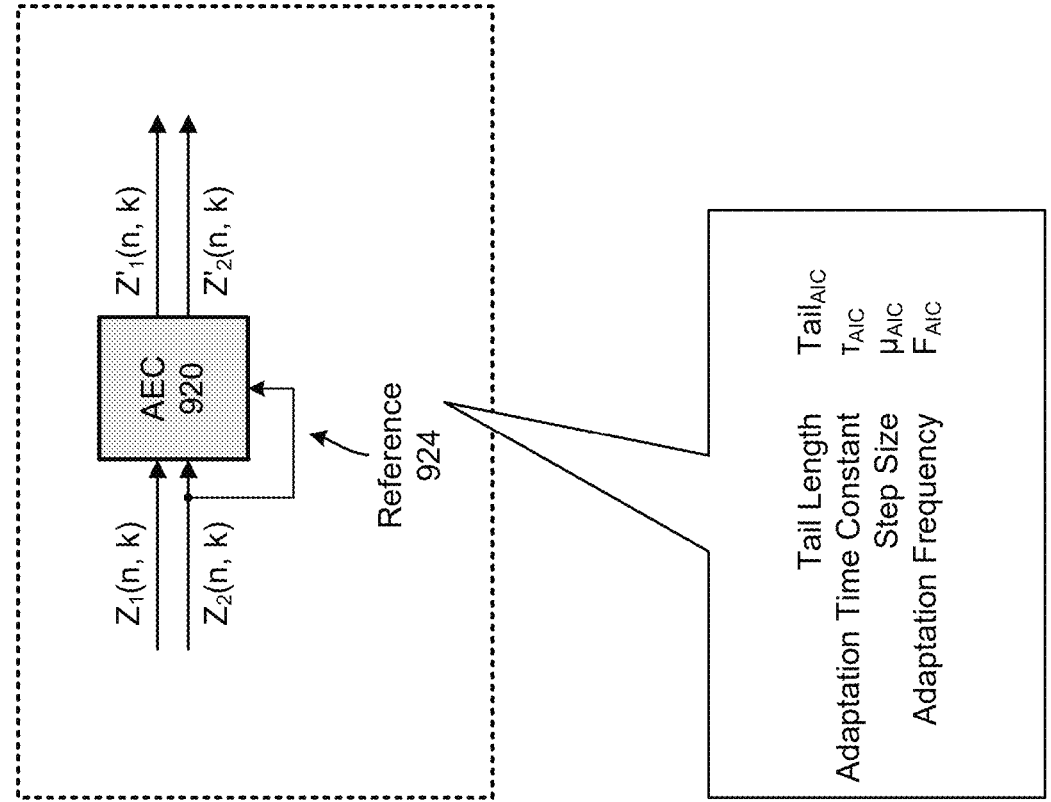
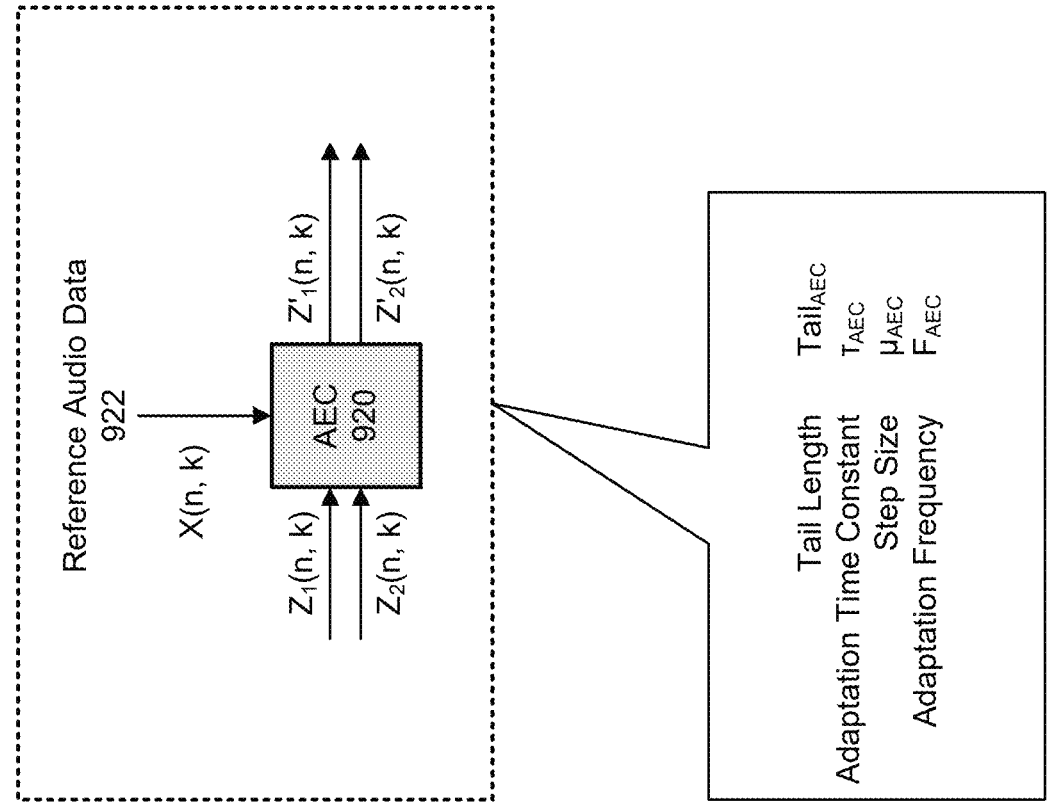

FIG. 15A

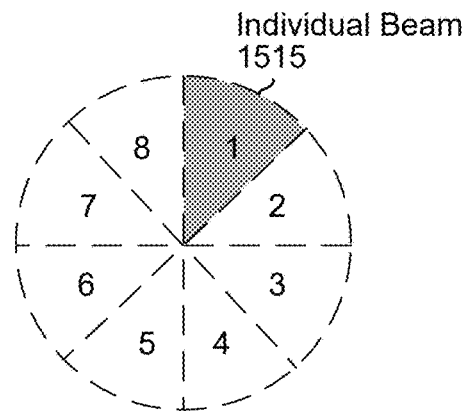

Individual Beam 1515

Individual Beam Selection 1510

Beam1: SNR1
Beam2: SNR2
Beam3: SNR3
Beam4: SNR4
Beam5: SNR5
Beam6: SNR6
Beam7: SNR7
Beam8: SNR8

SNR Calculation 1520

FIG. 15B

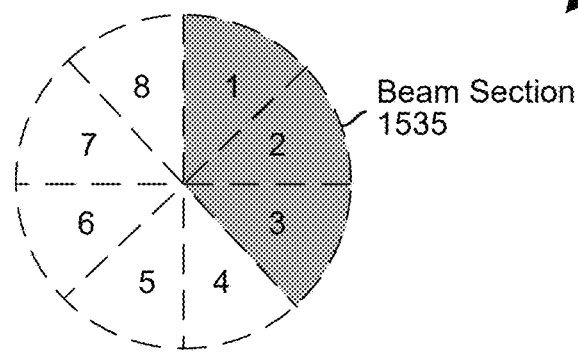

Beam Section 1535

Fixed Beam Section Selection 1530

Section1: SNR8+SNR1+SNR2
Section2: SNR1+SNR2+SNR3
Section3: SNR2+SNR3+SNR4
Section4: SNR3+SNR4+SNR5
Section5: SNR4+SNR5+SNR6
Section6: SNR5+SNR6+SNR7
Section7: SNR6+SNR7+SNR8
Section8: SNR7+SNR8+SNR9

SNR Calculation 1540

FIG. 15C

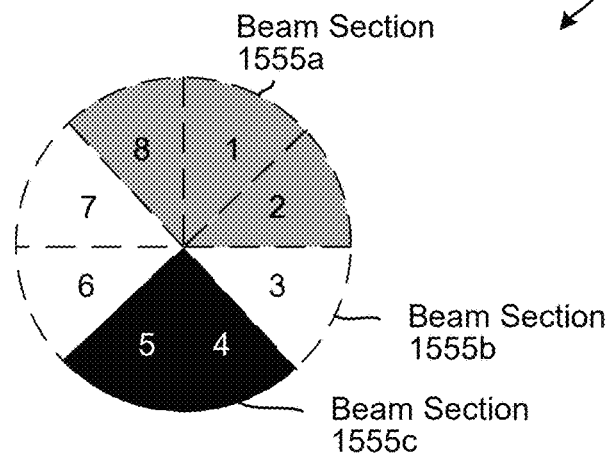

Beam Section 1555a

Beam Section 1555b

Beam Section 1555c

Variable Beam Section Selection 1550

Section1: SNR8+SNR1+SNR2
Section2: SNR3
Section3: SNR4+SNR5
Section4: SNR6+SNR7

SNR Calculation 1560

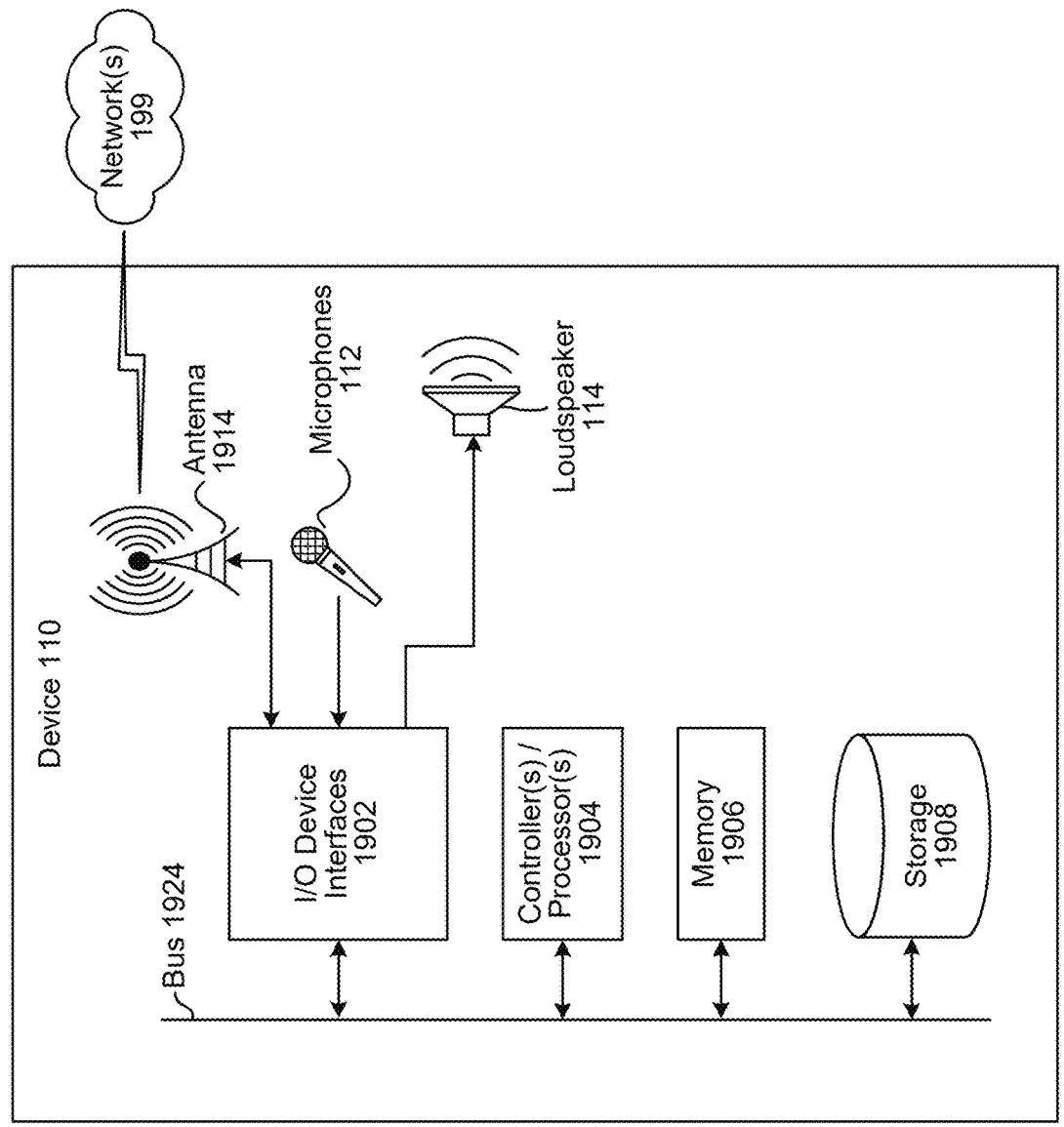

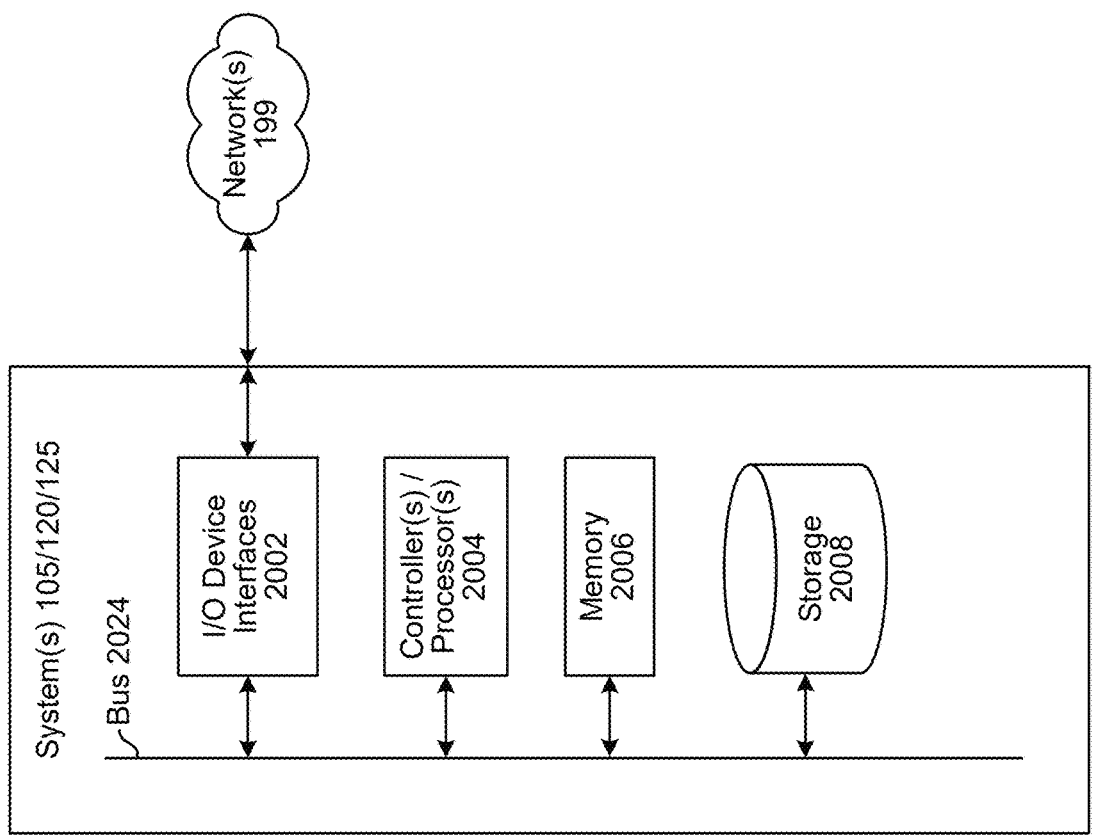

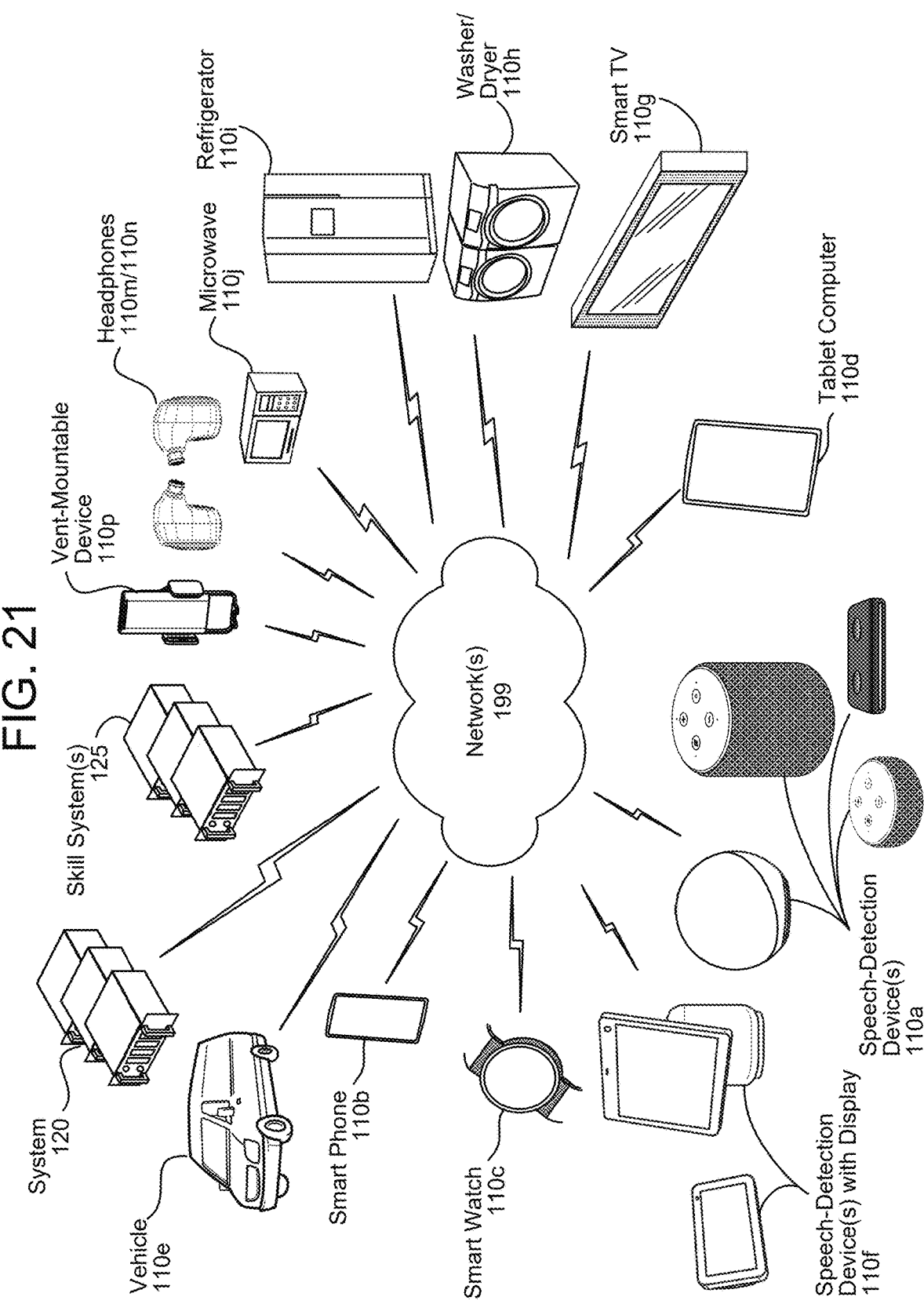

MICROPHONE REFERENCE ECHO CANCELLATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 is a conceptual diagram illustrating a system for echo cancellation, according to embodiments of the present disclosure.

FIGS. 3A and 3B illustrate isolating audio from a direction to focus on a desired audio source according to embodiments of the present disclosure.

FIG. 5 illustrates a filter and sum component according to embodiments of the present disclosure.

FIG. 6 illustrates a multiple FBF/ABF beamformer unit configuration for each beam according to embodiments of the present disclosure.

FIGS. 7A-7B illustrate examples of noise reference signals according to embodiments of the present disclosure.

FIG. 8 is a diagram illustrating rear and front views of a mountable device according to embodiments of the present disclosure.

FIGS. 9A-9B are component diagrams illustrating conceptual examples of performing adaptive interference cancellation according to embodiments of the present disclosure.

FIG. 10 illustrates examples of parameters used during acoustic echo cancellation and microphone reference adaptive interference cancellation according to embodiments of the present disclosure.

FIGS. 15A-15C illustrate examples of determining signal quality metrics and selecting between individual beams and beam sections according to embodiments of the present disclosure.

FIG. 19 is a block diagram conceptually illustrating example components of a device, according to embodiments of the present disclosure.

FIG. 20 is a block diagram conceptually illustrating example components of a system, according to embodiments of the present disclosure.

FIG. 21 illustrates an example of a computer network for use with the overall system, according to embodiments of the present disclosure.

DETAILED DESCRIPTION

Figure 2A:
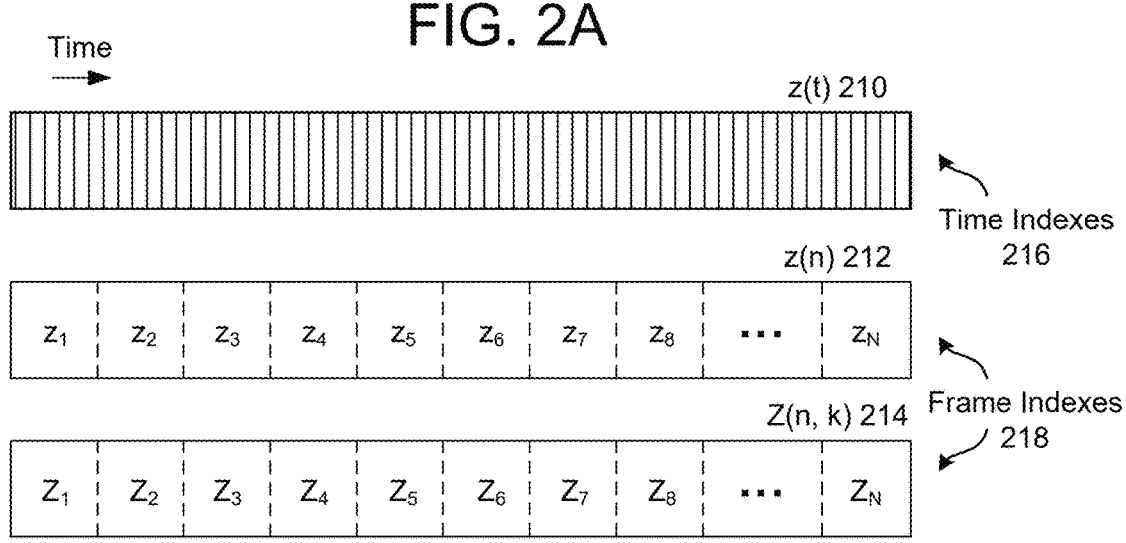
FIGS. 2A-2D illustrate examples of frame indexes, tone indexes, and channel indexes.

Electronic devices may be used to capture audio and process audio data. The audio data may be used for voice commands and/or sent to a remote device as part of a communication session. To process voice commands, the device may attempt to detect speech and sources of noise, such as ambient noise in an environment around the device. Further, the device may perform noise suppression to remove, from the audio data, any undesired noise that may distract from the desired audio the device (for example, user speech) is attempting to capture. An example of ambient noise may be noise caused by wind or an echo signal.

Wind that causes noise may be naturally occurring wind (e.g., outdoors) that may flow towards or cause air to reach near one or more microphones of a device, such as a smartphone or other speech-enabled device. The wind may also be caused by mechanical devices or other devices such as fans, air conditioners, etc. For example, the wind may be caused by a fan system (e.g., a fan associated with heating/air conditioning) of a vehicle (e.g., a car, boat, etc.). The fan system may cause wind by causing air to blow through a vent of the vehicle. A device (e.g., a speech enabled device) with one or more microphones may be vent-mountable and may be positioned in front of the vent of the vehicle. Thus, as the fan blows air through the vent of the vehicle, wind may be generated and may cause noise (e.g., wind noise) to be received by the one or more microphone.

An example of such a device is device 110 shown in FIG. 1 as being mounted in a vehicle interior 130. A further diagram detailing aspects of the device 110 is shown in FIG. 8. Referring now to FIG. 8, a diagram illustrating rear and front views of a mountable device according to embodiments of the present disclosure is shown. The device 110 may be mountable to a vent of a vehicle (e.g., vent-mountable) and may include four microphones. As shown in the rear view of the device 110, microphones 802 and 804 (e.g., rear-facing microphones) may be included as part of (or mounted to) the device 110 and may be rear-facing relative to the device 110. In other words, the microphones 802 and 804 may face the vent of the vehicle when mounted to (or proximate to) the vent. Further, as shown in the rear view of the device 110, microphones 806 and 808 (e.g., rear-facing microphones) may be mounted to the device 110 and may be front-facing relative to the device 110. In other words, the microphones 806 and 808 may face a direction opposite of the vent of the vehicle when mounted to the vent. For example, the microphones 806 and 808 may face an interior of a vehicle. However, the present disclosure is not limited thereto and the device 110 may include additional microphones or other components without departing from the disclosure. Wind may be generated as the fan blows air through the vent of the vehicle and may cause audio corresponding to the wind noise to be received by one or more of the microphones 802, 804, 806, and 808, and particularly by the rear-facing microphones 802 and 804.

Wind noise may be caused by air turbulence close to the one or more microphones 112. For example, air may cling to a boundary layer of the one or more microphones. The boundary layer may be a layer of fluid or gas close to a surface where a resistance to flow (e.g., viscosity) is significant. The noise signals corresponding to the wind noise may approach the microphones (e.g., the microphones 802 and 804) and be received by the microphones. The noise signals may be uncorrelated.

FIG. 1 is a conceptual diagram illustrating a system for echo cancellation, according to embodiments of the present disclosure. As illustrated in FIG. 1, a system 100 may include a device 110 that may be communicatively coupled to a system 120 via network(s) 199, although the disclosure is not limited thereto. The device 110 may include multiple microphones 112 that are used to generate audio data representing speech, such as an utterance generated by a user 5. Thus, the system 100 may perform language processing to the audio data to determine a voice command and/or perform an action in response to the voice command.

As illustrated in FIG. 1, in some examples the device 110 may be mounted to a vent 132 in a vehicle interior 130, although the disclosure is not limited thereto. Referring now to FIG. 8, the device 110 may include multiple microphones 112 such as rear-facing microphones 802 and 804 and front-facing microphones 806 and 808 (not shown in FIG. 1). However, the disclosure is not limited thereto and the device 110 may any number of microphones 112 without departing from the disclosure.

The user 5 may speak and audio corresponding to the speech of user 5 may be received by the microphones 802, 804, 806, and 808, and particularly by the front-facing microphones 806 and 808. Further, air may blow through the vent 132 and may cause audio corresponding to wind noise caused by the air to be received by one or more of the microphones 802, 804, 806, and 808, and particularly by the rear-facing microphones 802 and 804. Similarly, playback audio generated by loudspeaker(s) of the vehicle interior 130 may be received by one or more of the 802, 804, 806, and 808.

The wind noise and/or playback audio may interfere with the detection and/or processing of the speech by the device 110 and/or the system 120 (e.g., via the network(s) 199). The device 110 may perform various operations to account for the wind noise and/or playback audio in order to more accurately detect and/or process the speech (e.g., either locally by the device 110, remotely by the system 120, and/or a combination of local and remote processing). For example, as will be discussed in more detail below, the device 110 may perform operations to suppress noise caused by the playback audio and/or wind by performing acoustic echo cancellation and/or adaptive interference cancellation.

The device 110 may operate using multiple microphones 112, where beamforming techniques may be used to isolate desired audio including speech. In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system.

One technique for beamforming involves boosting audio received from a desired direction while dampening audio received from a non-desired direction. In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

In some examples, the device 110 may receive playback audio data and may generate output audio corresponding to the playback audio data using the one or more loudspeaker(s) 114. While generating the output audio, the device 110 may capture input audio data using the microphones 112. In addition to capturing speech (e.g., the input audio data includes a representation of speech or a representation of an utterance), the device 110 may capture a portion of the output audio generated by the loudspeaker(s) 114 (e.g., representation of playback audio data), which may be referred to as an "echo" or echo signal. Conventional systems isolate the speech in the input audio data by performing acoustic echo cancellation (AEC) to remove the echo signal from the input audio data. For example, conventional acoustic echo cancellation may generate a reference signal based on the playback audio data and may remove the reference signal from the input audio data to generate output audio data representing the speech.

To perform additional noise cancellation, the device 110 may use Adaptive Reference Algorithm (ARA) processing to generate an adaptive reference signal based on the input audio data. To illustrate an example, the ARA processing may perform beamforming using the input audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform AEC processing by removing the reference signal from the target signal. As the input audio data is not limited to the echo signal, the ARA processing may remove other acoustic noise represented in the input audio data in addition to removing the echo. Therefore, the ARA processing may be referred to as performing AEC, adaptive noise cancellation (ANC), and/or adaptive interference cancellation (AIC) (e.g., adaptive acoustic interference cancellation) without departing from the disclosure.

As discussed in greater detail below, the device 110 may include an adaptive beamformer and may be configured to perform AEC/ANC/AIC using the ARA processing to isolate the speech in the input audio data. The adaptive beamformer may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values or signal quality metrics (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the adaptive beamformer may identify the reference signal(s) based on the signal strength values and/or using other inputs without departing from the disclosure. Thus, the target signal(s) and/or the reference signal(s) selected by the adaptive beamformer may vary, resulting in different filter coefficient values over time.

As discussed above, the device 110 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to multiple microphones 112. For example, the beamforming operation may individually filter input audio signals generated by multiple microphones 112 (e.g., first audio data associated with a first microphone 112*a*, second audio data associated with a second microphone 112*b*, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficients associated with specific directions. For example, the device 110 may perform a first directional calculation by applying first filter coefficients to the input audio signals to generate the first beamformed audio data and may perform a second directional calculation by applying second filter coefficients to the input audio signals to generate the second beamformed audio data.

The filter coefficients used to perform the beamforming operation may be calculated offline (e.g., preconfigured ahead of time) and stored in the device 110. For example, the device 110 may store filter coefficients associated with hundreds of different directional calculations (e.g., hundreds of specific directions) and may select the desired filter coefficients for a particular beamforming operation at run-time (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the device 110 stores hundreds of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficients used to generate the first beam.

As described above, in some examples the device 110 may be mounted near a source of wind, such as a vent 132 of the vehicle interior 130, a window of the vehicle interior 130, and/or the like. As a result, the rear-facing microphones (e.g., first microphones 112*a*) of the device 110 may be more exposed to the wind than the front-facing microphones (e.g., second microphones 112*b*), although the disclosure is not limited thereto. Thus, in the presence of wind (e.g., caused by the vent 132), audio signals associated with the rear-facing microphones may have more noise and/or a lower audio quality than audio signals associated with the front-facing microphones. When playback audio is being generated by loudspeaker(s) of the vehicle interior 130, the audio signals associated with the rear-facing microphones may also include a stronger representation of the playback audio. Additionally or alternatively, the audio signals associated with the rear-facing microphones may include a weaker representation of speech as the rear-facing microphones are pointed away from the user 5.

In order to improve an audio quality of output audio data, the device 110 may perform adaptive interference cancellation (AIC) processing using a microphone signal as reference when the playback audio data is not available. Thus, when the playback audio data is available, the device 110 may use the playback audio data as a reference while performing Acoustic Echo Cancellation (AEC) processing. When the playback audio data is not available, however, the device 110 may instead use microphone audio signal(s) as the reference while performing Adaptive Interference Cancellation (AIC) processing. For example, the device may use first audio data generated by first microphones as the reference while performing AIC processing on the first audio data and second audio data generated by second microphones. As the adaptive filter used to perform AIC processing is updated at a slower rate, the reference signal only cancels stationary portions of the first audio data (e.g., noise), leaving a representation of transient sounds such as speech. In some examples, the device may perform AIC processing and AEC processing in series.

As illustrated in FIG. 1, the device 110 may receive (130) first audio data from first microphones 112a and receive (132) second audio data from second microphones 112b. For example, the first microphones 112a may correspond to rear-facing microphones (e.g., 802/804) and the second microphones 112b may correspond to front-facing microphones (e.g., 806/808), although the disclosure is not limited thereto.

The device 110 may select (134) an adaptive reference signal from the first audio data and/or the second audio data and may perform (136) adaptive interference cancellation (AIC) processing to generate third audio data. For example, the device 110 may input the first audio data and the second audio data to an adaptive filter and select a portion of the first audio data and/or second audio data as the adaptive reference signal for the adaptive filter, enabling the adaptive filter to generate the third audio data, as described in greater detail below with regard to FIG. 9B. The device 110 may perform AIC processing separately for each microphone 112 included in the device 110.

After generating the third audio data, the device 110 may perform (138) adaptive beamforming using the third audio data to generate output audio data. For example, the adaptive beamforming may generate a first plurality of beams corresponding to a plurality of directions and select target signal(s) and reference signal(s) from the plurality of beams. To illustrate an example, the device 110 may select first beamformed audio data as a target signal, may select second beamformed audio data as a reference signal, and may generate a portion of the output audio data by removing at least a portion of the second beamformed audio data from the first beamformed audio data. While this example illustrates the device 110 selecting a single target signal and a single reference signal, the disclosure is not limited thereto and the device 110 may determine one or more target signal(s) and/or one or more reference signal(s) without departing from the disclosure. As part of adaptive beamforming, the device 110 may perform beam merging to generate the output audio data. For example, the device 110 may perform beam merging based on signal quality metrics, such as signal-to-noise ratio (SNR) values, in order to select one or more beams and/or determine weight values with which to generate the output audio data using a weighted sum of the beams. However, the disclosure is not limited thereto and the device 110 may perform beam merging using other techniques without departing from the disclosure.

After generating the output audio data, the device 110 may cause (146) speech processing to be performed on the output audio data, as described in greater detail below with regard to FIG. 18.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

FIGS. 2A-2D illustrate examples of frame indexes, tone indexes, and channel indexes. As described above, the device 110 may generate microphone audio data z(t) using microphone(s) 112. For example, a first microphone may generate first microphone audio data $z_1(t)$ in the time-domain, a second microphone may generate second microphone audio data $z_2(t)$ in the time-domain, and so on. As illustrated in FIG. 2A, a time-domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame to generate microphone audio data z(n) 212. As used herein, a variable z(n) corresponds to the time-domain signal and identifies an individual frame (e.g., fixed number of samples s) associated with a frame index n.

In some examples, the device 110 may convert microphone audio data z(t) 210 from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) 210 as a first time-domain signal associated with a first subband (e.g., first frequency range), a second bandpass filter may output a second portion of the microphone audio data z(t) 210 as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) 210 in the time-domain to microphone audio data z(t, k) in the subband-domain. However, the disclosure is not limited thereto, and the device 110 may convert microphone audio data z(n) 212 in the time-domain to microphone audio data z(n, k) the subband-domain without departing from the disclosure.

Additionally or alternatively, the device 110 may convert microphone audio data z(n) 212 from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) 214 in the frequency-domain. As used herein, a variable Z(n, k) corresponds to the frequency-domain signal and identifies an individual frame associated with frame index n and tone index k. As illustrated in FIG. 2A, the microphone audio data z(t) 212 corresponds to time indexes 216, whereas the microphone audio data z(n) 212 and the microphone audio data Z(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time-domain and microphone audio data Z(n, k) 216 in the frequency-domain). For example, the system 100 may apply FFT processing to the time-domain microphone audio data z(n) 212, producing the frequency-domain microphone audio data Z(n, k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
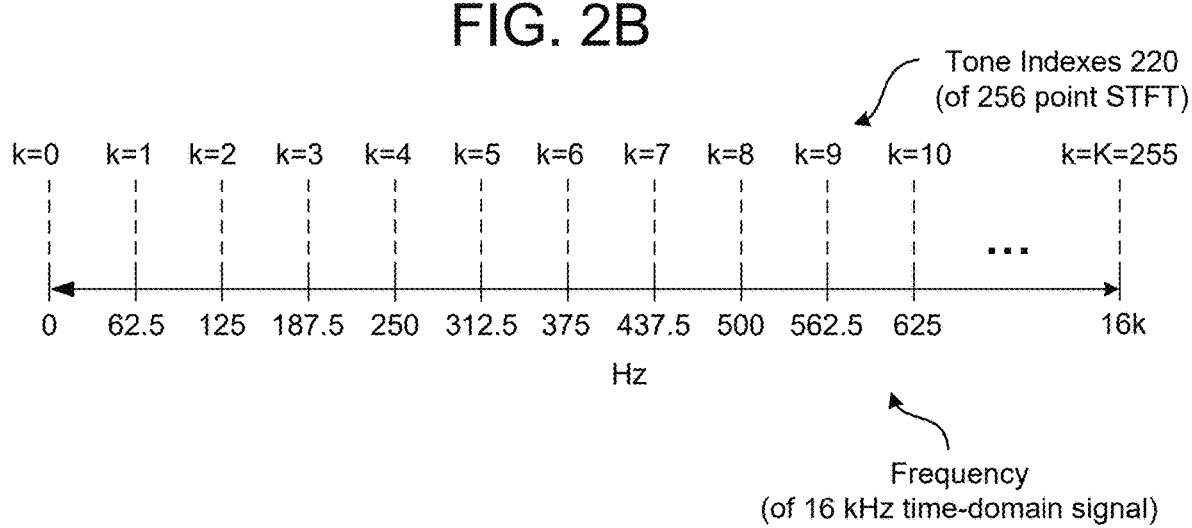

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different frequency ranges (e.g., tone indexes), the disclosure is not limited thereto and the system 100 may divide the frequency range into K different frequency ranges (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
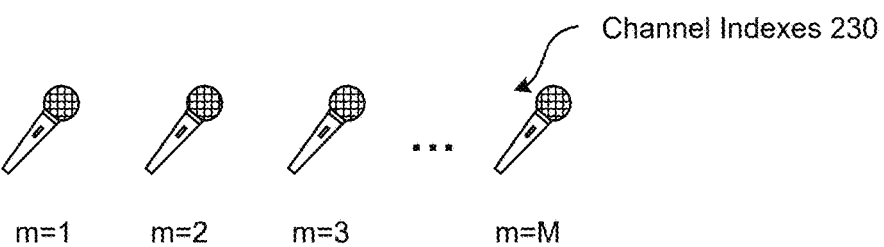

The system 100 may include multiple microphones 112, with a first channel m corresponding to a first microphone (e.g., m=1), a second channel (m+1) corresponding to a second microphone (e.g., m=2), and so on until a final channel (M) that corresponds to final microphone (e.g., m=M). FIG. 2C illustrates channel indexes 230 including a plurality of channels from channel m=1 to channel m=M. While an individual device 110 may include multiple microphones 112, during a communication session the device 110 may select a single microphone and generate microphone audio data using the single microphone. However, while many drawings illustrate a single channel (e.g., one microphone), the disclosure is not limited thereto and the number of channels may vary. For the purposes of discussion, an example of system 100 may include "M" microphones (M≥1) for hands free near-end/far-end distant speech recognition applications.

While FIGS. 2A-2D are described with reference to the microphone audio data z(t), the disclosure is not limited thereto and the same techniques apply to the playback audio data x(t) (e.g., reference audio data) without departing from the disclosure. Thus, playback audio data x(t) indicates a specific time index t from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to loudspeaker(s) using a wired and/or wireless connection, the playback audio data x(n) may not be synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data z(n) and the playback audio data x(n) in order to synchronize the microphone audio data z(n) and the playback audio data x(n). However, performing nonlinear modifications to the microphone audio data z(n) results in first microphone audio data $z_1(n)$ associated with a first microphone to no longer be synchronized with second microphone audio data $z_2(n)$ associated with a second microphone. Thus, the device 110 may instead modify only the playback audio data x(n) so that the playback audio data x(n) is synchronized with the first microphone audio data $z_1(n)$.

While FIG. 2A illustrates the frame indexes 218 as a series of distinct audio frames, the disclosure is not limited thereto. In some examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n−1 previous audio frames) corresponding to the fixed time window. Thus, subsequent power calculations include n overlapping audio frames.

Figure 2D:
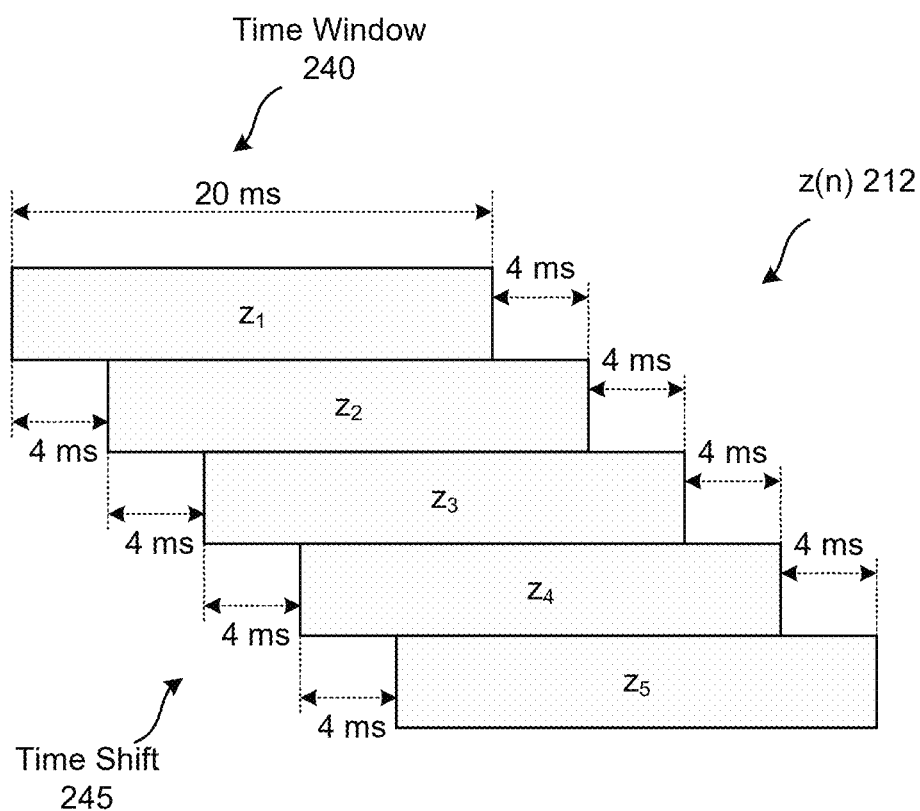

As illustrated in FIG. 2D, overlapping audio frames may be represented as overlapping audio data associated with a time window 240 (e.g., 20 ms) and a time shift 245 (e.g., 4 ms) between neighboring audio frames. For example, a first audio frame x1 may extend from 0 ms to 20 ms, a second audio frame x2 may extend from 4 ms to 24 ms, a third audio frame x3 may extend from 8 ms to 28 ms, and so on. Thus, the audio frames overlap by 80%, although the disclosure is not limited thereto and the time window 240 and the time shift 245 may vary without departing from the disclosure.

The device 110 may include multiple microphones 112 configured to capture sound and pass the resulting audio signal created by the sound to a downstream component, such as an analysis filterbank discussed below. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Figure 3A:
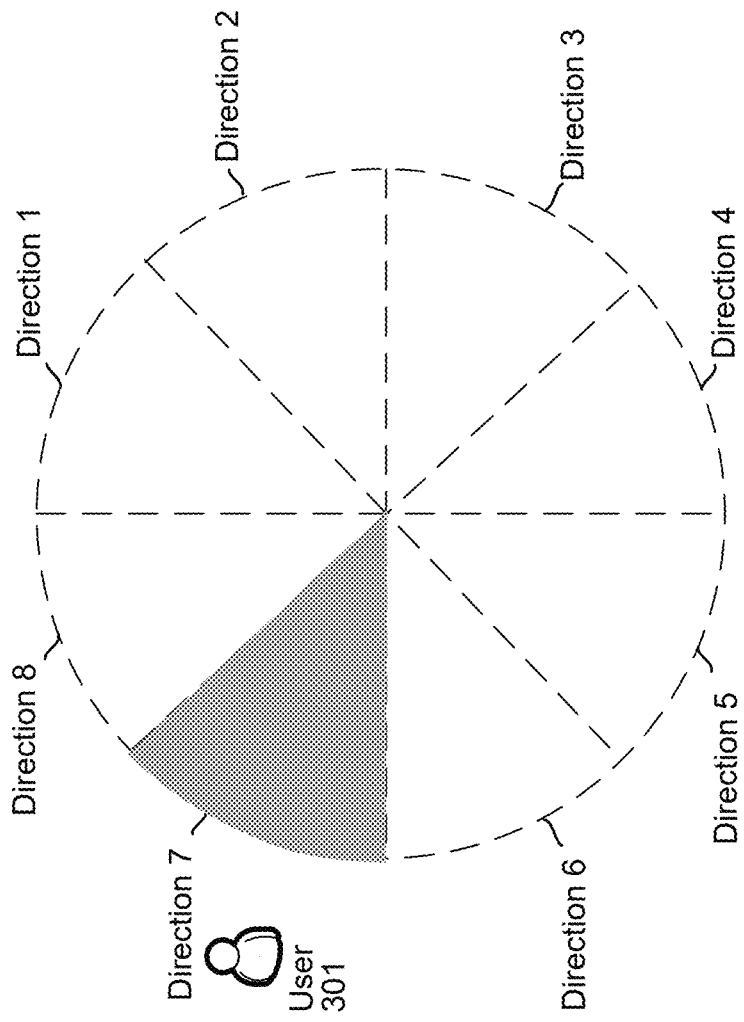

Using such direction isolation techniques, a device 110 may isolate directionality of audio sources. As shown in FIG. 3A, a particular direction may be associated with azimuth angles divided into bins (e.g., 0-45 degrees, 46-90 degrees, and so forth). To isolate audio from a particular direction, the device 110 may apply a variety of audio filters to the output of the microphones where certain audio is boosted while other audio is dampened, to create isolated audio corresponding to a particular direction, which may be referred to as a beam. While in some examples the number of beams may correspond to the number of microphones, the disclosure is not limited thereto and the number of beams may be independent of the number of microphones 112. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, as explained below.

The device 110 may use various techniques to determine the beam corresponding to the look-direction. For example, the device 110 may use techniques (either in the time domain or in the sub-band domain) such as calculating a signal-to-noise ratio (SNR) for each beam, performing voice activity detection (VAD) on each beam, or the like, although the disclosure is not limited thereto. In the example illustrated in FIG. 3A, the device 110 may determine that speech represented in the audio data corresponds to direction 7.

After identifying the look-direction associated with the speech, the device 110 may use a FBF unit or other such component to isolate audio coming from the look-direction using techniques known to the art and/or explained herein. Thus, as shown in FIG. 3A, the device 110 may boost audio coming from direction 7, thus increasing the amplitude of audio data corresponding to speech from user 301 relative to other audio captured from other directions. In this manner, noise from diffuse sources that is coming from all the other directions will be dampened relative to the desired audio (e.g., speech from user 301) coming from direction 7.

One drawback to the FBF unit approach is that it may not function as well in dampening/canceling noise from a noise source that is not diffuse, but rather coherent and focused from a particular direction. For example, as shown in FIG. 3B, a noise source 302 may be coming from direction 5 but may be sufficiently loud that noise canceling/beamforming techniques using an FBF unit alone may not be sufficient to remove all the undesired audio coming from the noise source 302, thus resulting in an ultimate output audio signal determined by the device 110 that includes some representation of the desired audio resulting from user 301 (e.g., representation of an utterance) but also some representation of the undesired audio resulting from noise source 302 (e.g., representation of playback audio data).

Figure 4:
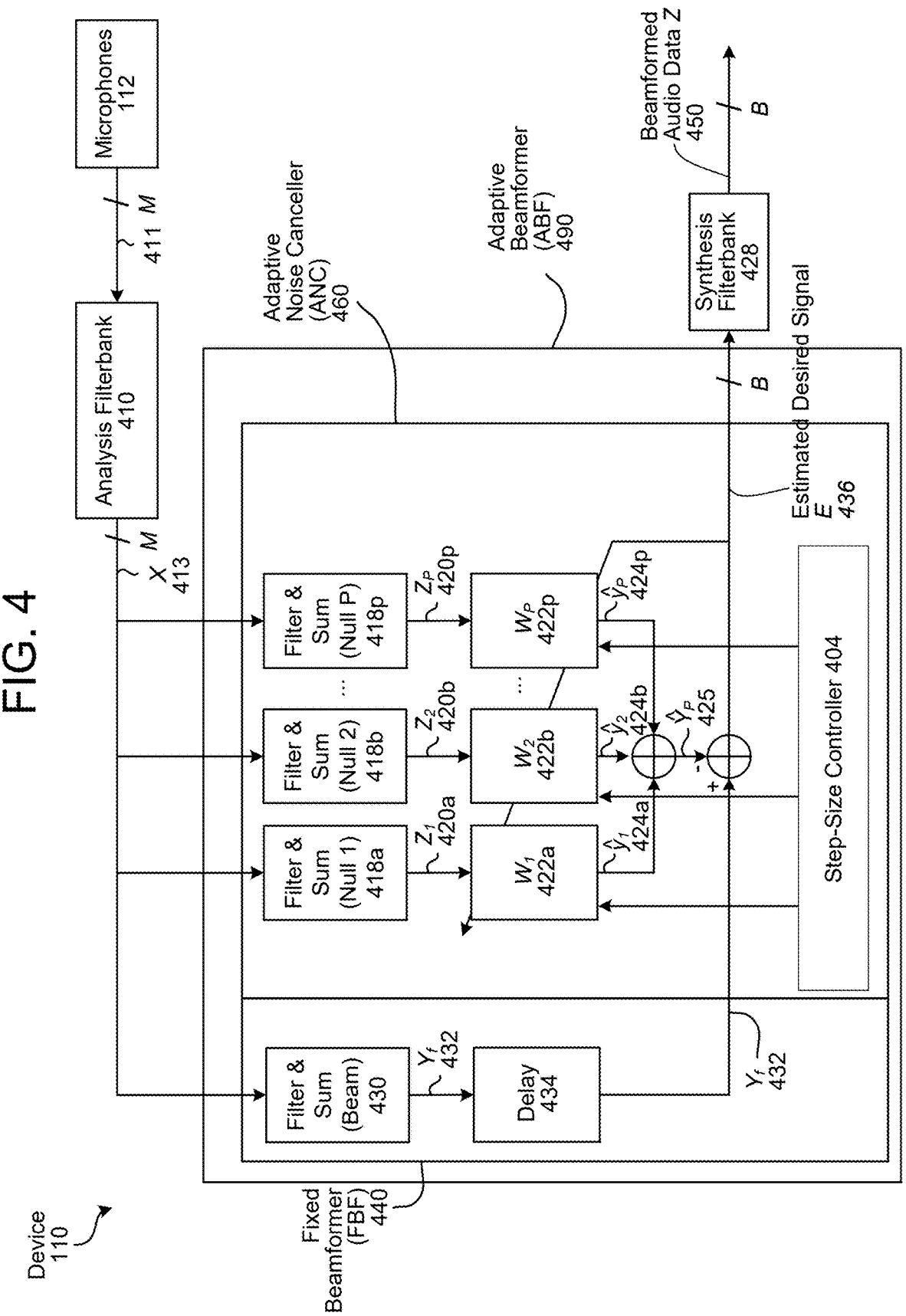
FIG. 4 illustrates a beamforming device that combines a fixed beamformer unit and an adaptive beamformer unit according to embodiments of the present disclosure.

FIG. 4 illustrates a high-level conceptual block diagram of a device 110 configured to performing beamforming using a fixed beamformer unit and an adaptive noise canceller that can remove noise from particular directions using adaptively controlled coefficients which can adjust how much noise is cancelled from particular directions. The FBF unit 440 may be a separate component or may be included in another component such as an adaptive beamformer (ABF) unit 490. As explained below, the FBF unit may operate a filter and sum component 430 to isolate the first audio signal from the direction of an audio source.

The device 110 may also operate an adaptive noise canceller (ANC) unit 460 to amplify audio signals from directions other than the direction of an audio source. Those audio signals represent noise signals so the resulting amplified audio signals from the ABF unit may be referred to as noise reference signals 420, discussed further below. The device 110 may then weight the noise reference signals, for example using filters 422 discussed below. The device may combine the weighted noise reference signals 424 into a combined (weighted) noise reference signal 425. Alternatively the device may not weight the noise reference signals and may simply combine them into the combined noise reference signal 425 without weighting. The device may then subtract the combined noise reference signal 425 from the amplified first audio signal 432 to obtain a difference 436. The device may then output that difference, which represents the desired output audio signal with the noise removed. The diffuse noise is removed by the FBF unit when determining the signal 432 and the directional noise is removed when the combined noise reference signal 425 is subtracted. The device may also use the difference to create updated weights (for example for filters 422) to create updated weights that may be used to weight future audio signals. The step-size controller 404 may be used modulate the rate of adaptation from one weight to an updated weight.

In this manner noise reference signals are used to adaptively estimate the noise contained in the output signal of the FBF unit using the noise-estimation filters 422. This noise estimate is then subtracted from the FBF unit output signal to obtain the final ABF unit output signal. The ABF unit output signal is also used to adaptively update the coefficients of the noise-estimation filters. Lastly, we make use of a robust step-size controller to control the rate of adaptation of the noise estimation filters.

As shown in FIG. 4, input audio data 411 captured by the microphones 112 may be input into an analysis filterbank 410. The filterbank 410 may include a uniform discrete Fourier transform (DFT) filterbank which converts input audio data 411 in the time domain into microphone outputs 413 in the sub-band domain. The audio signal X may incorporate audio signals corresponding to multiple different microphones as well as different sub-bands (i.e., frequency ranges) as well as different frame indices (i.e., time ranges). Thus the audio signal from the mth microphone may be represented as $X_m(k,n)$, where k denotes the sub-band index and n denotes the frame index. The combination of all audio signals for all microphones for a particular sub-band index frame index may be represented as $X(k,n)$.

The microphone outputs 413 may be passed to the FBF unit 440 including the filter and sum unit 430. The FBF unit 440 may be implemented as a robust super-directive beamformer unit, delayed sum beamformer unit, or the like. The FBF unit 440 is presently illustrated as a super-directive beamformer (SDBF) unit due to its improved directivity properties. The filter and sum unit 430 takes the audio signals from each of the microphones and boosts the audio signal from the microphone associated with the desired look direction and attenuates signals arriving from other microphones/directions. The filter and sum unit 430 may operate as illustrated in FIG. 5. In some examples, the filter and sum unit 430 may be configured to match the number of microphones 112 included in the device 110. For example, for a device 110 with eight microphones 112a-112h, the filter and sum unit may have eight filter blocks 512. The input audio signals $x_1$ 411a through $x_8$ 411h for each microphone (e.g., microphones 1 through 8) are received by the filter and sum unit 430. The audio signals $x_1$ 411a through $x_8$ 411h correspond to individual microphones 502a through 502h, for example audio signal $x_1$ 411a corresponds to microphone 502a, audio signal $x_2$ 411b corresponds to microphone 502b and so forth. Although shown as originating at the microphones, the audio signals $x_1$ 411a through $x_8$ 411h may be in the sub-band domain and thus may actually be output by the analysis filterbank before arriving at the filter and sum component 430. Each filter block 512 is also associated with a particular microphone. Each filter block is configured to either boost (e.g., increase) or dampen (e.g., decrease) its respective incoming audio signal by the respective beamformer filter coefficient h depending on the configuration of the FBF unit. Each resulting filtered audio signal y 513 will be the audio signal x 411 weighted by the beamformer filter coefficient h of the filter block 512. For example, $y_1=x_1*h_1$, $y_2=x_2*h_2$, and so forth. The filter coefficients are configured for a particular FBF unit associated with a particular beam.

As illustrated in FIG. 6, the adaptive beamformer (ABF) unit 490 configuration (including the FBF unit 440 and the ANC unit 460) illustrated in FIG. 4, may be implemented multiple times in a single device 110. The number of adaptive beamformer (ABF) unit 490 blocks may correspond to the number of beams B. For example, if there are eight beams, there may be eight FBF units 440 and eight ANC units 460. Each adaptive beamformer (ABF) unit 490 may operate as described in reference to FIG. 4, with an individual output E 436 for each beam created by the respective adaptive beamformer (ABF) unit 490. Thus, B different outputs 436 may result. For device configuration purposes, there may also be B different other components, such as the synthesis filterbank 428, but that may depend on device configuration. Each individual adaptive beamformer (ABF) unit 490 may result in its own beamformed audio data Z 450, such that there may be B different beamformed audio data portions Z 450. Each beam's respective beamformed audio data Z 450 may be in a format corresponding to an input audio data 411 or in an alternate format. For example, the input audio data 411 and/or the beamformed audio data Z 450 may be sampled at a rate corresponding to 16 kHz and a mono-channel at 16 bits per sample, little endian format. Audio data in little endian format corresponds to storing the least significant byte of the audio data in the smallest address, as opposed to big endian format where the most significant byte of the audio data is stored in the smallest address.

Each particular FBF unit may be tuned with filter coefficients to boost audio from one of the particular beams. For example, FBF unit 440-1 may be tuned to boost audio from beam 1, FBF unit 440-2 may be tuned to boost audio from beam 2 and so forth. If the filter block is associated with the particular beam, its beamformer filter coefficient h will be high whereas if the filter block is associated with a different beam, its beamformer filter coefficient h will be lower. For example, for FBF unit 440-7, direction 7, the beamformer filter coefficient $h_7$ for filter 512g may be high while beamformer filter coefficients $h_1$-$h_6$ and $h_8$ may be lower. Thus the filtered audio signal $y_7$ will be comparatively stronger than the filtered audio signals $y_1$-$y_6$ and $y_8$ thus boosting audio from direction 7 relative to the other directions. The filtered audio signals will then be summed together to create the output audio signal The filtered audio signals will then be summed together to create the output audio signal $Y_f$ 432. Thus, the FBF unit 440 may phase align microphone audio data toward a give n direction and add it up. So signals that are arriving from a particular direction are reinforced, but signals that are not arriving from the look direction are suppressed. The robust FBF coefficients are designed by solving a constrained convex optimization problem and by specifically taking into account the gain and phase mismatch on the microphones.

The individual beamformer filter coefficients may be represented as $H_{BF,m}(r)$, where r=0, .... R, where R denotes the number of beamformer filter coefficients in the subband domain. Thus, the output $Y_f$ 432 of the filter and sum unit 430 may be represented as the summation of each microphone signal filtered by its beamformer coefficient and summed up across the M microphones:

$$Y(k, n) = \sum_{m=1}^{M}\sum_{r=0}^{R} H_{BF,m}(r)X_m(k, n-r) \qquad (1)$$

Turning once again to FIG. 4, the output $Y_f$ 432, expressed in Equation 1, may be fed into a delay component 434, which delays the forwarding of the output Y until further adaptive noise canceling functions as described below may be performed. One drawback to output $Y_f$ 432, however, is that it may include residual directional noise that was not canceled by the FBF unit 440. To remove that directional noise, the device 110 may operate an adaptive noise canceller (ANC) unit 460 which includes components to obtain the remaining noise reference signal which may be used to remove the remaining noise from output Y.

As shown in FIG. 4, the adaptive noise canceller may include a number of nullformer blocks 418*a* through 418*p*. The device 110 may include P number of nullformer blocks 418 where P corresponds to the number of channels, where each channel corresponds to a direction in which the device may focus the nullformers 418 to isolate detected noise. The number of channels P is configurable and may be predetermined for a particular device 110. Each nullformer block is configured to operate similarly to the filter and sum block 430, only instead of the filter coefficients for the nullformer blocks being selected to boost the look ahead direction, they are selected to boost one of the other, non-look ahead directions. Thus, for example, nullformer 418*a* is configured to boost audio from direction 1, nullformer 418*b* is configured to boost audio from direction 2, and so forth. Thus, the nullformer may actually dampen the desired audio (e.g., speech) while boosting and isolating undesired audio (e.g., noise). For example, nullformer 418*a* may be configured (e.g., using a high filter coefficient $h_1$ 512*a*) to boost the signal from microphone 502*a*/direction 1, regardless of the look ahead direction. Nullformers 418*b* through 418*p* may operate in similar fashion relative to their respective microphones/directions, though the individual coefficients for a particular channel's nullformer in one beam pipeline may differ from the individual coefficients from a nullformer for the same channel in a different beam's pipeline. The output Z 420 of each nullformer 418 will be a boosted signal corresponding to a non-desired direction. As audio from non-desired direction may include noise, each signal Z 420 may be referred to as a noise reference signal. Thus, for each channel 1 through P the adaptive noise canceller (ANC) unit 460 calculates a noise reference signal Z 420, namely $Z_1$ 420*a* through $Z_P$ 420*p*. Thus, the noise reference signals that are acquired by spatially focusing towards the various noise sources in the environment and away from the desired look-direction. The noise reference signal for channel p may thus be represented as $Z_p$(k,n) where $Z_P$ is calculated as follows:

$$Z_p(k, n) = \sum_{m=1}^{M}\sum_{r=0}^{R} H_{NF,m}(p, r)X_m(k, n-r) \qquad (2)$$

where $H_{NF,m}$(p,r) represents the nullformer coefficients for reference channel p.

As described above, the coefficients for the nullformer filters 512 are designed to form a spatial null toward the look ahead direction while focusing on other directions, such as directions of dominant noise sources (e.g., noise source 302). The output from the individual nullformers $Z_1$ 420*a* through $Z_P$ 420*p* thus represent the noise from channels 1 through P.

The individual noise reference signals may then be filtered by noise estimation filter blocks 422 configured with weights W to adjust how much each individual channel's noise reference signal should be weighted in the eventual combined noise reference signal $\hat{Y}$ 425. The noise estimation filters (further discussed below) are selected to isolate the noise to be removed from output $Y_f$ 432. The individual channel's weighted noise reference signal $\hat{y}$ 424 is thus the channel's noise reference signal Z multiplied by the channel's weight W. For example, $\hat{y}_1=\hat{Z}_1*\hat{W}_1$, $\hat{y}_2=Z_2*W_2$, and so forth. Thus, the combined weighted noise estimate $\hat{Y}$ 425 may be represented as:

$$\hat{Y}_P(k, n) = \sum_{l=0}^{L} W_P(k, n, l)Z_P(k, n-l) \qquad (3)$$

where $W_p$(k,n,l) is the l th element of $W_p$(k,n) and/denotes the index for the filter coefficient in subband domain. The noise estimates of the P reference channels are then added to obtain the overall noise estimate:

$$\hat{Y}(k, n) = \sum_{p=1}^{P} \hat{Y}_p(k, n) \qquad (4)$$

The combined weighted noise reference signal $\hat{Y}$ 425, which represents the estimated noise in the audio signal, may then be subtracted from the FBF unit output $Y_f$ 432 to obtain a signal E 436, which represents the error between the combined weighted noise reference signal $\hat{Y}$ 425 and the FBF unit output $Y_f$ 432. That error, E 436, is thus the estimated desired non-noise portion (e.g., target signal portion) of the audio signal and may be the output of the adaptive noise canceller (ANC) unit 460. That error, E 436, may be represented as:

$$E(k,n)=Y(k,n)-\hat{Y}(k,n) \qquad (5)$$

As shown in FIG. 4, the ABF unit output signal 436 may also be used to update the weights W of the noise estimation filter blocks 422 using sub-band adaptive filters, such as with a normalized least mean square (NLMS) approach:

$$W_p(k, n) = W_p(k, n-1) + \frac{\mu_p(k, n)}{\|Z_p(k, n)\|^2 + \varepsilon} Z_p(k, n)E(k, n) \qquad (6)$$

where $Z_p(k,n)=[Z_p(k,n)\ Z_p(k,n-1)\ \ldots\ Z(k,n-L)]^T$ is the noise estimation vector for the pth channel, $\mu_p(k,n)$ is the adaptation step-size for the pth channel, and $\varepsilon$ is a regularization factor to avoid indeterministic division. The weights may correspond to how much noise is coming from a particular direction.

As can be seen in Equation 6, the updating of the weights W involves feedback. The weights W are recursively updated by the weight correction term (the second half of the right hand side of Equation 6) which depends on the adaptation step size, $\mu_p(k,n)$, which is a weighting factor adjustment to be added to the previous weighting factor for the filter to obtain the next weighting factor for the filter (to be applied to the next incoming signal). To ensure that the weights are updated robustly (to avoid, for example, target signal cancellation) the step size $\mu_p(k,n)$ may be modulated according to signal conditions. For example, when the desired signal arrives from the look-direction, the step-size is significantly reduced, thereby slowing down the adaptation process and avoiding unnecessary changes of the weights W. Likewise, when there is no signal activity in the look-direction, the step-size may be increased to achieve a larger value so that weight adaptation continues normally. The step-size may be greater than 0, and may be limited to a maximum value. Thus, the device may be configured to determine when there is an active source (e.g., a speaking user) in the look-direction. The device may perform this determination with a frequency that depends on the adaptation step size.

The step-size controller 404 will modulate the rate of adaptation. Although not shown in FIG. 4, the step-size controller 404 may receive various inputs to control the step size and rate of adaptation including the noise reference signals 420, the FBF unit output $Y_f$ 432, the previous step size, the nominal step size (described below) and other data. The step-size controller may calculate Equations 6-13 below. In particular, the step-size controller 404 may compute the adaptation step-size for each channel p, sub-band k, and frame n. To make the measurement of whether there is an active source in the look-direction, the device may measure a ratio of the energy content of the beam in the look direction (e.g., the look direction signal in output $Y_f$ 432) to the ratio of the energy content of the beams in the non-look directions (e.g., the non-look direction signals of noise reference signals $Z_1$ 420a through $Z_P$ 420p). This may be referred to as a beam-to-null ratio (BNR). For each subband, the device may measure the BNR. If the BNR is large, then an active source may be found in the look direction, if not, an active source may not be in the look direction.

The BNR may be computed as:

$$BNR_p(k,n) = \frac{B_{YY}(k,n)}{N_{ZZ,p}(k,n)+\delta}, k \in [k_{LB}, k_{UB}] \quad (7)$$

where, $k_{LB}$ denotes the lower bound for the subband range bin and $k_{UB}$ denotes the upper bound for the subband range bin under consideration, and $\delta$ is a regularization factor. Further, $B_{YY}(k,n)$ denotes the powers of the fixed beamformer output signal (e.g., output $Y_f$ 432) and $N_{ZZ,p}(k,n)$ denotes the powers of the pth nullformer output signals (e.g., the noise reference signals $Z_1$ 420a through $Z_P$ 420p). The powers may be calculated using first order recursive averaging as shown below:

$$B_{YY}(k,n)=\alpha B_{YY}(k,n-1)+(1-\alpha)|Y(k,n)|^2$$

$$N_{ZZ,p}(k,n)=\alpha N_{ZZ,p}(k,n-1)+(1-\alpha)|Z_p(k,n)|^2 \quad (8)$$

where, $\alpha \in [0,1]$ is a smoothing parameter.

The BNR values may be limited to a minimum and maximum value as follows:

$$BNR_p(k,n) \in [BNR_{min}, BNR_{max}]$$

the BNR may be averaged across the subband bins:

$$BNR_p(n) = \frac{1}{(k_{UB}-k_{LB}+1)} \sum_{k_{LB}}^{k_{UB}} BNR_p(k,n) \quad (9)$$

the above value may be smoothed recursively to arrive at the mean BNR value:

$$\overline{BNR}_p(n)=\beta\overline{BNR}_p(n-1)+(1-\beta)BNR_p(n) \quad (10)$$

where $\beta$ is a smoothing factor.

The mean BNR value may then be transformed into a scaling factor in the interval of [0,1] using a sigmoid transformation:

$$\xi(n) = 1 - 0.5\left(1 + \frac{v(n)}{1+|v(n)|}\right) \quad (11)$$

where $v(n)=\gamma(\overline{BNR}_p(n)-\sigma)$ (12)

and $\gamma$ and $\sigma$ are tunable parameters that denote the slope ($\gamma$) and point of inflection ($\sigma$), for the sigmoid function.

Using Equation 11, the adaptation step-size for subband k and frame-index n is obtained as:

$$\mu_p(k,n) = \xi(n)\left(\frac{N_{ZZ,p}(k,n)}{B_{YY}(k,n)+\delta}\right)\mu_o \quad (13)$$

where $\mu_o$ is a nominal step-size. $\mu_o$ may be used as an initial step size with scaling factors and the processes above used to modulate the step size during processing.

At a first time period, audio signals from the microphones 112 may be processed as described above using a first set of weights for the filters 422. Then, the error E 436 associated with that first time period may be used to calculate a new set of weights for the filters 422, where the new set of weights is determined using the step size calculations described above. The new set of weights may then be used to process audio signals from the microphones 112 associated with a second time period that occurs after the first time period. Thus, for example, a first filter weight may be applied to a noise reference signal associated with a first audio signal for a first microphone/first direction from the first time period. A new first filter weight may then be calculated using the method above and the new first filter weight may then be applied to a noise reference signal associated with the first audio signal for the first microphone/first direction from the second time period. The same process may be applied to other filter weights and other audio signals from other microphones/directions.

The above processes and calculations may be performed across sub-bands k, across channels p and for audio frames n, as illustrated in the particular calculations and equations.

The estimated non-noise (e.g., output) audio signal E 436 may be processed by a synthesis filterbank 428 which converts the signal 436 into time-domain beamformed audio data Z 450 which may be sent to a downstream component for further operation. As illustrated in FIG. 6, there may be one component audio signal E 436 for each beam, thus for B beams there may be B audio signals E 436. Similarly, there may be one stream of beamformed audio data Z 450 for each beam, thus for B beams there may be B beamformed audio signals B 450. For example, a first beamformed audio signal may correspond to a first beam and to a first direction, a second beamformed audio signal may correspond to a second beam and to a second direction, and so forth.

As shown in FIGS. 4 and 6, the input audio data from the microphones 112 may include audio data 411 for each microphone 0 through M in the time domain, which may be converted by the analysis filterbank into spectral domain audio signals X 413 for each microphone 0 through M. The beamformer unit may then convert the audio signals X 413 into beamformer output signals E 436 in the spectral domain, with one signal for each beam 0 through B. The synthesis filterbank may then may convert the signals E 436 into time domain beamformer audio data Z 450, with one set of audio data Z 450 for each beam 0 through B.

Figure 7B:
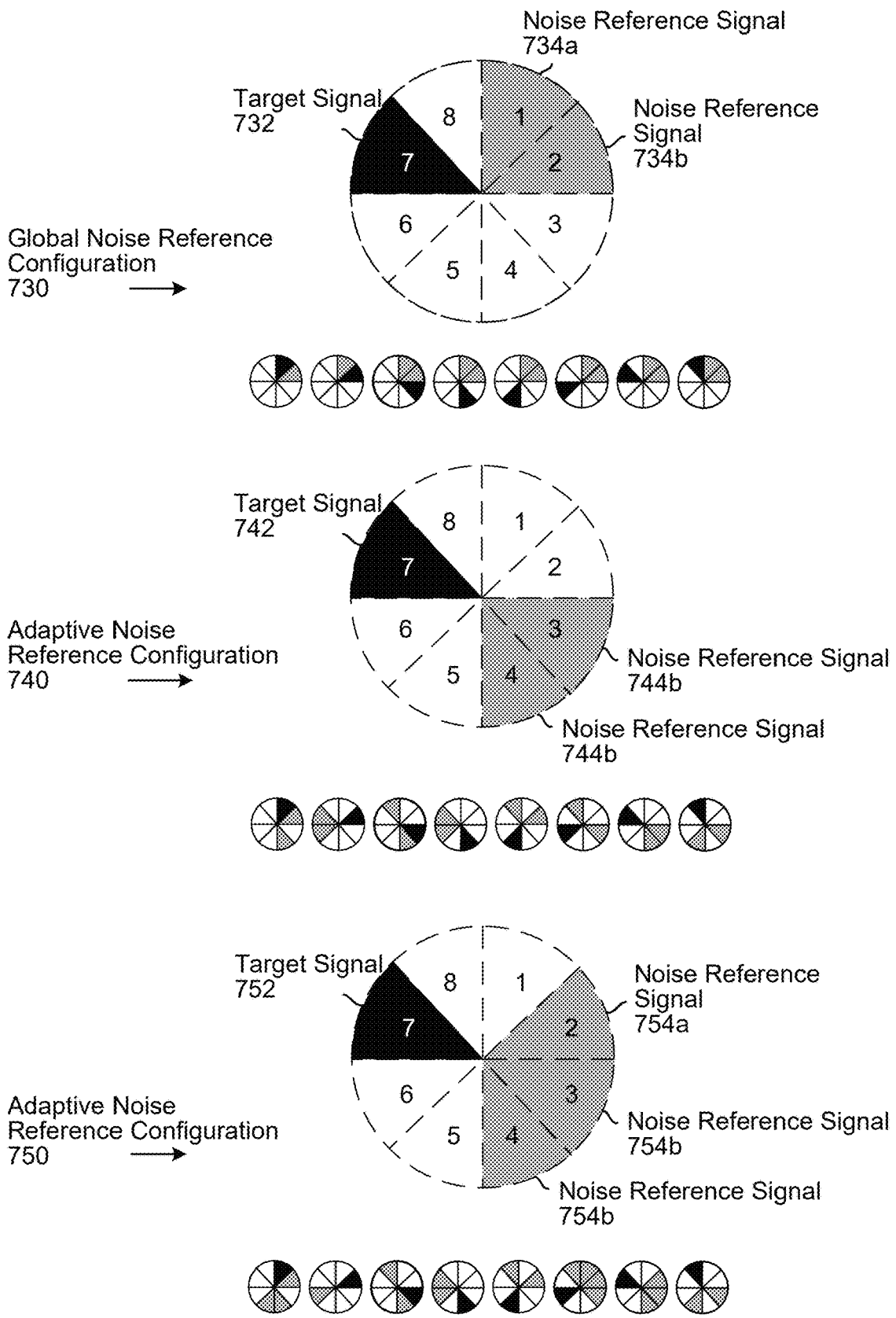

FIGS. 7A-7B illustrate examples of noise reference signals according to embodiments of the present disclosure. The device 110 may determine the noise reference signal(s) using a variety of techniques. In some examples, the device 110 may use the same noise reference signal(s) for each of the directional outputs. For example, the device 110 may select a first directional output associated with a particular direction as a noise reference signal and may determine the signal quality metric for each of the directional outputs by dividing a power value associated with an individual directional output by a power value associated with the first directional output (e.g., noise power level). Thus, the device 110 may determine a first signal quality metric by dividing a first power level associated with a second directional output by the noise power level, may determine a second signal quality metric by dividing a second power level associated with a third directional output by the noise power level, and so on. As the noise reference signal is the same for each of the directional outputs, instead of determining a ratio the device 110 may use the power level associated with each of the directional outputs as the signal quality metrics.

In some examples, each directional output may be associated with unique noise reference signal(s). To illustrate an example, the device 110 may determine the noise reference signal(s) using a fixed configuration based on the directional output. For example, the device 110 may select a first directional output (e.g., Direction 1) and may choose a second directional output (e.g., Direction 5, opposite Direction 1 when there are eight beams corresponding to eight different directions) as a first noise reference signal for the first directional output, may select a third directional output (e.g., Direction 2) and may choose a fourth directional output (e.g., Direction 6) as a second noise reference signal for the third directional output, and so on. This is illustrated in FIG. 7A as a single fixed noise reference configuration 710.

As illustrated in FIG. 7A, in the single fixed noise reference configuration 710, the device 110 may select a seventh directional output (e.g., Direction 7) as a target signal 712 and select a third directional output (e.g., Direction 3) as a noise reference signal 714. The device 110 may continue this pattern for each of the directional outputs, using Direction 1 as a target signal and Direction 5 as a noise reference signal, Direction 2 as a target signal and Direction 6 as a noise reference signal, Direction 3 as a target signal and Direction 7 as a noise reference signal, Direction 4 as a target signal and Direction 8 as a noise reference signal, Direction 5 as a target signal and Direction 1 as a noise reference signal, Direction 6 as a target signal and Direction 2 as a noise reference signal, Direction 7 as a target signal and Direction 3 as a noise reference signal, and Direction 8 as a target signal and Direction 4 as a noise reference signal.

As an alternative, the device 110 may use a double fixed noise reference configuration 720. For example, the device 110 may select the seventh directional output (e.g., Direction 7) as a target signal 722 and may select a second directional output (e.g., Direction 2) as a first noise reference signal 724a and a fourth directional output (e.g., Direction 4) as a second noise reference signal 724b. The device 110 may continue this pattern for each of the directional outputs, using Direction 1 as a target signal and Directions 4/6 as noise reference signals, Direction 2 as a target signal and Directions 5/7 as noise reference signals, Direction 3 as a target signal and Directions 6/8 as noise reference signals, Direction 4 as a target signal and Directions 7/9 as noise reference signal, Direction 5 as a target signal and Directions 8/2 as noise reference signals, Direction 6 as a target signal and Directions 1/3 as noise reference signals, Direction 7 as a target signal and Directions 2/4 as noise reference signals, and Direction 8 as a target signal and Directions 3/5 as noise reference signals.

While FIG. 7A illustrates using a fixed configuration to determine noise reference signal(s), the disclosure is not limited thereto. FIG. 7B illustrates examples of the device 110 selecting noise reference signal(s) differently for each target signal. As a first example, the device 110 may use a global noise reference configuration 730. For example, the device 110 may select the seventh directional output (e.g., Direction 7) as a target signal 732 and may select the first directional output (e.g., Direction 1) as a first noise reference signal 734a and the second directional output (e.g., Direction 2) as a second noise reference signal 734b. The device 110 may use the first noise reference signal 734a and the second noise reference signal 734b for each of the directional outputs (e.g., Directions 1-8).

As a second example, the device 110 may use an adaptive noise reference configuration 740, which selects two directional outputs as noise reference signals for each target signal. For example, the device 110 may select the seventh directional output (e.g., Direction 7) as a target signal 742 and may select the third directional output (e.g., Direction 3) as a first noise reference signal 744a and the fourth directional output (e.g., Direction 4) as a second noise reference signal 744b. However, the noise reference signals may vary for each of the target signals, as illustrated in FIG. 7B.

As a third example, the device 110 may use an adaptive noise reference configuration 750, which selects one or more directional outputs as noise reference signals for each target signal. For example, the device 110 may select the seventh directional output (e.g., Direction 7) as a target signal 752 and may select the second directional output (e.g., Direction 2) as a first noise reference signal 754a, the third directional output (e.g., Direction 3) as a second noise reference signal 754b, and the fourth directional output (e.g., Direction 4) as a third noise reference signal 754c. However, the noise reference signals may vary for each of the target signals, as illustrated in FIG. 7B, with a number of noise reference signals varying between one (e.g., Direction 6 as a noise reference signal for Direction 2) and four (e.g., Directions 1-3 and 8 as noise reference signals for Direction 6).

In some examples, the device 110 may determine a number of noise references based on a number of dominant audio sources. For example, if someone is talking while music is playing over loudspeakers and a blender is active, the device 110 may detect three dominant audio sources (e.g., talker, loudspeaker, and blender) and may select one dominant audio source as a target signal and two dominant audio sources as noise reference signals. Thus, the device 110 may select first audio data corresponding to the person speaking as a first target signal and select second audio data corresponding to the loudspeaker and third audio data corresponding to the blender as first reference signals. Similarly, the device 110 may select the second audio data as a second target signal and the first audio data and the third audio data as second reference signals, and may select the third audio data as a third target signal and the first audio data and the second audio data as third reference signals.

Additionally or alternatively, the device 110 may track the noise reference signal(s) over time. For example, if the music is playing over a portable loudspeaker that moves around the room, the device 110 may associate the portable loudspeaker with a noise reference signal and may select different portions of the beamformed audio data based on a location of the portable loudspeaker. Thus, while the direction associated with the portable loudspeaker changes over time, the device 110 selects beamformed audio data corresponding to a current direction as the noise reference signal.

While some of the examples described above refer to determining instantaneous values for a signal quality metric (e.g., a signal-to-interference ratio (SIR), a signal-to-noise ratio (SNR), or the like), the disclosure is not limited thereto. Instead, the device 110 may determine the instantaneous values and use the instantaneous values to determine average values for the signal quality metric. Thus, the device 110 may use average values or other calculations that do not vary drastically over a short period of time in order to select which signals on which to perform additional processing. For example, a first audio signal associated with an audio source (e.g., person speaking, loudspeaker, etc.) may be associated with consistently strong signal quality metrics (e.g., high SIR/SNR) and intermittent weak signal quality metrics. The device 110 may average the strong signal metrics and the weak signal quality metrics and continue to track the audio source even when the signal quality metrics are weak without departing from the disclosure.

Figure 9B:
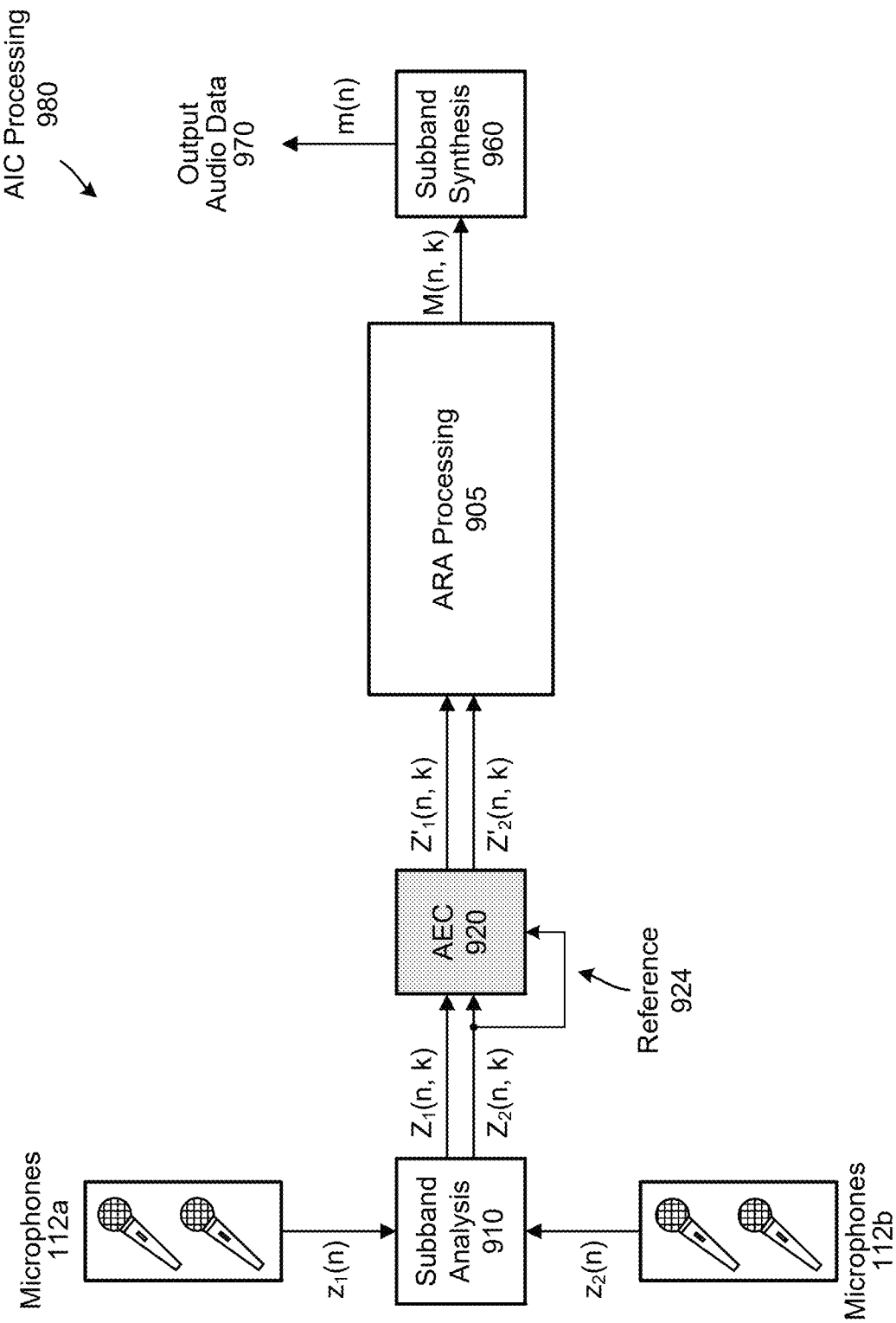

FIGS. 9A-9B are component diagrams illustrating conceptual examples of performing adaptive interference cancellation according to embodiments of the present disclosure. As illustrated in FIG. 9A, the device 110 may include first microphones 112a and second microphones 112b. For example, the first microphones 112a may correspond to rear-facing microphones 802 and 804, while the second microphones 112b may correspond to front-facing microphones 806 and 808, although the disclosure is not limited thereto. However, the disclosure is not limited thereto and the number of microphones included in the first microphones 112a and/or the second microphones 112b may vary without departing from the disclosure.

As illustrated in FIG. 9A, the first microphones 112a may generate first microphone audio signals $z_1(n)$, and the second microphones 112b may generate second microphone audio signals $z_2(n)$, which correspond to audio signals in the time-domain. A subband analysis component 910 may convert these signals to a subband-domain or a frequency-domain prior to performing additional processing. For example, FIG. 9A illustrates that the subband analysis component 910 may convert the first microphone audio signals $z_1(n)$ from the time-domain to the subband domain (e.g., $Z_1(n, k)$) and may convert the second microphone audio signals $z_2(n)$ from the time-domain to the subband domain (e.g., $Z_2(n, k)$).

As discussed above, electronic devices may perform acoustic echo cancellation to remove and/or attenuate an echo signal captured in the input audio data. For example, the device 110 may receive playback audio data and may generate output audio corresponding to the playback audio data using the one or more loudspeaker(s) 114. While generating the output audio, the device 110 may capture input audio data using the microphones 112. In addition to capturing speech (e.g., the input audio data includes a representation of speech), the device 110 may capture a portion of the output audio generated by the loudspeaker(s) 114, which may be referred to as an "echo" or echo signal. Due to the presence of the echo signal, the device 110 may be unable to accurately detect whether speech is present in the input audio data.

As described above, the device 110 may be mounted in a vehicle interior 130, although the disclosure is not limited thereto. In some examples, the device 110 may be communicatively coupled to a smartphone or other device as well as the vehicle (e.g., car stereo), enabling the device 110 to control output audio generated by the vehicle. For example, the device 110 may receive playback audio data from the smartphone and may send the playback audio data to loudspeakers connected to the vehicle to generate the output audio, although the disclosure is not limited thereto. When in this configuration, the playback audio data is known to the device 110 and the device 110 may perform acoustic echo cancellation (AEC) processing using the playback audio data.

As illustrated in FIG. 9A, in some examples the device 110 may perform AEC processing 900 using an AEC component 920. For example, the AEC component 920 may receive playback audio data 922 and may perform a first stage of echo cancellation to generate isolated audio data by removing the playback audio data 922 (e.g., $X(n, k)$) from the first microphone audio signals $Z_1(n, k)$ and the second microphone audio signals $Z_2(n, k)$. The device 110 may perform AEC processing separately for each microphone 112 included in the device 110. Thus, the AEC component 920 may perform AEC processing to the first microphone audio signals $Z_1(n, k)$ to generate first isolated audio signals $Z'_1(n, k)$ and may perform AEC processing to the second microphone audio signals $Z_2(n, k)$ to generate second isolated audio signals $Z'_2(n, k)$.

After generating the isolated audio data, the device 110 may perform beamforming using the isolated audio data to generate a plurality of beams (e.g., perform a beamforming operation to generate directional audio data). As used herein, the term beam may refer to particular audio data (e.g., beamformed audio data) corresponding to the isolated audio data, where the particular audio data of a beam corresponds to a particular direction. Thus, each beam may include directional audio data corresponding to a particular direction relative to the device 110.

As described above, in some examples the device 110 may be mounted near a source of wind, such as a vent 132 of the vehicle interior 130, a window of the vehicle interior 130, and/or the like. As a result, the rear-facing microphones (e.g., first microphones 112a) of the device 110 may be more exposed to the wind than the front-facing microphones (e.g., second microphones 112b), although the disclosure is not limited thereto. Thus, in the presence of wind (e.g., caused by the vent 132), the first isolated audio signals $Z'_1(n, k)$ associated with the rear-facing microphones may have more noise and/or a lower audio quality than the second isolated audio signals $Z'_2(n, k)$ associated with the front-facing microphones.

In order to improve an audio quality of output audio data, the device 110 may perform adaptive reference algorithm (ARA) processing 905. For example, the device 110 may perform ARA processing 905 using all of the isolated audio data and/or a portion of the isolated audio data, although the disclosure is not limited thereto. As illustrated in FIG. 9A, the device 110 may perform the ARA processing 905 to generate output audio data M(n, k) in the subband-domain. Finally, a subband synthesis component 960 may convert the output audio data M(n, k) from the subband-domain to the time-domain to generate output audio data m(n) 970.

In some examples, the ARA processing 905 may perform adaptive beamforming to generate the output audio data M(n, k), which corresponds to an individual beam direction and/or multiple beam directions, although the disclosure is not limited thereto. For example, the ARA processing 905 may perform beamforming using the first isolated audio signals $Z'_1(n, k)$ and the second isolated audio signals $Z'_2(n, k)$ to generate a plurality of beams, and from the plurality of beams the ARA processing 905 may select one or more target beams and one or more reference beams. The ARA processing 905 may perform adaptive reference cancellation to remove the one or more reference beams from the one or more target beams and perform beam merging to generate the output audio data M(n, k). An example of the ARA processing 905 is described in greater detail below with regard to FIG. 12, although the disclosure is not limited thereto and the ARA processing 905 may vary without departing from the disclosure.

In the example illustrated in FIG. 9A, prior to performing the ARA processing 905, the device 110 may perform the AEC processing 900 using the playback audio data 922 to remove noise signals represented in the first microphone audio signals $Z_1(n, k)$ and the second microphone audio signals $Z_2(n, k)$. However, the disclosure is not limited thereto and in some examples the device 110 may perform adaptive interference cancellation (AIC) processing 980 instead of the AEC processing 900 without departing from the disclosure. For example, the device 110 may not have access to the playback audio data 922 and may therefore be unable to perform the AEC processing 900. As the device 110 is unable to perform AEC processing 900, the device 110 may perform AIC processing 980 using a portion of the microphone audio signals Z(n, k) to remove noise signals represented in the first microphone audio signals $Z_1(n, k)$ and the second microphone audio signals $Z_2(n, k)$.

To illustrate an example, the device 110 may be communicatively coupled to a smartphone or other device and the smartphone may be communicatively coupled to the vehicle (e.g., car stereo). Thus, the smartphone itself may control output audio generated by the vehicle. For example, the smartphone may receive the playback audio data and may send the playback audio data to loudspeakers connected to the vehicle to generate the output audio, although the disclosure is not limited thereto.

When in this configuration, the playback audio data 922 is not known to the device 110 and the device 110 may perform the AIC processing 980 using microphone signal(s) as adaptive references. As described above, the rear-facing microphones (e.g., first microphones 112a) of the device 110 may be more exposed to wind than the front-facing microphones (e.g., second microphones 112b), and the front-facing microphones may be closer to a user in the vehicle 130, although the disclosure is not limited thereto. Thus, the device 110 may use the first microphone audio signals $Z_1(n, k)$ associated with the rear-facing microphones as reference signals for both the first microphone audio signals $Z_1(n, k)$ and the second microphone audio signals $Z_2(n, k)$, although the disclosure is not limited thereto.

As illustrated in FIG. 9B, the device 110 may use the AEC component 920 during the AIC processing 980, although the disclosure is not limited thereto. For example, the device 110 may input the first microphone audio signals $Z_1(n, k)$ and the second microphone audio signals $Z_2(n, k)$ to the AEC component 920 as target signals and the AEC component 920 may use the first microphone audio signals $Z_1(n, k)$ as a reference 924. Thus, the AEC component 920 may perform first adaptive filtering to the first microphone audio signals $Z_1(n, k)$ using the first microphone audio signals $Z_1(n, k)$ as the reference 924 to generate the first isolated audio signals $Z'_1(n, k)$. Similarly, the AEC component 920 may perform second adaptive filtering to the second microphone audio signals $Z_2(n, k)$ using the first microphone audio signals $Z_1(n, k)$ as the reference 924 to generate the second isolated audio signals $Z'_2(n, k)$.

In some examples, the AEC component 920 may select a portion of the first microphone audio signals $Z_1(n, k)$ and/or the second microphone audio signals $Z_2(n, k)$ as a reference signal and perform AIC processing 980 to remove the reference signal from each of the first microphone audio signals $Z_1(n, k)$ and the second microphone audio signals $Z_2(n, k)$. For example, the AEC component 920 may select a first channel of the first microphone audio signals (e.g., $Z_{1a}(n, k)$) corresponding to the first rear-facing microphone 802 as the reference signal. Thus, the AEC component 920 may remove the reference signal (e.g., $Z_{1a}(n, k)$) from a second channel of the first microphone audio signals (e.g., $Z_{1b}(n, k)$) corresponding to the second rear-facing microphone 804, a first channel of the second microphone audio signals (e.g., $Z_{2a}(n, k)$) corresponding to the first front-facing microphone 806, and a second channel of the second microphone audio signals (e.g., $Z_{2b}(n, k)$) corresponding to the second front-facing microphone 808. Additionally or alternatively, the AEC component 920 may select the first channel of the first microphone audio signals (e.g., $Z_{1a}(n, k)$) corresponding to the first rear-facing microphone 802 and the second channel of the first microphone audio signals (e.g., $Z_{1b}(n, k)$) corresponding to the second rear-facing microphone 804 as the reference signal without departing from the disclosure. However, the disclosure is not limited thereto and the number of microphones may vary without departing from the disclosure.

In other examples, the device 110 may select each of the microphone signals as a target signal, may select some of the microphone signals as reference signal(s) for each of the target signals, and may perform AIC processing 980 to remove the reference signal(s) from each of the target signals. For example, the AEC component 920 may select a first channel of the first microphone audio signals (e.g., $Z_{1a}(n, k)$) corresponding to the first rear-facing microphone 802 as a first reference signal, may select a first channel of the second microphone audio signals (e.g., $Z_{2a}(n, k)$) corresponding to the first front-facing microphone 806 as a first target signal, and perform AIC processing 980 to remove the first reference signal from the first target signal. Similarly, the AEC component 920 may select a second channel of the first microphone audio signals (e.g., $Z_{1b}(n, k)$) corresponding to the second rear-facing microphone 804 as a second reference signal, may select a second channel of the second microphone audio signals (e.g., $Z_{2b}(n, k)$) corresponding to the second front-facing microphone 808 as a second target signal, and perform AIC processing 980 to remove the second reference signal from the second target signal. Thus, the AEC component 920 may select individual reference signals for each of the microphone signals to generate the first isolated audio signals $Z'_1(n, k)$ and the second isolated audio signals $Z'_2(n, k)$.

FIG. 10 illustrates examples of parameters used during acoustic echo cancellation and microphone reference adaptive interference cancellation according to embodiments of the present disclosure. As described above, the AEC component 920 may be used to perform both AEC processing 900 using the reference audio data 922 and AIC processing 980 using the reference 924 (e.g., portion of the microphone audio signals $Z(n, k)$). However, in addition to using different reference signals, the AEC component 920 may vary other parameters between AEC processing 900 and AIC processing 980 without departing from the disclosure.

As illustrated in FIG. 10, during AEC processing 900 the AEC component 920 may use the reference audio data 922 as a reference to perform acoustic echo cancellation on the microphone audio signals $Z(n, k)$ to generate isolated audio signals $Z'(n, k)$. In addition, during AEC processing 900 the AEC component 920 may use a first tail length (e.g., $\text{Tail}_{AEC}$), a first adaptation time constant (e.g., $\tau_{AEC}$), a first step size (e.g., $\mu_{AEC}$), a first adaptation frequency (e.g., $F_{AEC}$), and/or the like. Thus, the AEC component 920 may use first parameters during the AEC processing 900.

In contrast, during AIC processing 980 the AEC component 920 may use the microphone audio signals $Z(n, k)$ as the reference 924 to perform adaptive interference cancellation on the microphone audio signals $Z(n, k)$ to generate isolated audio signals $Z'(n, k)$. In addition, during AIC processing 980 the AEC component 920 may use a second tail length (e.g., $\text{Tail}_{AIC}$), a second adaptation time constant (e.g., $\tau_{AIC}$), a second step size (e.g., $\mu_{AIC}$), a second adaptation frequency (e.g., $F_{AIC}$), and/or the like without departing from the disclosure. Thus, the AEC component 920 may use second parameters during the AIC processing 980.

As used herein, the tail length (e.g., filter length) corresponds to a time interval associated with the AEC processing 900, with a longer tail length corresponding to a longer time interval of audio data used by an adaptive filter to perform echo cancellation. The adaptation time constant can be used as a measure of convergence and is related directly to the step size of the adaptive filter. Thus, the adaptation time constant and the step size correspond to a convergence rate, which indicates a rate at which the adaptive filter converges (e.g., reaches steady state equilibrium), and both the adaptation time constant and the step size may vary without departing from the disclosure. Finally, the adaptation frequency corresponds to a frequency at which the adaptive filter performs adaptation to modify adaptive filter coefficients of the adaptive filter. For example, the adaptive filter may perform adaptation every frame of the microphone audio signals $Z(n, k)$, every other audio frame, or once every n audio frames without departing from the disclosure.

To illustrate an example, during the AEC processing 900 an entirety of the reference audio data 922 corresponds to the echo signal represented in the microphone audio signals $Z(n, k)$. Thus, to perform acoustic echo cancellation, the AEC component 920 attempts to cancel as much of the echo signal as possible by adapting quickly to reflect quick changes in the reference audio data 922. For example, the AEC component 920 may update first adaptive filter coefficient values using the first parameters (e.g., at a faster rate) and use these first adaptive filter coefficient values to generate a first reference signal that corresponds to the reference audio data 922. Due to the fast adaptation, the first reference signal includes both transient (e.g., sudden variations) and stationary (e.g., constant levels) sounds represented in the reference audio data 922. To generate the isolated audio signals $Z'(n, k)$ and remove the echo signal, the AEC component 920 subtracts the first reference signal from the microphone audio signals $Z(n, k)$.

In contrast, during AIC processing 980 only a portion of the microphone audio signals $Z(n, k)$ (e.g., stationary sounds) correspond to the echo signal to be removed, whereas transient sounds may correspond to speech or other audible sounds. Thus, if the AEC component 920 adapts quickly, the AIC processing 980 would remove and/or attenuate the speech signal represented in the microphone audio signals $Z(n, k)$.

To improve the output audio data and reduce attenuation of the speech signal, the second parameters may correspond to a slower adaptation speed than the first parameters. For example, the adaptation time constant (e.g., $\tau_{AIC}$) and/or the second step size (e.g., $\mu_{AIC}$) may be chosen such that the AIC processing 980 updates adaptive filter coefficients slower than the AEC processing 900. Thus, the AEC component 920 may update second adaptive filter coefficient values using the second parameters (e.g., at a slower rate) and use these second adaptive filter coefficient values to generate a second reference signal that corresponds to the echo signal represented in the microphone audio signals $Z(n, k)$. Due to the slow adaptation, the second reference signal includes only the stationary (e.g., constant levels) sounds represented in the microphone audio signals $Z(n, k)$ and does not cancel all of the signal. To remove the echo signal and generate the isolated audio signals $Z'(n, k)$, the AEC component 920 subtracts the second reference signal from the microphone audio signals $Z(n, k)$.

In some examples, the first tail length (e.g., $\text{Tail}_{AEC}$) and the second tail length (e.g., $\text{Tail}_{AIC}$) may be the same. However, the disclosure is not limited thereto, and in some examples the second tail length (e.g., $\text{Tail}_{AIC}$) may be longer than the first tail length (e.g., $\text{Tail}_{AEC}$) without departing from the disclosure. Similarly, in some examples the first adaptation frequency (e.g., $F_{AEC}$) and the second adaptation frequency (e.g., $F_{AIC}$) may be the same. For example, the AEC component 920 may update the adaptive filter coefficient values every frame during the AEC processing 900 and the AIC processing 980 (e.g., $F_{AEC}=F_{AIC}=1$). However, the disclosure is not limited thereto, and in some examples the second adaptation frequency (e.g., $F_{AIC}$) may be slower than the first adaptation frequency (e.g., $F_{AEC}$) without departing from the disclosure. For example, the AEC component 900 may update the adaptive filter coefficient values every 2 frames of the microphone audio signals $Z(n, k)$ (e.g., $F_{AIC}=1/2$), every four frames of the microphone audio signals $Z(n, k)$ (e.g., $F_{AIC}=1/4$), and/or the like without departing from the disclosure.

While FIGS. 9A-9B illustrate the AEC component 900 performing either the AEC processing 900 or the AIC processing 980, the disclosure is not limited thereto. In some examples, the device 110 may perform the AIC processing 980 and the AEC processing 900 in series without departing from the disclosure. For example, the device 110 may perform a first stage of AEC processing using a portion of the microphone audio signals $Z(n, k)$ to remove noise signals represented in the microphone audio signals $Z(n, k)$ and then perform a second stage of AEC processing using the reference audio data 922 as a reference to generate the isolated audio signals $Z'(n, k)$.

Figure 11A:
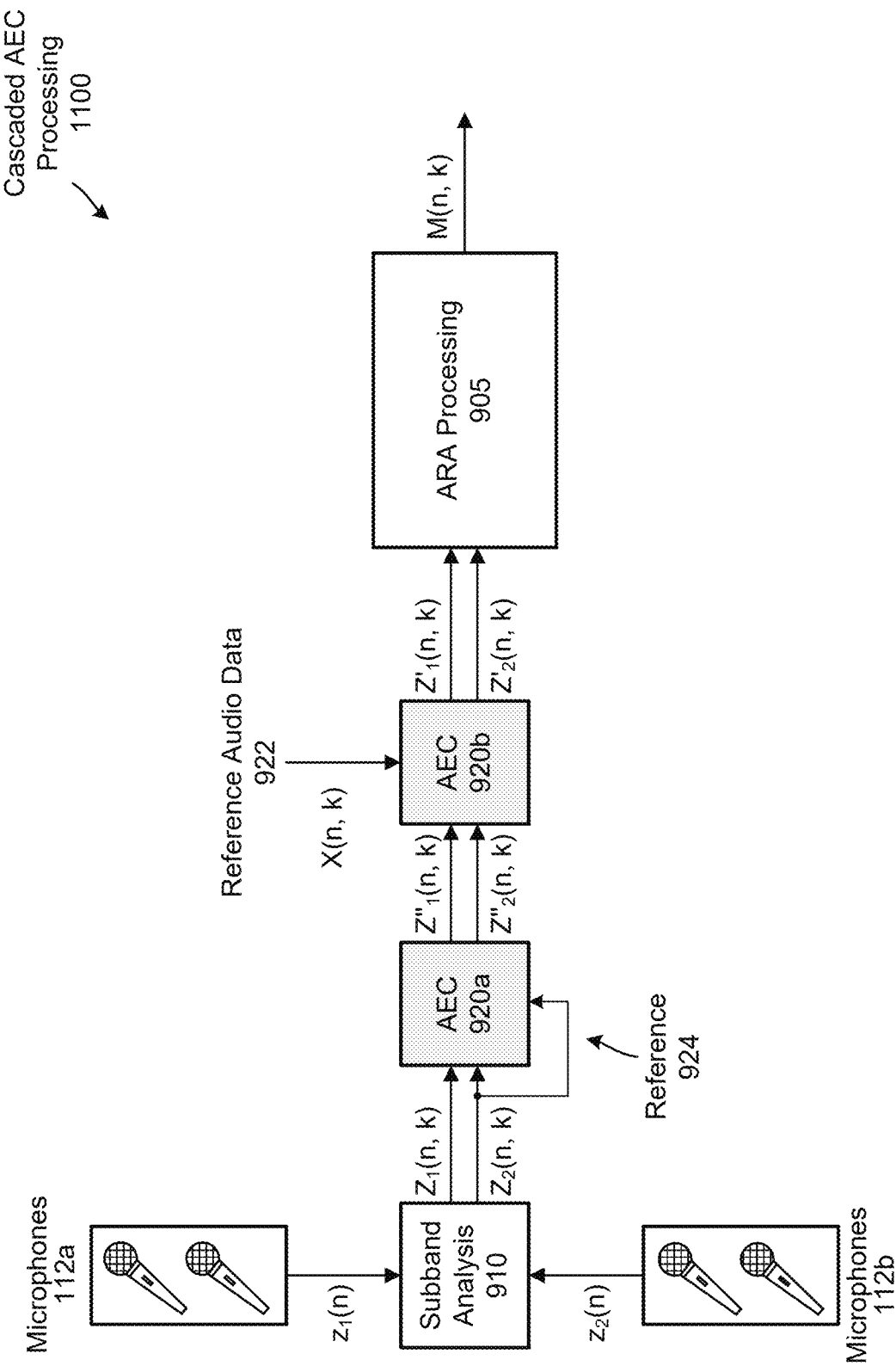
FIGS. 11A-11C are component diagrams illustrating conceptual examples of performing cascaded acoustic echo cancellation according to embodiments of the present disclosure.
Figure 11B:
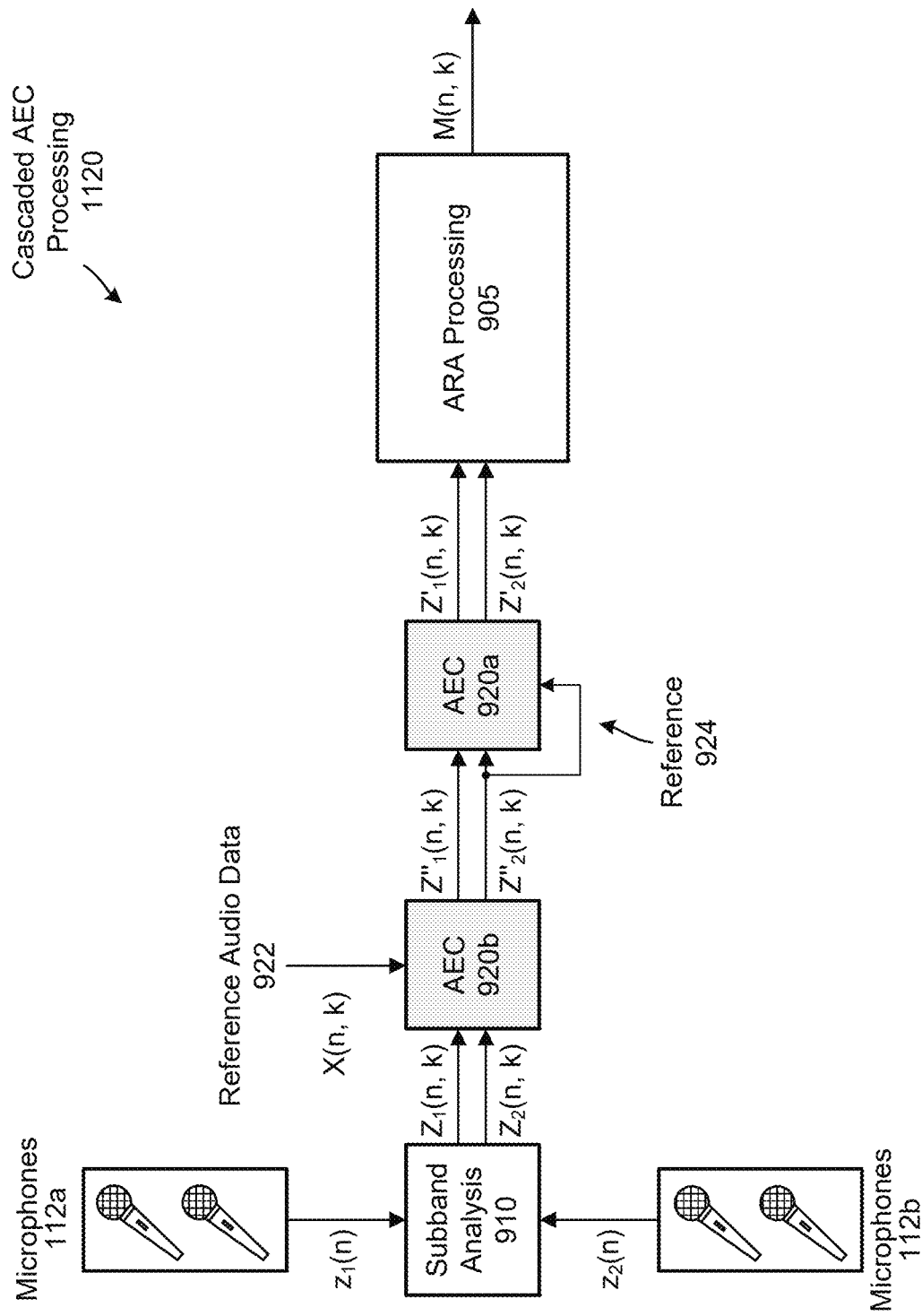
Figure 11C:
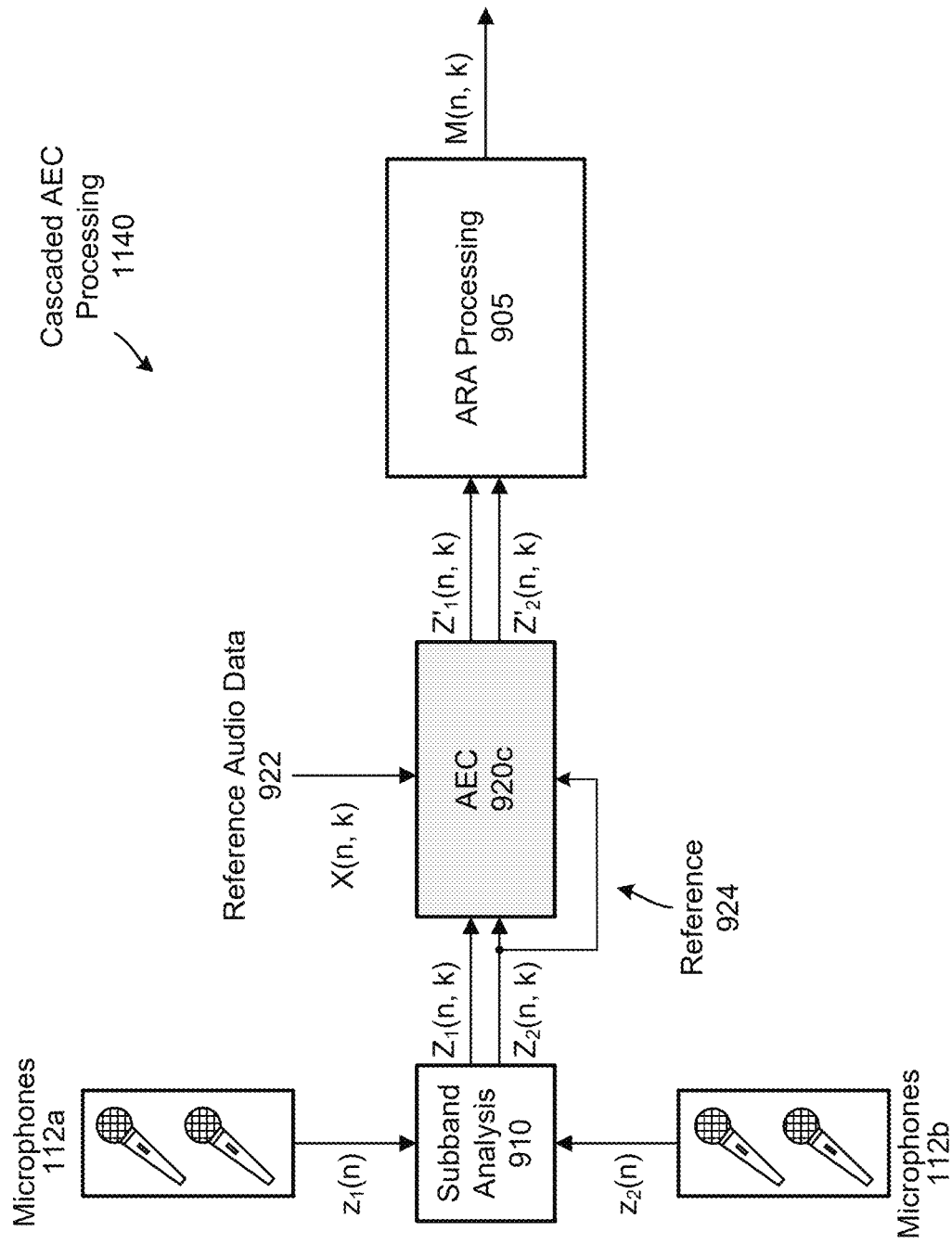

FIGS. 11A-11C are component diagrams illustrating conceptual examples of performing cascaded acoustic echo cancellation according to embodiments of the present disclosure. As many of the components illustrated in FIGS. 11A-11C were described above with regard to FIG. 9A, a redundant description is omitted.

As illustrated in FIG. 11A, the device 110 may perform first cascaded AEC processing 1100 using a first AEC component 920a and a second AEC component 920b. For example, the device 110 may perform adaptive interference cancellation using the first AEC component 920a that is positioned between the subband analysis component 910 and the second AEC component 920b.

As described above, the first AEC component 920a may receive the first microphone audio signals $Z_1(n, k)$ and the second microphone audio signals $Z_2(n, k)$ and may perform AIC processing 980 to generate first processed microphone audio signals $Z''_1(n, k)$ and second processed microphone audio signals $Z''_2(n, k)$. Thus, the second AEC component 920b may receive the first processed microphone audio signals $Z''_1(n, k)$ and second processed microphone audio signals $Z''_2(n, k)$ as input signals and perform the AEC processing 900 the reference audio data 922 to generate first isolated audio signals $Z'_1(n, k)$ and second isolated audio signals $Z'_2(n, k)$.

In some examples, the first AEC component 920a may select a portion of the first microphone audio signals $Z_1(n, k)$ and/or the second microphone audio signals $Z_2(n, k)$ as a reference signal and perform AIC processing 980 to remove the reference signal from each of the first microphone audio signals $Z_1(n, k)$ and the second microphone audio signals $Z_2(n, k)$. For example, the first AEC component 920a may select a first channel of the first microphone audio signals (e.g., $Z_{1a}(n, k)$) corresponding to the first rear-facing microphone 802 as the reference signal. Thus, the first AEC component 920a may remove the reference signal (e.g., $Z_{1a}(n, k)$) from a second channel of the first microphone audio signals (e.g., $Z_{1b}(n, k)$) corresponding to the second rear-facing microphone 804, a first channel of the second microphone audio signals (e.g., $Z_{2a}(n, k)$) corresponding to the first front-facing microphone 806, and a second channel of the second microphone audio signals (e.g., $Z_{2b}(n, k)$) corresponding to the second front-facing microphone 808. Additionally or alternatively, the first AEC component 920a may select the first channel of the first microphone audio signals (e.g., $Z_{1a}(n, k)$) corresponding to the first rear-facing microphone 802 and the second channel of the first microphone audio signals (e.g., $Z_{1b}(n, k)$) corresponding to the second rear-facing microphone 804 as the reference signal without departing from the disclosure. However, the disclosure is not limited thereto and the number of microphones may vary without departing from the disclosure.

In other examples, the device 110 may select each of the microphone signals as a target signal, may select some of the microphone signals as reference signal(s) for each of the target signals, and may perform AIC processing 980 to remove the reference signal(s) from each of the target signals. For example, the first AEC component 920a may select a first channel of the first microphone audio signals (e.g., $Z_{1a}(n, k)$) corresponding to the first rear-facing microphone 802 as a first reference signal, may select a first channel of the second microphone audio signals (e.g., $Z_{2a}(n, k)$) corresponding to the first front-facing microphone 806 as a first target signal, and perform AIC processing 980 to remove the first reference signal from the first target signal. Similarly, the first AEC component 920a may select a second channel of the first microphone audio signals (e.g., $Z_{1b}(n, k)$) corresponding to the second rear-facing microphone 804 as a second reference signal, may select a second channel of the second microphone audio signals (e.g., $Z_{2b}(n, k)$) corresponding to the second front-facing microphone 808 as a second target signal, and perform AIC processing 980 to remove the second reference signal from the second target signal. Thus, the first AEC component 920a may select individual reference signals for each of the microphone signals to generate the first processed microphone audio signals $Z''_1(n, k)$ and the second processed microphone audio signals $Z''_2(n, k)$.

While not illustrated in FIG. 11A, in some examples the first AEC component 920a may receive third microphone audio signals $Z_3(n, k)$ (not illustrated) corresponding to a noise reference microphone (e.g., an additional microphone in proximity to a noise source) and use the third microphone audio signals $Z_3(n, k)$ as the reference signal. For example, the first AEC component 920a may remove the reference signal (e.g., $Z_3(n, k)$) from the first microphone audio signals $Z_1(n, k)$ and the second microphone audio signals $Z_{2a}(n, k)$ without departing from the disclosure.

By performing the AIC processing 980 using the first AEC component 920a, the device 110 may remove at least a portion of the echo signal and/or noise signals from the first microphone audio signals $Z_1(n, k)$ and the second microphone audio signals $Z_{2a}(n, k)$. Thus, the first AEC component 920a may cancel and/or attenuate the echo signal, a representation of acoustic noise and/or a representation of ambient noise, without canceling or substantially attenuating speech represented in the first microphone audio signals $Z_1(n, k)$ and the second microphone audio signals $Z_{2a}(n, k)$.

While FIG. 11A illustrates an example in which the first AEC component 920a performs AEC processing prior to the second AEC component 920b, the disclosure is not limited thereto and the order of these steps may be switched without departing from the disclosure. As illustrated in FIG. 11B, in some examples the device 110 may perform second cascaded AEC processing 1120 using the second AEC component 920b followed by the first AEC component 920a. For example, the device 110 may perform AEC processing using the second AEC component 920b and then may perform adaptive interference cancellation using the first AEC component 920a, which is positioned between the second AEC component 920b and the ARA processing 905.

In some examples, the device 110 may perform both AEC processing and AIC processing in a single stage using a third AEC component 920c, which is illustrated in FIG. 11C as third cascaded AEC processing 1140. For example, the third AEC component 920c may receive the playback audio data 922 and may use the second microphone audio signals $Z_2(n, k)$ as a reference 924. As illustrated in FIG. 11C, the third AEC component 920c may receive the first microphone audio signals $Z_1(n, k)$, the second microphone audio signals $Z_2(n, k)$, and the playback audio data 922 and may perform a single stage of echo cancellation to generate first isolated audio signals $Z'_1(n, k)$ and second isolated audio signals $Z'_2(n, k)$ without departing from the disclosure. Thus, the third AEC component 920c may perform echo cancellation using multiple reference signals without departing from the disclosure.

Figure 12:
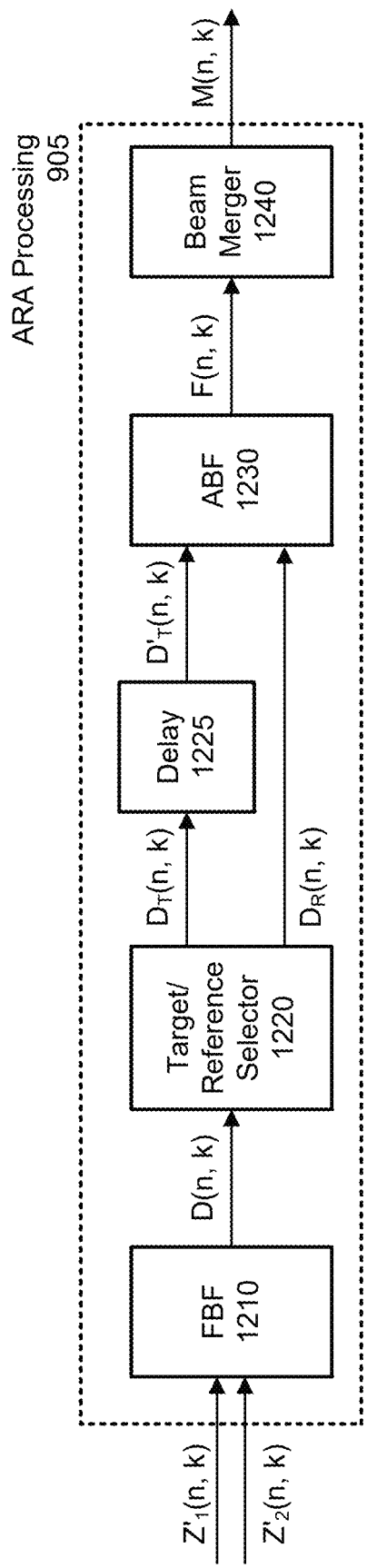
FIG. 12 is a component diagram illustrating a conceptual example of performing adaptive interference cancellation according to embodiments of the present disclosure.

FIG. 12 is a component diagram illustrating a conceptual example of performing adaptive interference cancellation according to embodiments of the present disclosure. As illustrated in FIG. 12, in some examples the device 110 may perform the ARA processing 905 using a fixed beamformer (FBF) component 1210, a target/reference selector component 1220, a delay component 1225, an adaptive beamformer (ABF) component 1230, and a beam merger component 1240, although the disclosure is not limited thereto and the device 110 may perform ARA processing 905 using additional components not illustrated in FIG. 12 without departing from the disclosure. Additionally or alternatively, the device 110 may perform ARA processing 905 using fewer component without departing from the disclosure. For example, while FIG. 12 illustrates an example that includes the FBF component 1210, the target/reference selector component 1220, and the delay component 1225, in some examples a single component may perform beamforming to generate the directional audio signals (e.g., $D_1(n, k)$) and select the target signal(s) $D_T(n, k)$ and the reference signal(s) $D_R(n, k)$ without departing from the disclosure.

As illustrated in FIG. 12, the FBF component 1210 may process the first isolated audio signals $Z'_1(n, k)$ and the second isolated audio signals $Z'_2(n, k)$ to generate directional audio signals (e.g., $D(n, k)$), which comprise a first plurality of beams corresponding to individual directions. For example, the FBF component 1210 may generate a first audio signal (e.g., $D_1(n, k)$) corresponding to a first direction relative to the device, a second audio signal (e.g., $D_2(n, k)$) corresponding to a second direction relative to the device, and so on. Thus, the directional audio signals (e.g., $D(n, k)$) correspond to 360 degrees around the device 110, split into a fixed number of directions. As used herein, the FBF component 1210 may correspond to any component configured to generate directional signals, including traditional beamformer components, neural networks (e.g., a deep neural network (DNN)), and/or other components without departing from the disclosure.

The FBF component 1210 may output the directional audio signals (e.g., $D(n, k)$) to the target/reference selector component 1220, which may be configured to select a first portion of the directional audio signals as target signal(s) $D_T(n, k)$ and a second portion of the directional audio signals as reference signal(s) $D_R(n, k)$. For example, the device 110 may associate one or more directions with a user 5 (or multiple users) and may generate the target signal(s) $D_T(n, k)$ corresponding to the selected target directions. Additionally or alternatively, the device 110 may detect speech in one or more beams and may generate the target signal(s) $D_T(n, k)$ corresponding to the selected beams. However, the disclosure is not limited thereto and the device 110 may generate the target signal(s) $D_T(n, k)$ using other techniques without departing from the disclosure.

Similarly, the device 110 may associate one or more directions with noise source(s) and may generate the reference signal(s) $D_R(n, k)$ corresponding to the selected noise directions. Additionally or alternatively, the device 110 may determine that speech is not detected in one or more beams and may generate the reference signal(s) $D_R(n, k)$ corresponding to the selected beams. However, the disclosure is not limited thereto and the device 110 may generate the reference signal(s) $D_R(n, k)$ using other techniques without departing from the disclosure.

The target/reference selector component 1220 may output the target signal(s) $D_T(n, k)$ to a delay component 1225, which may be configured to receive the target signal(s) $D_T(n, k)$ and generate delayed target signal(s) $D'_T(n, k)$, although the disclosure is not limited thereto. In addition, the target/reference selector component 1220 may output the reference signal(s) $D_R(n, k)$ to the ABF component 1230.

The ABF component 1230 may receive the delayed target signal(s) $D'_T(n, k)$ and the reference signal(s) $D_R(n, k)$ and may perform adaptive beamforming. For example, the ABF component 1230 may subtract the reference signal(s) $D_R(n, k)$ from the delayed target signal(s) $D'_T(n, k)$ to generate filtered signal(s) $F(n, k)$. The ABF component 1230 may perform this process separately for each of the delayed target signal(s) $D'_T(n, k)$. For example, the ABF component 1230 may subtract the reference signal(s) $D_R(n, k)$ from a first portion (e.g., Beam1) of the delayed target signal(s) $D'_{T1}(n, k)$ to generate a first portion of the filtered signal(s) $F_1(n, k)$ corresponding to a first direction, may subtract the reference signal(s) $D_R(n, k)$ from a second portion (e.g., Beam2) of the delayed target signal(s) $D'_{T2}(n, k)$ to generate a second portion of the filtered signal(s) $F_2(n, k)$ corresponding to a second direction, and so on. However, the disclosure is not limited thereto, and in other examples the ABF component 1230 may subtract different portions of the reference signal(s) $D_R(n, k)$ from each of the delayed target signal(s) $D'_T(n, k)$ without departing from the disclosure.

In some examples, the device 110 may select a single target signal and a single reference signal during ARA processing 905. For example, the device 110 may select first beamformed audio data (e.g., Beam1) as the target signal $D_T(n, k)$, may select fourth beamformed audio data (e.g., Beam4) as the reference signal $D_R(n, k)$, and may generate the filtered signal $F(n, k)$ by removing at least a portion of the fourth beamformed audio data from the first beamformed audio data. However, the disclosure is not limited thereto, and in other examples the device 110 may select multiple target signals during the ARA processing 905 without departing from the disclosure. For example, the device 110 may select the first beamformed audio data (e.g., Beam1) as a first target signal $D_{T1}(n, k)$, may select second beamformed audio data (e.g., Beam2) as a second target signal $D_{T2}(n, k)$, and may select fourth beamformed audio data (e.g., Beam4) as the reference signal $D_R(n, k)$. Thus, the device 110 may generate a first portion of the filtered signal $F_1(n, k)$ by removing at least a portion of the fourth beamformed audio data from the first beamformed audio data and may generate a second portion of the filtered signal $F_2(n, k)$ by removing at least a portion of the fourth beamformed audio data from the second beamformed audio data.

Additionally or alternatively, the device 110 may select multiple reference signals during the ARA processing 905 without departing from the disclosure. For example, the device 110 may select the first beamformed audio data (e.g., Beam1) as the target signal $D_T(n, k)$, may select the fourth beamformed audio data (e.g., Beam4) as a first reference signal $D_{R1}(n, k)$, and may select fifth beamformed audio data (e.g., Beam5) as a second reference signal $D_{R2}(n, k)$. Thus, the device 110 may generate the filtered signal $F(n, k)$ by removing at least a portion of the fourth beamformed audio data and the fifth beamformed audio data from the first beamformed audio data. The disclosure is not limited thereto, however, and the device 110 may select one or more target signals and/or one or more reference signals during the ARA processing 905 without departing from the disclosure.

In some examples, beamformed audio data corresponding to an individual direction may be selected as part of either the target signal(s) $D_T(n, k)$ or the reference signal(s) $D_R(n, k)$, but not both. For example, the first beamformed audio data (e.g., Beam1) may be selected as a target signal but not as a reference signal, while the second beamformed audio data (e.g., Beam2) may be selected as a reference signal but not a target signal. However, the disclosure is not limited thereto, and in other examples, beamformed audio data corresponding to an individual direction may be selected as part of both the target signal(s) $D_T(n, k)$ and the reference signal(s) $D_R(n, k)$. For example, the first beamformed audio data (e.g., Beam1) may be selected as a first target signal associated with reference signal(s), while also selected as a second reference signal associated with a second target signal, without departing from the disclosure. Thus, in some examples, the ABF component 1230 may generate the filtered signal $F(n, k)$ comprising the same number of beams that are output by the FBF component 1210 without departing from the disclosure.

The beam merger component 1240 may receive the filtered signal $F(n, k)$ generated by the ABF component 1230 and may generate output audio data $M(n, k)$ in the subband-domain. The beam merger component 1240 may generate the output audio data $M(n, k)$ using any combination of beams represented in the filtered signal $F(n, k)$, as described in greater detail below with regard to FIGS. 15A-15C, although the disclosure is not limited thereto. As part of generating the output audio data $M(n, k)$, the beam merger component 1240 may process each of the beams in the filtered signal $F(n, k)$ to determine signal quality metrics (e.g., signal quality values). For example, the beam merger component 1240 may determine a signal-to-noise ratio (SNR) value for each of the beams, although the disclosure is not limited thereto. Based on the SNR values, the beam merger component 1240 may select one or more beams and generate the output audio data $M(n, k)$ using the selected beams. For example, the output audio data $M(n, k)$ may generate a weighted sum using the selected beams, although the disclosure is not limited thereto.

Figure 13:
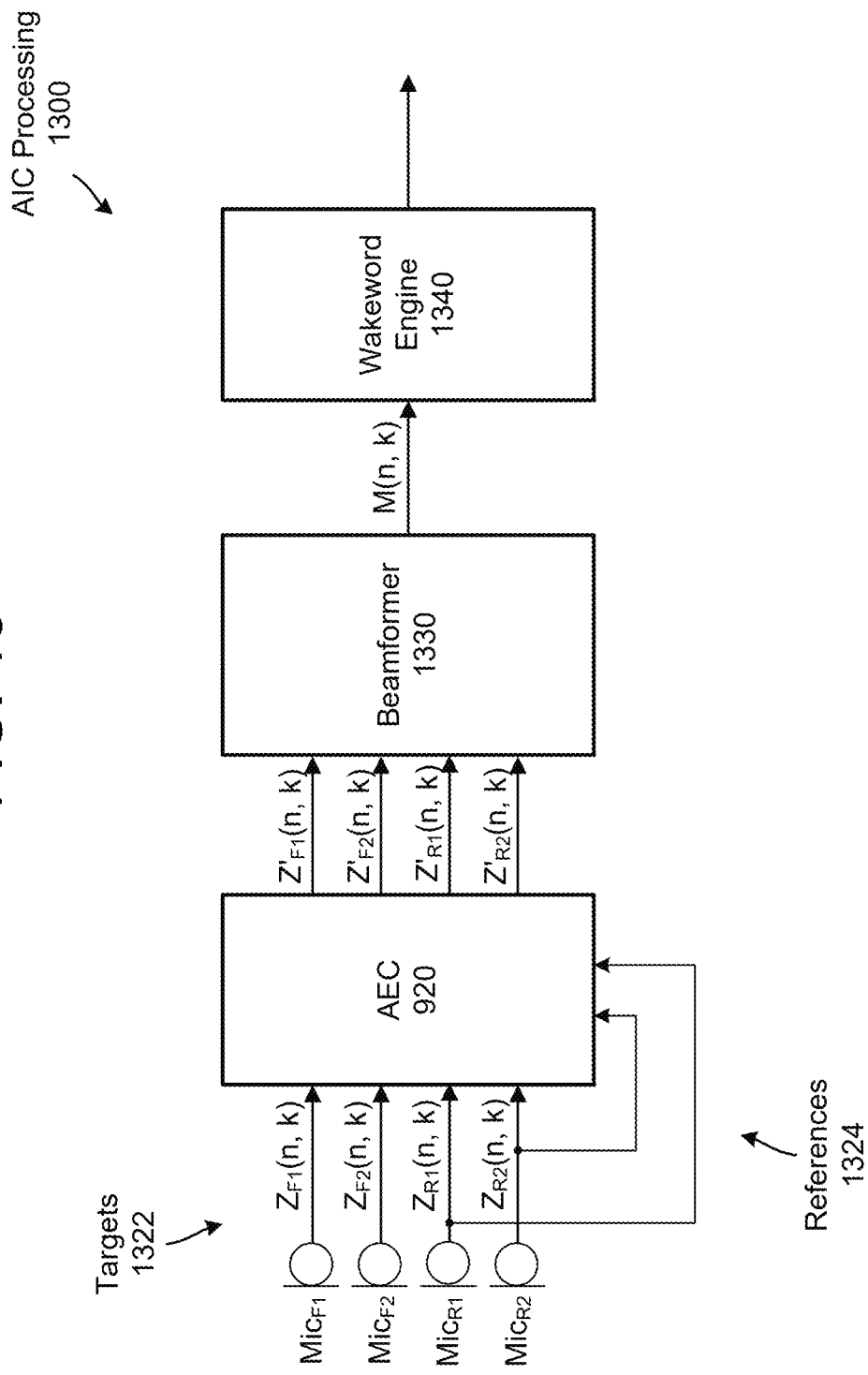
FIG. 13 is a component diagram illustrating a conceptual example of performing microphone reference adaptive interference cancellation according to embodiments of the present disclosure.

FIG. 13 is a component diagram illustrating a conceptual example of performing microphone reference adaptive interference cancellation according to embodiments of the present disclosure. In the example illustrated in FIG. 13, the device 110 includes four microphones, as in the example illustrated in FIG. 8, although the disclosure is not limited thereto. For example, the device 110 may include a first front-facing microphone $Mic_{F1}$ (e.g., microphone 806) that generates a first front microphone audio signal $Z_{F1}(n, k)$, a second front-facing microphone $Mic_{F2}$ (e.g., microphone 808) that generates a second front microphone audio signal $Z_{F2}(n, k)$, a first rear-facing microphone $Mic_{R1}$ (e.g., microphone 802) that generates a first rear microphone audio signal $Z_{R1}(n, k)$, and a second rear-facing microphone $Mic_{R2}$ (e.g., microphone 804) that generates a second rear microphone audio signal $Z_{R2}(n, k)$.

As illustrated in FIG. 13, the device 110 may perform AIC processing 1300 using the rear microphone signals (e.g., $Z_{R1}(n, k)$ and $Z_{R2}(n, k)$) as references 1324. Thus, the device 110 may select the front microphone audio signals (e.g., $Z_{F1}(n, k)$ and $Z_{F2}(n, k)$) and the rear microphone signals (e.g., $Z_{R1}(n, k)$ and $Z_{R2}(n, k)$) as targets 1322 and may perform AIC processing 1300 using the references 1324. For example, the AEC component 920 may update adaptive filter coefficient values using both the first rear microphone audio signal $Z_{R1}(n, k)$ and the second rear microphone audio signal $Z_{R2}(n, k)$ and may perform the AIC processing 1300 by generating a reference signal using the adaptive filter coefficient values and the rear microphone audio signals (e.g., $Z_{R1}(n, k)$ and $Z_{R2}(n, k)$). The AEC component 920 may remove the reference signal from the first front microphone audio signal $Z_{F1}(n, k)$ to generate first front isolated audio signal $Z'_{F1}(n, k)$, may remove the reference signal from the second front microphone audio signal $Z_{F2}(n, k)$ to generate second front isolated audio signal $Z'F_2(n, k)$, may remove the reference signal from the first rear microphone audio signal $Z_{R1}(n, k)$ to generate first rear isolated audio signal $Z'_{R1}(n, k)$, and may remove the reference signal from the second rear microphone audio signal $Z_{R2}(n, k)$ to generate second rear isolated audio signal $Z'_{R2}(n, k)$.

While the example described above refers to the AEC component 920 updating adaptive filter coefficient values and generating a single reference signal that is used for all of the microphone audio signals (e.g., $Z_{F1}(n, k)$-$Z_{R2}(n, k)$), the disclosure is not limited thereto. In some examples, the AEC component 920 may update adaptive filter coefficient values and generate a reference signal individually for each of the target signals. For example, the AEC component 920 may update first adaptive filter coefficient values and generate a first reference signal for the first front microphone audio signal $Z_{F1}(n, k)$, update second adaptive filter coefficient values and generate a second reference signal for the second front microphone audio signal $Z_{F2}(n, k)$, update third adaptive filter coefficient values and generate a third reference signal for the first rear microphone audio signal $Z_{R1}(n, k)$, and update fourth adaptive filter coefficient values and generate a fourth reference signal for the second rear microphone audio signal $Z_{R2}(n, k)$, although the disclosure is not limited thereto.

After generating the isolated audio signals (e.g., $Z'_{F1}(n, k)$-$Z'_{R2}(n, k)$), the device 110 may perform beamforming to generate merged audio data $M(n, k)$. For example, a beamformer component 1330 may perform ARA processing 905 using the isolated audio signals (e.g., $Z'_{F1}(n, k)$-$Z'_{R2}(n, k)$) to generate filtered audio signals (e.g., $F_{F1}(n, k)$-$F_{R2}(n, k)$) and then perform beam merging to generate the merged audio data $M(n, k)$. Thus, the beamformer component 1330 may include the FBF component 1210, the ABF component 1230, the beam merger component 1240, and/or additional components without departing from the disclosure, although the disclosure is not limited thereto.

In the example illustrated in FIG. 13, the beamformer component 1330 may output the merged audio data $M(n, k)$ to a wakeword engine component 1340 for additional processing. For example, the wakeword engine component 1340 may process the merged audio data $M(n, k)$ to determine whether a wakeword is detected in the merged audio data $M(n, k)$. If the wakeword is detected, the device 110 may perform additional processing on a portion of the merged audio data $M(n, k)$ and/or may cause an action to be performed. For example, the device 110 may extract a portion of the merged audio data $M(n, k)$ representing the utterance as second merged audio data $M_2(n, k)$, may perform language processing on the second merged audio data $M_2(n, k)$ to determine a voice command, and may cause an action to be performed responsive to the voice command. Additionally or alternatively, the device 110 may send the second merged audio data $M_2(n, k)$ to the remote system 120 and/or other speech language processing components to cause language processing to be performed. In some examples, the device 110 may receive a command from the remote system 120 instructing the device 110 to perform the action responsive to the voice command, although the disclosure is not limited thereto and the remote system 120 may send the command to other devices without departing from the disclosure.

While FIG. 13 illustrates an example in which the beamformer component 1330 sends the merged audio data $M(n, k)$ to the wakeword engine component 1340, the disclosure is not limited thereto. In some examples, the beamformer component 1330 may send the merged audio data $M(n, k)$ to other components of the device 110 and/or the remote system 120 without departing from the disclosure.

Figure 14:
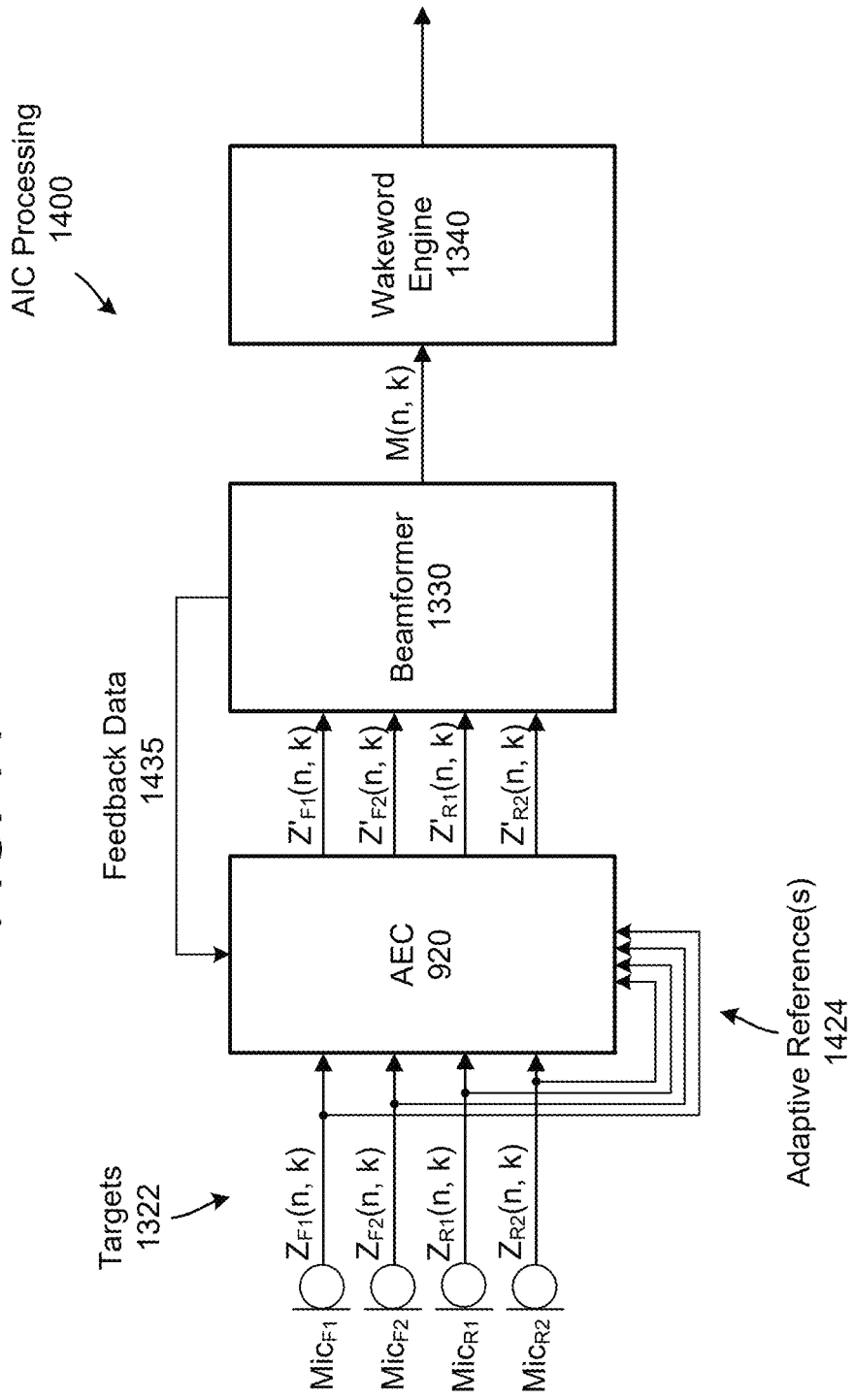
FIG. 14 is a component diagram illustrating a conceptual example of performing microphone reference adaptive interference according to embodiments of the present disclosure.

FIG. 14 is a component diagram illustrating a conceptual example of performing microphone reference adaptive interference according to embodiments of the present disclosure. As the components illustrated in FIG. 14 are described above with regard to FIG. 13, a redundant description is omitted.

While FIG. 13 illustrates an example of performing AIC processing 1300 using the rear microphone audio signals $Z_{R1}(n, k)/Z_{R2}(n, k)$ as fixed references, the disclosure is not limited thereto. In some examples, the AEC component 920 may perform AIC processing 1400 by selecting adaptive references 1424 from the microphone signals (e.g., $Z_{F1}(n, k)$-$Z_{R2}(n, k)$). For example, the AEC component 920 may select the first front microphone audio signal $Z_{F1}(n, k)$ as a first adaptive reference 1424a at a first time, but may select the second rear microphone audio signal $Z_{R2}(n, k)$ as a second adaptive reference 1424b at a second time. However, the disclosure is not limited thereto and the AEC component 920 may select two or more microphone audio signals as the adaptive references 1424 without departing from the disclosure.

The AEC component 920 may select the adaptive references 1424 using a variety of techniques without departing from the disclosure. In some examples, the AEC component 920 may select the adaptive references 1424 based on an average noise level. For example, the device 110 may determine the average noise level for each of the microphone audio signals and select one or more of the microphone audio signals having the highest average noise level(s) as the adaptive reference(s) 1424. In other examples, the AEC component 920 may select the adaptive references 1424 based on an amount of variation in energy, power level, and/or the like. For example, the device 110 may determine the amount of variation for each of the microphone audio signals and select one or more of the microphone audio signals having the least variation as the adaptive reference(s) 1424. The disclosure is not limited thereto, however, and the device 110 may select the adaptive reference(s) 1424 using other techniques without departing from the disclosure.

In some examples, the beamformer component 1330 may send feedback data 1435 to the AEC component 920 and the AEC component 920 may use the feedback data 1435 to select the adaptive reference(s) 1424. To illustrate an example, the beamformer component 1330 may generate statistical data and/or other metrics associated with the isolated audio signals, the directional audio data, and/or the like and the AEC component 920 may use the statistical data to select the adaptive reference(s) 1424. For example, the statistical data may include information about the target direction(s) and the AEC component 920 may select the adaptive reference(s) 1424 in an opposite direction of the target direction(s). Additionally or alternatively, the statistical data may include information about the reference direction(s) and the AEC component 920 may select the adaptive reference(s) 1424 based on microphones located in the reference direction(s). However, the disclosure is not limited thereto and the device 110 may select the adaptive reference(s) 1424 using other techniques without departing from the disclosure.

In some examples, the AEC component 920 may use the feedback data 1435 in other ways, such as to control an adaptation of the AEC component 920. For example, the feedback data 1435 may include information regarding speech being detected in the isolated audio data (e.g., based on voice activity detection (VAD) processing and/or the like) and the AEC component 920 may freeze adaptation of the adaptive filter coefficient values when speech is detected. Additionally or alternatively, the feedback data 1435 may include other information that the AEC component 920 may use to freeze adaptation of the adaptive filter coefficient values, such as detecting that playback audio is being output, detecting changes in volume, and/or the like without departing from the disclosure.

While FIGS. 13-14 illustrate an example in which the AEC component 920 receives microphone audio signals from four microphones, the disclosure is not limited thereto and the device 110 may include any number of microphones and/or the AEC component 920 may receive microphone audio signals from any number of microphones without departing from the disclosure. For example, the device 110 may include a first number of microphones (e.g., more than four microphones) without departing from the disclosure, and/or the AEC component 920 may receive microphone audio signals from a second number of microphones (e.g., subset of the first number of microphones) without departing from the disclosure. Thus, the examples illustrated in FIGS. 13-14 are intended to conceptually illustrate a single example and the disclosure is not limited thereto.

FIGS. 15A-15C illustrate examples of determining signal quality metrics and selecting between individual beams and beam sections according to embodiments of the present disclosure. As illustrated in FIG. 15A, in some examples the device 110 may perform individual beam selection 1510, such as using an individual beam 1515 to perform SNR calculation 1520. For example, the device 110 may determine a first SNR value (e.g., SNR1) associated with a first direction, a second SNR value (e.g., SNR2) associated with a second direction, and so on for each of the plurality of beams included in the filtered signal F(n, k). If a particular beam is not included in the filtered signal F(n, k), the device 110 may associate the beam with a low SNR value, although the disclosure is not limited thereto.

To perform the SNR calculation 1520, the device 110 may generate an individual SNR value for each of the plurality of beams included in the filtered signal F(n, k), as illustrated in FIG. 15A. For example, the device 110 may determine the first SNR value (e.g., SNR1) for the first beam (e.g., Beam1), the second SNR value (e.g., SNR2) for the second beam (e.g., Beam2), and so on. Based on these SNR values, the device 110 may select individual beams and/or generate a weighted sum of all of the beams, although the disclosure is not limited thereto.

As illustrated in FIG. 15B, in other examples the device 110 may perform fixed beam section selection 1530, which uses a beam section 1535 to perform SNR calculation 1540. For example, the device 110 may determine a first SNR value (e.g., SNR1) associated with a first direction, a second SNR value (e.g., SNR2) associated with a second direction, and so on for each of the plurality of beams included in the filtered signal F(n, k). If a particular beam is not included in the filtered signal F(n, k), the device 110 may associate the beam with a low SNR value, although the disclosure is not limited thereto.

To perform the SNR calculation 1540, the device 110 may generate an individual SNR value for each of the plurality of beam sections included in the filtered signal F(n, k), as illustrated in FIG. 15B. For example, the device 110 may determine an SNR value for a first beam section 1535a (e.g., Section1) by taking a sum of SNR values for the first beam (e.g., Beam1) and both neighboring beams (e.g., Beam8 and Beam2), represented in FIG. 15B as Section1: SNR8+ SNR1+SNR2. Similarly, the device 110 may determine an SNR value for a second beam section 1535b (e.g., Section2) by taking a sum of SNR values for the second beam (e.g., Beam2) and both neighboring beams (e.g., Beam1 and Beam3), represented in FIG. 15B as Section2: SNR1+SNR2+SNR3.

Thus, the device 110 may determine the SNR values for each of the beam sections corresponding to the plurality of beams included in the filtered signal F(n, k). Based on these SNR values, the device 110 may select individual beam sections and/or generate a weighted sum of all of the beams, although the disclosure is not limited thereto.

While FIG. 15B illustrates an example of fixed beam section selection 1530, in which each beam is associated with a beam section and the beam sections overlap, the disclosure is not limited thereto. In other examples, the device 110 may calculate SNR values for variable beams that do not overlap without departing from the disclosure.

As illustrated in FIG. 15C, in some examples the device 110 may perform variable beam section selection 1550, which uses beam sections 1555 to perform SNR calculation 1560. For example, the device 110 may determine a first SNR value (e.g., SNR1) associated with a first direction, a second SNR value (e.g., SNR2) associated with a second direction, and so on for each of the plurality of beams included in the filtered signal F(n, k). If a particular beam is not included in the filtered signal F(n, k), the device 110 may associate the beam with a low SNR value, although the disclosure is not limited thereto.

To perform the SNR calculation 1560, the device 110 may generate an individual SNR value for each of the plurality of beam sections included in the filtered signal F(n, k), as illustrated in FIG. 15C. For example, the device 110 may determine an SNR value for a first beam section 1555a (e.g., Section1) by taking a sum of SNR values for the eighth beam (e.g., Beam8), the first beam (e.g., Beam1), and the second beam (e.g., Beam2), represented in FIG. 15C as Section1: SNR8+SNR1+SNR2. However, the device 110 may determine an SNR value for a second beam section 1555b (e.g., Section2) using only the third SNR value for the third beam (e.g., SNR3). Finally, the device 110 may determine an SNR value for a third beam section 1555c (e.g., Section3) by taking a sum of SNR values for the fourth beam (e.g., Beam4) and the fifth beam (e.g., Beam5), represented in FIG. 15C as Section3: SNR4+SNR5 and may determine an SNR value for a fourth beam section 1555d (e.g., Section4) by taking a sum of SNR values for the sixth beam (e.g., Beam6) and the seventh beam (e.g., Beam7), represented in FIG. 15C as Section4: SNR6+SNR7.

Thus, the device 110 may determine the SNR values for each of the beam sections, but the beam sections themselves may vary based on the filtered signal F(n, k). Based on these SNR values, the device 110 may select individual beam sections and/or generate a weighted sum of all of the beams, although the disclosure is not limited thereto.

Figure 16:
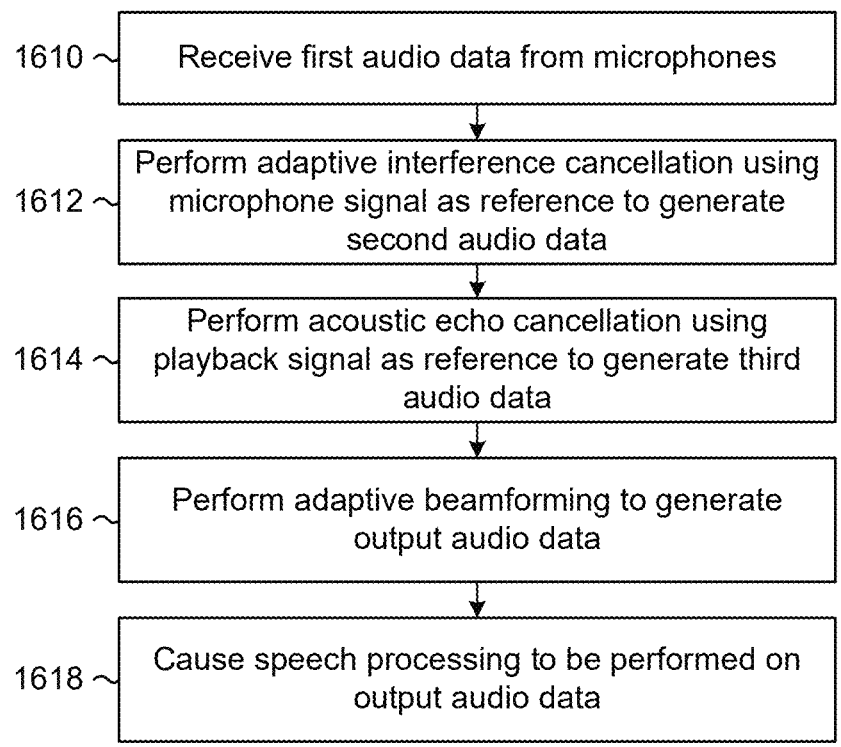
FIG. 16 is a flowchart conceptually illustrating an example method for performing microphone reference adaptive interference cancellation and acoustic echo cancellation according to embodiments of the present disclosure.

FIG. 16 is a flowchart conceptually illustrating an example method for performing microphone reference adaptive interference cancellation and acoustic echo cancellation according to embodiments of the present disclosure. As illustrated in FIG. 16, the device 110 may receive (1610) first audio data from microphones 112. and may perform (1612) adaptive interference cancellation (AIC) processing using microphone signal(s) as a reference to generate second audio data. For example, the device 110 may input the first audio data to a first adaptive filter and select a portion of the first audio data as the reference for the first adaptive filter, enabling the first adaptive filter to generate the second audio data, as described in greater detail above with regard to FIG. 9B.

The device 110 may perform (1614) acoustic echo cancellation (AEC) processing using a playback signal as a reference to generate third audio data. For example, the device 110 may input the second audio data to a second adaptive filter and input the playback signal as the reference for the second adaptive filter, enabling the second adaptive filter to generate the third audio data, as described in greater detail above with regard to FIG. 9A.

Using the third audio data, the device 110 may perform (1616) adaptive beamforming to generate output audio data, as described in greater detail above with regard to FIGS. 9A-9B. The device 110 may then cause (1618) speech processing to be performed on the output audio data, as described in greater detail below with regard to FIG. 18.

Figure 17:
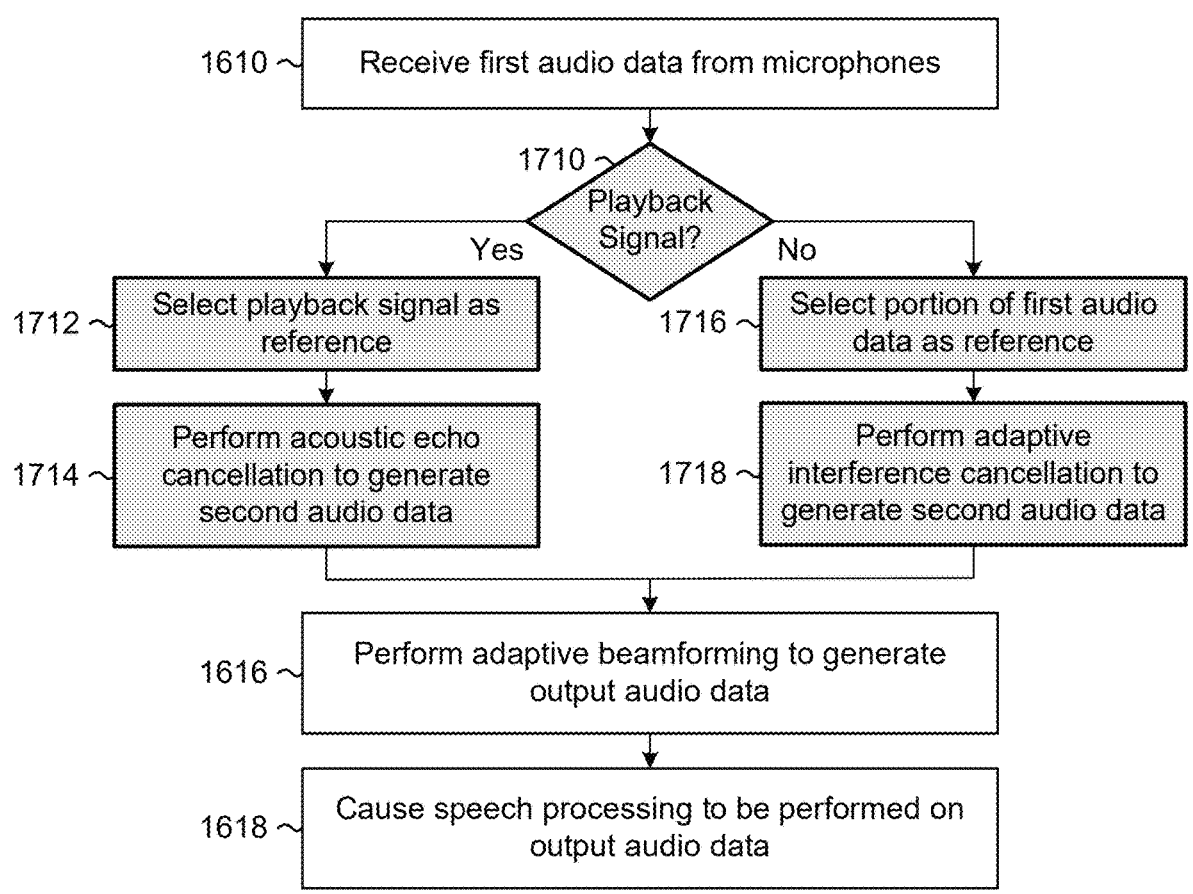
FIG. 17 is a flowchart conceptually illustrating an example method for performing microphone reference adaptive interference cancellation or acoustic echo cancellation according to embodiments of the present disclosure.

FIG. 17 is a flowchart conceptually illustrating an example method for performing microphone reference adaptive interference cancellation or acoustic echo cancellation according to embodiments of the present disclosure. As illustrated in FIG. 17, the device 110 may receive (1610) first audio data from microphones 112, may determine (1710) whether a playback signal is available. If the playback signal is available, the device 110 may select (1712) the playback signal as a reference and perform (1714) acoustic echo cancellation (AEC) processing to the first audio data to generate second audio data. For example, the device 110 may input the first audio data to a first adaptive filter and input the playback signal as the reference for the first adaptive filter, enabling the first adaptive filter to generate the second audio data, as described in greater detail above with regard to FIG. 9A.

If the playback signal is not available, however, the device 110 may select (1716) a portion of the first audio data as a reference and may perform (1718) adaptive interference cancellation (AIC) processing to the first audio data to generate second audio data. For example, the device 110 may input the first audio data to the first adaptive filter and select a portion of the first audio data as the reference for the first adaptive filter, enabling the first adaptive filter to generate the second audio data, as described in greater detail above with regard to FIG. 9B.

Using the second audio data, the device 110 may perform (1616) adaptive beamforming to generate output audio data, as described in greater detail above with regard to FIGS. 9A-9B. The device 110 may then cause (1618) speech processing to be performed on the output audio data, as described in greater detail below with regard to FIG. 18.

Figure 18:
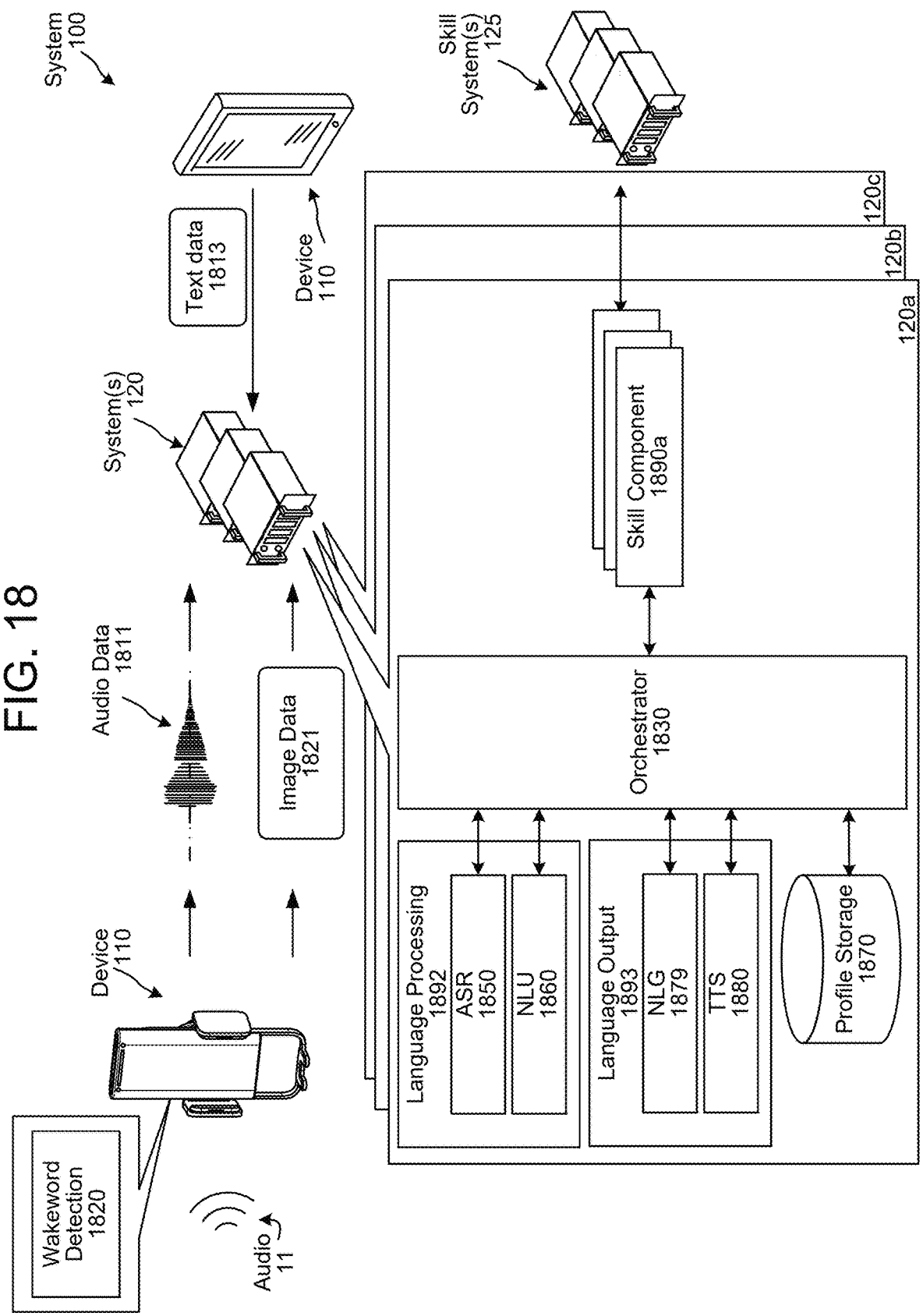
FIG. 18 is a conceptual diagram of components of the system, according to embodiments of the present disclosure.

The system 100 may operate using various components as described in FIG. 18. The various components may be located on same or different physical devices. Communication between various components may occur directly or across a network(s) 199. The device 110 may include audio capture component(s), such as microphones or an array of microphones 112 of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 1820. The wakeword detection component 1820 may be configured to detect various wakewords. In at least some examples, each wakeword may correspond to a name of a different digital assistant. An example wakeword/digital assistant name is "Alexa." In another example, input to the system may be in form of text data 1813, for example as a result of a user typing an input into a user interface of device 110. Other input forms may include indication that the user has pressed a physical or virtual button on device 110, the user has made a gesture, etc. The device 110 may also capture images using camera(s) 1918 of the device 110 and may send image data 1821 representing those image(s) to the system 120. The image data 1821 may include raw image data or image data processed by the device 110 before sending to the system 120.

The wakeword detector 1820 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1820 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 1820 and/or input is detected by an input detector, the device 110 may "wake" and begin transmitting audio data 1811, representing the audio 11, to the system(s) 120. The audio data 1811 may include data corresponding to the wakeword; in other embodiments, the portion of the audio corresponding to the wakeword is removed by the device 110 prior to sending the audio data 1811 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector 1820 may result in sending audio data to system 120*a* for processing while detection of the wakeword "Computer" by the wakeword detector may result in sending audio data to system 120*b* for processing. The system may have a separate wakeword and system for different skills/systems (e.g., "Dungeon Master" for a game play skill/system 120*c*) and/or such skills/systems may be coordinated by one or more skill(s) 1890 of one or more systems 120.

Upon receipt by the system(s) 120, the audio data 1811 may be sent to an orchestrator component 1830. The orchestrator component 1830 may include memory and logic that enables the orchestrator component 1830 to transmit various pieces and forms of data to various components of the system, as well as perform other operations as described herein.

The orchestrator component 1830 may send the audio data 1811 to a language processing component 1892. The language processing component 1892 (sometimes also referred to as a spoken language understanding (SLU) component) includes an automatic speech recognition (ASR) component 1850 and a natural language understanding (NLU) component 1860. The ASR component 1850 may transcribe the audio data 1811 into text data. The text data output by the ASR component 1850 represents one or more than one (e.g., in the form of an N-best list) ASR hypotheses representing speech represented in the audio data 1811. The ASR component 1850 interprets the speech in the audio data 1811 based on a similarity between the audio data 1811 and pre-established language models. For example, the ASR component 1850 may compare the audio data 1811 with models for sounds (e.g., acoustic units such as phonemes, senons, phones, etc.) and sequences of sounds to identify words that match the sequence of sounds of the speech represented in the audio data 1811. The ASR component 1850 sends the text data generated thereby to an NLU component 1860, via, in some embodiments, the orchestrator component 1830. The text data sent from the ASR component 1850 to the NLU component 1860 may include a single top-scoring ASR hypothesis or may include an N-best list including multiple top-scoring ASR hypotheses. An N-best list may additionally include a respective score associated with each ASR hypothesis represented therein.

The speech processing system 1892 may further include a NLU component 1860. The NLU component 1860 may receive the text data from the ASR component. The NLU component 1860 may attempts to make a semantic interpretation of the phrase(s) or statement(s) represented in the text data input therein by determining one or more meanings associated with the phrase(s) or statement(s) represented in the text data. The NLU component 1860 may determine an intent representing an action that a user desires be performed and may determine information that allows a device (e.g., the device 110, the system(s) 120, a skill component 1890, a skill system(s) 125, etc.) to execute the intent. For example, if the text data corresponds to "play the 5th Symphony by Beethoven," the NLU component 1860 may determine an intent that the system output music and may identify "Beethoven" as an artist/composer and "5th Symphony" as the piece of music to be played. For further example, if the text data corresponds to "what is the weather," the NLU component 1860 may determine an intent that the system output weather information associated with a geographic location of the device 110. In another example, if the text data corresponds to "turn off the lights," the NLU component 1860 may determine an intent that the system turn off lights associated with the device 110 or the user 5. However, if the NLU component 1860 is unable to resolve the entity—for example, because the entity is referred to by anaphora such as "this song" or "my next appointment"—the speech processing system 1892 can send a decode request to another speech processing system 1892 for information regarding the entity mention and/or other context related to the utterance. The speech processing system 1892 may augment, correct, or base results data upon the audio data 1811 as well as any data received from the other speech processing system 1892.

The NLU component 1860 may return NLU results data (which may include tagged text data, indicators of intent, etc.) back to the orchestrator 1830. The orchestrator 1830 may forward the NLU results data to a skill component(s) 1890. If the NLU results data includes a single NLU hypothesis, the NLU component 1860 and the orchestrator component 1830 may direct the NLU results data to the skill component(s) 1890 associated with the NLU hypothesis. If the NLU results data includes an N-best list of NLU hypotheses, the NLU component 1860 and the orchestrator component 1830 may direct the top scoring NLU hypothesis to a skill component(s) 1890 associated with the top scoring NLU hypothesis.

A skill component may be software running on the system(s) 120 that is akin to a software application. That is, a skill component 1890 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 1890. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 1890 may operate in conjunction between the system(s) 120 and other devices, such as the device 110, in order to complete certain functions. Inputs to a skill component 1890 may come from speech processing interactions or through other interactions or input sources. A skill component 1890 may include hardware, software, firmware, or the like that may be dedicated to a particular skill component 1890 or shared among different skill components 1890.

A skill support system(s) 125 may communicate with a skill component(s) 1890 within the system(s) 120 and/or directly with the orchestrator component 1830 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 1890 dedicated to interacting with the skill support system(s) 125. Unless expressly stated otherwise, reference to a skill, skill device, or skill component may include a skill component 1890 operated by the system(s) 120 and/or skill operated by the skill support system(s) 125. Moreover, the functionality described herein as a skill or skill may be referred to using many different terms, such as an action, bot, app, or the like. The skill 1890 and or skill support system(s) 125 may return output data to the orchestrator 1830.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system 100 may receive the ASR hypothesis/hypotheses (i.e., text data) and make a semantic interpretation of the phrase(s) or statement(s) represented therein. That is, the system 100 determines one or more meanings associated with the phrase(s) or statement(s) represented in the text data based on words represented in the text data. The system 100 determines a goal corresponding to an action that a user desires be performed as well as pieces of the text data that allow a device (e.g., the device 110, the system(s) 120, a skill 1890, a skill system(s) 125, etc.) to execute the intent. If, for example, the text data corresponds to "what is the weather," the system 100 may determine that that the system(s) 120 is to output weather information associated with a geographic location of the device 110. In another example, if the text data corresponds to "turn off the lights," the system 100 may determine that the system(s) 120 is to turn off lights associated with the device(s) 110 or the user(s) 5.

The system 100 may send the results data to one or more skill(s) 1890. If the results data includes a single hypothesis, the orchestrator component 1830 may send the results data to the skill(s) 1890 associated with the hypothesis. If the results data includes an N-best list of hypotheses, the orchestrator component 1830 may send the top scoring hypothesis to a skill(s) 1890 associated with the top scoring hypothesis.

The system 120 includes a language output component 1893. The language output component 1893 includes a natural language generation (NLG) component 1879 and a text-to-speech (TTS) component 1880. The NLG component 1879 can generate text for purposes of TTS output to a user. For example the NLG component 1879 may generate text corresponding to instructions corresponding to a particular action for the user to perform. The NLG component 1879 may generate appropriate text for various outputs as described herein. The NLG component 1879 may include one or more trained models configured to output text appropriate for a particular input. The text output by the NLG component 1879 may become input for the TTS component 1880. Alternatively or in addition, the TTS component 1880 may receive text data from a skill 1890 or other system component for output.

The NLG component 1879 may include a trained model. The NLG component 1879 generates text data from dialog data such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1880.

The TTS component 1880 may generate audio data (e.g., synthesized speech) from text data using one or more different methods. Text data input to the TTS component 1880 may come from a skill component 1890, the orchestrator component 1830, or another component of the system. In one method of synthesis called unit selection, the TTS component 1880 matches text data against a database of recorded speech. The TTS component 1880 selects matching units of recorded speech and concatenates the units together to form audio data. In another method of synthesis called parametric synthesis, the TTS component 1880 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 1811 representing the commands to the system(s) 120 for processing, after which the system(s) 120 may return output data that can cause the device 110 to engage its camera.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1870 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 1870 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1870 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 18 may be illustrated as part of system(s) 120, device 110, or otherwise, the components may be arranged in other device(s) (such as in device 110 if illustrated in system(s) 120 or vice-versa, or in other device(s) altogether) without departing from the disclosure.

In at least some embodiments, the system 120 may receive the audio data 1811 from the device 110, to recognize speech corresponding to a spoken input in the received audio data 1811, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As described above, the device 110 may include a wakeword detection component 1820 configured to compare the audio data 1811 to stored models used to detect a wakeword (e.g., "Alexa") that indicates to the device 110 that the audio data 1811 is to be processed for determining NLU output data (e.g., slot data that corresponds to a named entity, label data, and/or intent data, etc.). In some examples, the device 110 may conduct its own speech processing using on-device language processing components, such as an SLU/language processing component (which may include an ASR component and an NLU component), similar to the manner discussed herein with respect to the SLU component 1892 (or ASR component 1850 and the NLU component 1860) of the system 120. Thus, the device 110 may perform language processing using similar techniques to those described above without departing from the disclosure. The device 110 may also internally include, or otherwise have access to, other components such as one or more skill components capable of executing commands based on NLU output data or other results determined by the device 110/system 120.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

FIG. 19 is a block diagram conceptually illustrating a device 110 that may be used with the system. FIG. 20 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1904/2004), which may each include a central processing unit (CPU) for processing data and computer-readable instructions, and a memory (1906/2006) for storing data and instructions of the respective device. The memories (1906/2006) may individually include volatile random access memory (RAM), non-volatile read only memory (ROM), non-volatile magnetoresistive memory (MRAM), and/or other types of memory. Each device (110/120/125) may also include a data storage component (1908/2008) for storing data and controller/processor-executable instructions. Each data storage component (1908/2008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1902/2002).

Computer instructions for operating each device (110/120/125) and its various components may be executed by the respective device's controller(s)/processor(s) (1904/2004), using the memory (1906/2006) as temporary "working" storage at runtime. A device's computer instructions may be stored in a non-transitory manner in non-volatile memory (1906/2006), storage (1908/2008), or an external device(s). Alternatively, some or all of the executable instructions may be embedded in hardware or firmware on the respective device in addition to or instead of software.

Each device (110/120/125) includes input/output device interfaces (1902/2002). A variety of components may be connected through the input/output device interfaces (1902/2002), as will be discussed further below. Additionally, each device (110/120/125) may include an address/data bus (1924/2024) for conveying data among components of the respective device. Each component within a device (110/120/125) may also be directly connected to other components in addition to (or instead of) being connected to other components across the bus (1924/2024).

Referring to FIG. 19, the device 110 may include input/output device interfaces 1902 that connect to a variety of components such as an audio output component such as a speaker 1912, a wired headset or a wireless headset (not illustrated), or other component capable of outputting audio. The device 110 may also include an audio capture component. The audio capture component may be, for example, a microphone 1920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1916 for displaying content. The device 110 may further include a camera 1918.

Via antenna(s) 1922, the input/output device interfaces 1902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1902/2002) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1902/2002), processor(s) (1904/2004), memory (1906/2006), and/or storage (1908/2008) of the device(s) 110, natural language command processing system 120, or the skill system 125, respectively. Thus, the ASR component 1850 may have its own I/O interface(s), processor(s), memory, and/or storage; the NLU component 1860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

As illustrated in FIG. 21, multiple devices (110a-110p, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, headphones 110m/110n, vent-mountable device 110p etc. (e.g., a device such as a FireTV stick, Echo Auto or the like) may be connected to the network(s) 199 through a wireless service provider, over a WiFi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1850, the NLU component 1860, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    receiving first audio data associated with a first microphone;
    receiving second audio data associated with a second microphone, the second audio data representing a combination of speech and noise;
    generating, by a first adaptive filter using the first audio data as a first target signal and the second audio data as a first reference signal, a first portion of third audio data, wherein generating the first portion of the third audio data further comprises:
        generating first reference audio data by applying first filter coefficient values to the second audio data, the first reference audio data representing the noise, and
        generating the first portion of the third audio data by subtracting the first reference audio data from a first portion of the first audio data;
    generating, by a second adaptive filter using the second audio data as a second target signal and the second audio data as a second reference signal, a first portion of fourth audio data, wherein generating the first portion of the fourth audio data further comprises:
        generating second reference audio data by applying second filter coefficient values to the second audio data, the second reference audio data representing the noise, and
        generating the first portion of the fourth audio data by subtracting the second reference audio data from a first portion of the second audio data;
    generating, by a beamformer component, a first portion of directional audio data using the first portion of the third audio data and the first portion of the fourth audio data, the directional audio data comprising:
        first beamformed audio data corresponding to a first direction relative to a device, and
        second beamformed audio data corresponding to a second direction relative to the device, the second direction different from the first direction; and
    causing an action to be performed using the directional audio data.

2. The computer-implemented method of claim 1, further comprising:
    sending fifth audio data to one or more loudspeakers;
    generating, by the first adaptive filter using a second portion of the first audio data as the first target signal and the fifth audio data as the first reference signal, a second portion of the third audio data;
    generating, by the second adaptive filter using a second portion of the second audio data as the second target signal and the fifth audio data as the second reference signal, a second portion of the fourth audio data; and
    generating, by the beamformer component, a second portion of the directional audio data using the second portion of the third audio data and the second portion of the fourth audio data.

3. The computer-implemented method of claim 2, wherein the first adaptive filter generates the first filter coefficient values using a first adaptation time constant and the first adaptive filter generates the second portion of the third audio data using third filter coefficient values generated using a second adaptation time constant that is shorter than the first adaptation time constant.

4. The computer-implemented method of claim 1, further comprising:
    sending fifth audio data to one or more loudspeakers;
    generating, by a third adaptive filter using the first portion of the third audio data as a third target signal and the fifth audio data as a third reference signal, sixth audio data;
    generating, by a fourth adaptive filter using the first portion of the fourth audio data as a fourth target signal and the fifth audio data as a fourth reference signal, seventh audio data; and
    generating, by the beamformer component, the first portion of the directional audio data using the sixth audio data and the seventh audio data.

5. The computer-implemented method of claim 1, further comprising:
    receiving fifth audio data associated with a third microphone,
    wherein the first adaptive filter uses a combination of the second audio data and the fifth audio data as the first reference signal.

6. The computer-implemented method of claim 1, further comprising:
    generating, by the first adaptive filter using the first audio data as the first target signal and the first audio data as the first reference signal, a second portion of the third audio data;
    generating, by the second adaptive filter using the second audio data as the second target signal and the first audio data as the second reference signal, a second portion of the fourth audio data; and generating, by the beamformer component, a second portion of the directional audio data using the second portion of the third audio data and the second portion of the fourth audio data.

7. The computer-implemented method of claim 1, further comprising:
receiving, from a beamformer component, feedback data associated with the directional audio data;
in response to the feedback data, generating, by the first adaptive filter, third filter coefficient values, third reference audio data by applying third filter coefficient values to the first audio data;
in response to the feedback data, generating, by the second adaptive filter, fourth reference audio data by applying fourth filter coefficient values to the first audio data;
generating, by the first adaptive filter, a second portion of the third audio data by subtracting the third reference audio data from a second portion of the first audio data;
generating, by the second adaptive filter, a second portion of the fourth audio data by subtracting the fourth reference audio data from a second portion of the second audio data; and
generating, by the beamformer component, a second portion of the directional audio data using the second portion of the third audio data and the second portion of the fourth audio data.

8. The computer-implemented method of claim 1, further comprising:
sending fifth audio data to one or more loudspeakers,
wherein receiving the first audio data further comprises:
receiving sixth audio data associated with the first microphone; and
generating, by a third adaptive filter using the sixth audio data as a third target signal and the fifth audio data as a third reference signal, the first audio data.

9. The computer-implemented method of claim 1, further comprising:
sending fifth audio data to one or more loudspeakers; and
generating, by the second adaptive filter using the second audio data as the second target signal and the fifth audio data as the second reference signal, a second portion of the fourth audio data, wherein generating the second portion of the fourth audio data further comprises:
generating third reference audio data by applying third filter coefficient values to the fifth audio data, and
generating the second portion of the fourth audio data by subtracting the third reference audio data from a second portion of the second audio data,
wherein the second adaptive filter generates the second filter coefficient values using a first adaptation time constant and
generates the third filter coefficient values using a second adaptation time constant that is shorter than the first adaptation time constant.

10. The computer-implemented method of claim 1, wherein the second adaptive filter updates the second filter coefficient values using the fourth audio data, the method further comprising:
receiving first data indicating that the speech is detected in the first portion of the second audio data;
in response to the speech being detected in the first portion of the second audio data, freezing adaptation of the second adaptive filter during the second first portion of the second audio data;

generating third reference audio data by applying the second filter coefficient values to a second portion of the second audio data; and
generating a second portion of the fourth audio data by subtracting the third reference audio data from the second portion of the second audio data.

11. The computer-implemented method of claim 1, wherein causing the action to be performed further comprises:
sending the directional audio data to one of a language processing device or a language processing component of the device;
receiving, from one of the language processing device or the language processing component, first data corresponding to the action to be performed; and
generating output audio using the first data and one or more loudspeakers associated with the device.

12. A system comprising:
at least one processor; and
memory including instructions operable to be executed by the at least one processor to cause the system to:
receive first audio data associated with a first microphone;
receive second audio data associated with a second microphone, the second audio data representing a combination of speech and noise;
generate, by a first adaptive filter using the first audio data as a first target signal and the second audio data as a first reference signal, a first portion of third audio data, wherein generating the first portion of the third audio data further comprises:
generating first reference audio data by applying first filter coefficient values to the second audio data, the first reference audio data representing the noise, and
generating the first portion of the third audio data by subtracting the first reference audio data from a first portion of the first audio data;
generate, by a second adaptive filter using the second audio data as a second target signal and the second audio data as a second reference signal, a first portion of fourth audio data, wherein generating the first portion of the fourth audio data further comprises:
generating second reference audio data by applying second filter coefficient values to the second audio data, the second reference audio data representing the noise, and
generating the first portion of the fourth audio data by subtracting the second reference audio data from a first portion of the second audio data;
generate, by a beamformer component, a first portion of directional audio data using the first portion of the third audio data and the first portion of the fourth audio data, the directional audio data comprising:
first beamformed audio data corresponding to a first direction relative to a device, and
second beamformed audio data corresponding to a second direction relative to the device, the second direction different from the first direction; and
cause an action to be performed using the directional audio data.

13. The system of claim 12, wherein the memory further comprises instructions that, when executed by the at least one processor, further cause the system to:
send fifth audio data to one or more loudspeakers;
generate, by the first adaptive filter using a second portion of the first audio data as the first target signal and the fifth audio data as the first reference signal, a second portion of the third audio data;
generate, by the second adaptive filter using a second portion of the second audio data as the second target signal and the fifth audio data as the second reference signal, a second portion of the fourth audio data; and
generate a second portion of the directional audio data using the second portion of the third audio data and the second portion of the fourth audio data.

14. The system of claim 13, wherein the first adaptive filter generates the first filter coefficient values using a first adaptation time constant and the first adaptive filter generates the second portion of the third audio data using third filter coefficient values generated using a second adaptation time constant that is shorter than the first adaptation time constant.

15. The system of claim 12, wherein the memory further comprises instructions that, when executed by the at least one processor, further cause the system to:
send fifth audio data to one or more loudspeakers;
generate, by a third adaptive filter using the first portion of the third audio data as a third target signal and the fifth audio data as a third reference signal and third filter coefficient values, sixth audio data;
generate, by a fourth adaptive filter using the first portion of the fourth audio data as a fourth target signal and the fifth audio data as a fourth reference signal, seventh audio data; and
generate, by the beamformer component, the first portion of the directional audio data using the sixth audio data and the seventh audio data.

16. The system of claim 12, wherein the memory further comprises instructions that, when executed by the at least one processor, further cause the system to:
receive fifth audio data associated with a third microphone,
wherein the first adaptive filter uses a combination of the second audio data and the fifth audio data as the first reference signal.

17. The system of claim 12, wherein the memory further comprises instructions that, when executed by the at least one processor, further cause the system to:
generate, by the first adaptive filter using the first audio data as the first target signal and the first audio data as the first reference signal, a second portion of the third audio data;
generate, by the second adaptive filter using the second audio data as the second target signal and the first audio data as the second reference signal, a second portion of the fourth audio data; and
generate, by the beamformer component, a second portion of the directional audio data using the second portion of the third audio data and the second portion of the fourth audio data.

18. The system of claim 12, wherein the memory further comprises instructions that, when executed by the at least one processor, further cause the system to:
receive, from a beamformer component, feedback data associated with the directional audio data;
in response to the feedback data, generate, by the first adaptive filter, third reference audio data by applying third filter coefficient values to the first audio data;
in response to the feedback data, generate, by the second adaptive filter, fourth reference audio data by applying fourth filter coefficient values to the first audio data;
generate, by the first adaptive filter, a second portion of the third audio data by subtracting the third reference audio data from a second portion of the first audio data;
generate, by the second adaptive filter, a second portion of the fourth audio data by subtracting the fourth reference audio data from a second portion of the second audio data; and
generate, by the beamformer component, a second portion of the directional audio data using the second portion of the third audio data and the second portion of the fourth audio data.

19. A computer-implemented method, the method comprising:
sending playback audio data to one or more loudspeakers;
receiving first audio data associated with a first microphone;
receiving second audio data associated with a second microphone;
generating, by a first adaptive filter using the first audio data as a first target signal and both the second audio data and the playback audio data as first reference signals, a first portion of third audio data, wherein generating the first portion of the third audio data further comprises:
generating first reference audio data by applying first filter coefficient values to the second audio data and the playback audio data, and
generating the first portion of the third audio data by subtracting the first reference audio data from a first portion of the first audio data;
generating, by a second adaptive filter using the second audio data as a second target signal and both the second audio data and the playback audio data as second reference signals, a first portion of fourth audio data, wherein generating the first portion of the fourth audio data further comprises:
generating second reference audio data by applying second filter coefficient values to the second audio data and the playback audio data, and
generating the first portion of the fourth audio data by subtracting the second reference audio data from a first portion of the second audio data;
generating a first portion of output audio data using the first portion of the third audio data and the first portion of the fourth audio data; and
causing an action to be performed using the output audio data.

20. The computer-implemented method of claim 19, wherein generating the first portion of the output audio data further comprises:
generating directional audio data using the first portion of the third audio data and the first portion of the fourth audio data, the directional audio data comprising:
first beamformed audio data corresponding to a first direction relative to a device, and
second beamformed audio data corresponding to a second direction relative to the device, the second direction different from the first direction; and
generating the first portion of the output audio data by subtracting the second beamformed audio data from the first beamformed audio data.

21. The computer-implemented method of claim 19, further comprising:
receiving fifth audio data associated with a third microphone, wherein the first adaptive filter uses the playback audio data, the second audio data, and the fifth audio data as the first reference signals.

22. The computer-implemented method of claim 19, further comprising:
   generating, by the first adaptive filter using the first audio data as the first target signal and the first audio data and the playback audio data as the first reference signals, a second portion of the third audio data;
   generating, by the second adaptive filter using the second audio data as the second target signal and the first audio data and the playback audio data as the second reference signals, a second portion of the fourth audio data; and
   generating a second portion of the output audio data using the second portion of the third audio data and the second portion of the fourth audio data.

23. The computer-implemented method of claim 19, further comprising:
   receiving, from a beamformer component, feedback data associated with the first portion of the output audio data;
   in response to the feedback data, generating, by the first adaptive filter, third reference audio data by applying third filter coefficient values to the first audio data and the playback audio data;
   in response to the feedback data, generating, by the second adaptive filter, fourth reference audio data by applying fourth filter coefficient values to the first audio data and the playback audio data;
   generating, by the first adaptive filter, a second portion of the third audio data by subtracting the third reference audio data from a second portion of the first audio data;
   generating, by the second adaptive filter, a second portion of the fourth audio data by subtracting the fourth reference audio data from a second portion of the second audio data; and
   generating a second portion of the output audio data using the second portion of the third audio data and the second portion of the fourth audio data.

* * * * *